United States Patent
Matsuda et al.

(10) Patent No.: US 8,890,917 B2
(45) Date of Patent: Nov. 18, 2014

(54) PRINTING QUALITY EVALUATION SYSTEM, LASER MARKING APPARATUS, PRINTING CONDITION SETTING DEVICE, PRINTING QUALITY EVALUATION APPARATUS, PRINTING CONDITION SETTING PROGRAM, PRINTING QUALITY EVALUATION PROGRAM, AND COMPUTER-READABLE RECORDING MEDIUM

(75) Inventors: Hajime Matsuda, Osaka (JP); Takaaki Ito, Osaka (JP)

(73) Assignee: Keyence Corporation, Osaka (JP)

( * ) Notice: Subject to any disclaimer, the term of this patent is extended or adjusted under 35 U.S.C. 154(b) by 120 days.

(21) Appl. No.: 13/348,698

(22) Filed: Jan. 12, 2012

(65) Prior Publication Data

US 2012/0182374 A1    Jul. 19, 2012

(30) Foreign Application Priority Data

Jan. 19, 2011   (JP) .................................. 2011-008797

(51) Int. Cl.
| | | |
|---|---|---|
| *B41J 2/47* | (2006.01) | |
| *B41J 2/435* | (2006.01) | |
| *B41J 2/00* | (2006.01) | |
| *G06K 1/12* | (2006.01) | |
| *G06K 15/02* | (2006.01) | |
| *G06K 5/00* | (2006.01) | |
| *G06F 3/12* | (2006.01) | |
| *G06K 15/12* | (2006.01) | |

(52) U.S. Cl.
CPC .............. *G06K 1/121* (2013.01); *G06K 15/027* (2013.01); *G06K 5/00* (2013.01); *G06F 3/1256* (2013.01); *G06K 15/12* (2013.01); *G06F 3/1208* (2013.01)

USPC ........... 347/262; 347/252; 347/253; 347/264; 347/110

(58) Field of Classification Search
USPC .......................... 347/252, 243, 262, 264, 110
See application file for complete search history.

(56) References Cited

U.S. PATENT DOCUMENTS

| | | | |
|---|---|---|---|
| 2007/0279474 A1* | 12/2007 | Sato ............................... | 347/110 |
| 2008/0017619 A1* | 1/2008 | Yamakawa et al. ...... | 219/121.81 |
| 2008/0156778 A1* | 7/2008 | Lin et al. ................... | 219/121.68 |
| 2012/0074107 A1* | 3/2012 | Berthe et al. ............. | 219/121.69 |

FOREIGN PATENT DOCUMENTS

| | | |
|---|---|---|
| JP | H11-028586 | 2/1999 |
| JP | 2007-090352 | 4/2007 |

* cited by examiner

*Primary Examiner* — Justin Seo
*Assistant Examiner* — Kendrick Liu
(74) *Attorney, Agent, or Firm* — Kilyk & Bowersox, P.L.L.C.

(57) ABSTRACT

In order to improve read stability, a printing condition is set based on not visual read of a user, but read with an optical information reading apparatus. A printing quality evaluation apparatus includes: an image acquiring section that acquires an image; a symbol extracting section that extracts the symbol in which the printing quality can be evaluated from the captured images acquired by the image acquiring section; a printing quality evaluation section that evaluates the printing quality of the symbol extracted by the symbol extracting section; an identification information recognition section that recognizes the identification information identifying each printing condition of the symbol; and an evaluation output section that outputs the identification information, which is recognized by the identification information recognition section, and an evaluation result of the printing quality of the printing quality evaluation section according to the symbol extracted by the symbol extracting section.

26 Claims, 61 Drawing Sheets

284

FIG. 42
| | 1 | 2 | 3 | 4 | 5 |
|---|---|---|---|---|---|
| A | 0 | 50 | 92 | 100 | 100 |
| B | 0 | 46 | 96 | 98 | 98 |
| C | 0 | 2 | 64 | 76 | 96 |
| D | 0 | 0 | 7 | 74 | 91 |
285
FIG. 43
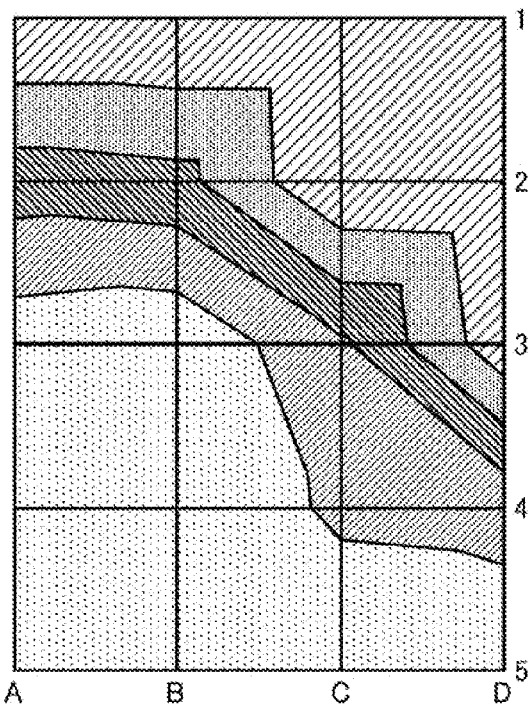
284B
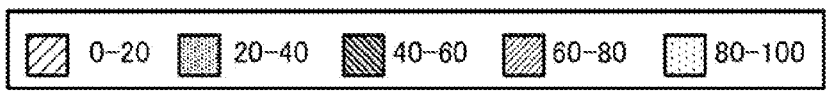

| FR \ SV | -50 | -40 | -30 | -20 | -10 | 0 |
|---|---|---|---|---|---|---|
| 10 | – | – | – | – | 20 | – |
| 20 | – | – | – | – | 17 | 25 |
| 30 | – | – | – | – | 82 | 84 |
| 40 | – | – | – | – | 85 | 84 |
| 50 | – | – | – | – | 80 | 82 |
| 60 | – | – | – | – | 65 | 65 |
| 70 | – | – | – | – | – | 86 |
| 80 | – | – | – | – | – | 70 |
| 90 | – | – | – | – | – | 44 |
| 100 | – | – | – | – | – | 90 |

BLACK REGION    WHITE REGION

PRINTING QUALITY EVALUATION SYSTEM, LASER MARKING APPARATUS, PRINTING CONDITION SETTING DEVICE, PRINTING QUALITY EVALUATION APPARATUS, PRINTING CONDITION SETTING PROGRAM, PRINTING QUALITY EVALUATION PROGRAM, AND COMPUTER-READABLE RECORDING MEDIUM

CROSS-REFERENCE TO RELATED APPLICATIONS

The present application claims foreign priority based on Japanese Patent Application No. 2011-008797, filed Jan. 19, 2011, the contents of which is incorporated herein by reference.

BACKGROUND OF THE INVENTION

1. Field of the Invention

The present invention relates to a laser marking apparatus that irradiates a target object with a laser beam to perform machining such as printing, a laser printing condition setting device, a printing quality evaluation system in which the laser marking apparatus and the laser printing condition setting device are combined, a laser printing condition setting method, a laser printing condition setting program, a computer-readable recording medium, an instrument in which computer-readable information is recorded, and a laser marking apparatus in which computer-readable information is recorded.

2. Description of Related Art

Recently, various codes such as a barcode and a two-dimensional code or various "symbols" are used in the fields of merchandise management and the like. Recently, traceability is widely spread, and a system, in which an optical information reading apparatus called a barcode reader or a code reader is placed in a factory or a distribution base, the symbol is printed or stamped in commercial goods or goods (code printing), and information on the code printing is read with the optical information reading apparatus, is adopted in many business fields. In a laser marking apparatus, a predetermined region is scanned with a laser beam, and a surface of a printing target (workpiece) such as a component and a product is irradiated with the laser beam, thereby performing machining such as printing and marking.

When laser marking apparatus is used, it is necessary that machining parameters such as a scanning speed of the laser beam and a laser output (laser power) be set to optimum values as printing conditions in the machining. In the case that pulse oscillation of the laser beam is performed by Q switching, it is also necessary that a Q switch frequency be set as the printing condition. The Q switching means that pumping is performed while a loss of an optical resonator is increased, energy is accumulated in an excitation level, and the loss is reduced in proper timing to generate laser action. The optimum printing conditions depend on a material for the workpiece and a type or a size of a mark to be printed, and parameters constituting the printing conditions are intricately correlated with one another. Therefore, a user hardly sets the printing conditions to the optimum parameter values while adjusting the parameter values.

The applicant has developed a laser marking apparatus that can easily set the printing conditions to the optimum values (see Japanese Patent Publication Laid-Open Nos. 11-28586 and 2007-0352). In a technology described in Japanese Patent Publication Laid-Open No. 11-28586, plural printing conditions in which the scanning speed of the laser beam and the laser output are automatically changed are set, the printing machining is actually performed on each printing condition, and a printing list 500 in which plural printing samples 501 having different pieces of printing density are formed is produced as illustrated in FIG. 78. Therefore, the user can set a scanning speed VS, a laser output PL, and a Q switch frequency fs as the printing conditions according to the printing sample only by specifying a number of the printing sample 501 in the printing list 500. Japanese Patent Publication Laid-Open No. 2007-90352 discloses a method for setting a preferable printing condition when three-dimensional printing is performed with a laser marking apparatus that can perform three-dimensional machining.

However, in the above technologies, the symbol in which the desired result is obtained is selected from the plural actually-printed symbols (for example, a QR code) by visual checking of the user, which results in a problem in that the visual checking is hardly performed when the size of the printed symbol becomes significantly small. For example, in some micro QR codes, the symbol has the size of 1 mm by 1 mm. Even in the normal QR code, in the case that a notable difference is not seen in the obtained printing result, sometimes which QR code is selected depends on an impression of a subjective view of the user, whereby a quantitative determination result is not obtained.

The good result obtained by the visual checking of the user is not always matched with the good result on the side of the reading apparatus that reads the symbol such as the QR code. That is, because the finally-printed symbol is read with the reading apparatus, it is necessary that the printing conditions on which read stability is improved be set such that the symbol can stably be read on the reading apparatus side. For example, it is necessary that a cell size of the symbol is set to an optimum size, and it is necessary that the printing conditions be set according to the required specifications such as the material of the printing target and an illumination condition such that a contrast becomes clear. Particularly, in what is called direct parts marking, namely, in a code print that is directly stamped in a surface of the metal or resin workpiece, it is well known that reading performance of the barcode reader depends on a way in which the workpiece is illuminated.

Accordingly, even in the code print that is determined to be successful by the visual checking of the user, possibly the barcode reader hardly reads the code print. In the case that the plural code prints that are similar to one another such that no problem is generated eve if the user selects any one of the code prints, possibly only one specific code print can stably be read from the viewpoint of the barcode reader.

Therefore, the invention is made in order to solve the problems in the related art. An object of the invention is to provide a printing quality evaluation system that can set the printing conditions, in which the read stability on the reading apparatus that reads the machined symbol is improved, a laser marking apparatus, a laser printing condition setting device, a laser printing condition setting method, a laser printing condition setting program, a computer-readable recording medium, and an instrument in which the computer-readable information is recorded.

SUMMARY OF THE INVENTION

According to one embodiment of the invention, a printing quality evaluation system includes: a printing condition setting device that sets a printing condition in order to print plural symbols having different printing conditions in a printing target with a laser marking apparatus; and a printing quality evaluation apparatus that evaluates printing quality of each symbol based on captured images of the plural symbols having the different printing conditions, the plural symbols being printed in the printing target with the laser marking apparatus based on printing data that is generated according to the printing conditions set with the printing condition setting device, wherein the printing condition setting device includes: a parameter setting section that can set at least one printing parameter to a variable parameter varying the printing condition in plural printing parameters constituting the printing conditions, and sets other printing parameters to fixed parameters; a printing condition generating section that substitutes plural different parameter values for the variable parameter set by the parameter setting section while substituting fixed values for the fixed parameters set by the parameter setting section, thereby generating the plural different printing conditions; a printing data generation section that causes the printing quality evaluation apparatus to read different piece of identification information, and sets the identification information to an identifiable symbol to generate printing data, the identification information identifying at least information on the variable parameter included in the printing condition, the identification information being previously correlated with each of the plural different printing conditions generated by the printing condition generating section; and a printing data output section that transmits the plural different symbols generated by the printing data generation section to the laser marking apparatus, and the printing quality evaluation apparatus includes: an image acquiring section that acquires the captured image including each symbol printed in the printing target, the captured image being captured with resolution at which the printing quality of the symbol can be evaluated; a symbol extracting section that extracts the symbol in which the printing quality can be evaluated from the captured images acquired by the image acquiring section; a printing quality evaluation section that evaluates the printing quality of the symbol extracted by the symbol extracting section; an identification information recognition section that recognizes the identification information identifying each printing condition of the symbol, the printing condition being included in the symbol extracted by the symbol extracting section; and an evaluation output section that outputs the identification information, which is recognized by the identification information recognition section, and an evaluation result of the printing quality of the printing quality evaluation section according to the symbol extracted by the symbol extracting section. According to the printing condition set with the printing condition setting device, the identification information identifying the printing condition is included in each of the plural different symbols, which are actually printed with the laser marking apparatus, while being able to be read with the printing quality evaluation apparatus, which allows the recognition of the identification information corresponding to the symbol that is evaluated as the high printing quality by the printing quality evaluation apparatus side. As a result, the printing condition of the symbol can properly be set by feeding back the identification information to the printing condition setting device, the printing quality can be enhanced such that the read stability of the symbol with the optical information reading apparatus is improved during the operation, and the setting of the proper printing condition can qualitatively be set irrespective of the visual checking or experience of the user.

According to another aspect of the invention, a printing quality evaluation system includes: a laser marking apparatus that can print plural symbols having different printing conditions in a printing target; and a printing quality evaluation apparatus that evaluates printing quality of each symbol based on captured images of the plural symbols having the different printing conditions, the plural symbols being printed in the printing target with the laser marking apparatus, wherein the laser marking apparatus includes: a parameter setting section that can set at least one printing parameter to a variable parameter varying the printing condition in plural printing parameters constituting the printing conditions, and sets other printing parameters to fixed parameters; a printing condition generating section that substitutes plural different parameter values for the variable parameter set by the parameter setting section while substituting fixed values for the fixed parameters set by the parameter setting section, thereby generating the plural different printing conditions; a printing data generation section that causes the printing quality evaluation apparatus to read different piece of identification information, and sets the identification information to an identifiable symbol to generate printing data, the identification information identifying at least information on the variable parameter included in the printing condition, the identification information being previously correlated with each of the plural different printing conditions generated by the printing condition generating section; and a marking section that prints the plural different symbols generated by the printing data generation section based on each printing condition correlated with the identification information included in the symbol, the printing quality evaluation apparatus includes: an image acquiring section that acquires the captured image including each symbol printed in the printing target, the captured image being captured with resolution at which the printing quality of the symbol can be evaluated; a symbol extracting section that extracts the symbol in which the printing quality can be evaluated from the captured images acquired by the image acquiring section; a printing quality evaluation section that evaluates the printing quality of the symbol extracted by the symbol extracting section; an identification information recognition section that recognizes the identification information identifying each printing condition of the symbol, the printing condition being included in the symbol extracted by the symbol extracting section; and an evaluation output section that outputs the identification information, which is recognized by the identification information recognition section, and an evaluation result of the printing quality of the printing quality evaluation section according to the symbol extracted by the symbol extracting section, the identification information recognition section recognizes the identification information of the symbol that is evaluated as the high printing quality by the printing quality evaluation section, the recognized identification information is acquired from the evaluation output section, and the printing condition identified by the identification information can be fed back to the laser marking apparatus. The identification information identifying the printing condition is included in each of the plural different symbols, which are printed with the laser marking apparatus, while being able to be read with the printing quality evaluation apparatus, which allows the recognition of the identification information corresponding to the symbol that is evaluated as the high printing quality by the printing quality evaluation apparatus side. As a result, the printing condition of the symbol can properly be set by feeding back the identification information to the laser marking apparatus, the printing quality can be enhanced such that the read stability of the symbol with the optical information reading apparatus is improved during the operation, and the setting of the proper printing condition can qualitatively be set irrespective of the visual checking or experience of the user.

According to a still another embodiment of the invention, a laser marking apparatus that can print plural symbols having different printing conditions in a printing target, the laser marking apparatus includes: a parameter setting section that can set at least one printing parameter to a variable parameter varying the printing condition in plural printing parameters constituting the printing conditions, and sets other printing parameters to fixed parameters; a printing condition generating section that substitutes plural different parameter values for the variable parameter set by the parameter setting section while substituting fixed values for the fixed parameters set by the parameter setting section, thereby generating the plural different printing conditions; a printing data generation section that causes a printing quality evaluation apparatus to read different piece of identification information, and sets the identification information to an identifiable symbol to generate printing data, the identification information identifying at least information on the variable parameter included in the printing condition, the identification information being previously correlated with each of the plural different printing conditions generated by the printing condition generating section; and a marking section that prints the plural different symbols generated by the printing data generation section based on each printing condition correlated with the identification information included in the symbol, wherein the printing condition is identified in printing the symbol based on the identification information that is evaluated as the high printing quality by the printing quality evaluation apparatus in the plural printed symbols, and the printing condition can be reflected on next printing. The identification information identifying the printing condition is included in each of the plural different symbols while being able to be read with the printing quality evaluation apparatus, which allows the recognition of the identification information corresponding to the symbol that is evaluated as the high printing quality by the printing quality evaluation apparatus side. As a result, the printing condition can be set by feeding back the identification information to the laser marking apparatus such that the read stability of the optical information reading apparatus is improved during the operation. Therefore, the setting of the proper printing condition can qualitatively be set irrespective of the visual checking or experience of the user.

According to a preferred embodiment of the invention, in the laser marking apparatus, the parameter setting section selects one of different values of the variable parameters constituting a first sample printing condition while the plural different symbols are printed on the first sample printing condition by the marking section, sets the selected value of the variable parameter to a fixed parameter of a second printing condition, and set a new variable parameter in other fixed parameters to a second printing condition. Because the variable parameter is changed to the fixed parameter by the setting of the identification information, the user may set another parameter to the variable parameter, and the advantageously the setting manipulation is facilitated.

According to a preferred embodiment of the invention, the laser marking apparatus further includes an identification information reference section that correlates the different piece of identification information identifying each printing condition with each of the plural different printing conditions generated by the printing condition generating section. Therefore, the identification information can indirectly be included in the symbol by the correlation in addition to the direct embedment of the identification information in the symbol, and the necessary information can be referred to even in the small amount of information that can be recorded in the symbol.

According to a preferred embodiment of the invention, in the laser marking apparatus, the identification information reference section is a correspondence table indicating correspondence relationships between the plural different printing conditions and the plural different pieces of identification information. Therefore, the identification information, such as the positional information on each symbol, the sign, and the alphanumeric character, which has the small amount of information can be used as the identification information.

According to a preferred embodiment of the invention, in the laser marking apparatus, the symbol is a one-dimensional code or a two-dimensional code, the identification information is positional information on each symbol, and the identification information reference section is a correspondence table indicating correspondence relationship between the printing condition of the one-dimensional code or the two-dimensional code and the positional information on each symbol. Therefore, the printing condition can be identified without directly encoding the identification information in the symbol, and advantageously the printing condition can be identified even in the small amount of information, such as the micro QR code, which can be included in the symbol.

According to a preferred embodiment of the invention, in the laser marking apparatus, the symbol is a one-dimensional code or a two-dimensional code, the identification information is an alphanumeric character or a sign, and the identification information reference section is a correspondence table indicating correspondence relationship between the printing condition of the one-dimensional code or the two-dimensional code and the alphanumeric character or the sign. Therefore, the printing condition can be identified without directly encoding the identification information in the symbol.

According to a preferred embodiment of the invention, the laser marking apparatus further includes a printing information code setting section that marks a printing information code in which the printing condition is encoded on the printing target. Therefore, advantageously the need for manually inputting the information relating to the printing condition on the optical information reading apparatus side is eliminated.

According to a preferred embodiment of the invention, in the laser marking apparatus, the parameter setting section selects two of the plural printing parameters as the variable parameters, and the symbols can be printed into a matrix on the different printing conditions in which the two variable parameters are changed.

According to a preferred embodiment of the invention, in the laser marking apparatus, the identification information is the positional information on each symbol.

According to a preferred embodiment of the invention, in the laser marking apparatus, the identification information is constructed by parameter value information including a parameter value of the variable parameter, or the parameter value of the variable parameter and a parameter value of the fixed parameter.

According to a preferred embodiment of the invention, in the laser marking apparatus, the printing parameter includes at least one of a laser power, a scanning speed, a Q switch frequency, a spot variable value, and the number of printing times.

According to still another embodiment of the invention, a printing condition setting device that sets a printing condition in order to print a plural symbols having different printing conditions in a printing target with a laser marking apparatus, the printing condition setting device includes: a parameter setting section that can set at least one printing parameter to a variable parameter varying the printing condition in plural printing parameters constituting the printing conditions, and sets other printing parameters to fixed parameters; a printing condition generating section that substitutes plural different parameter values for the variable parameter set by the parameter setting section while substituting fixed values for the fixed parameters set by the parameter setting section, thereby generating the plural different printing conditions; a printing data generation section that causes a printing quality evaluation apparatus to read different piece of identification information, and sets the identification information to an identifiable symbol to generate printing data, the identification information identifying at least information on the variable parameter included in the printing condition, the identification information being previously correlated with each of the plural different printing conditions generated by the printing condition generating section; and a printing data output section that transmits the plural different symbols generated by the printing data generation section to the laser marking apparatus such that the laser marking apparatus prints the plural different symbols based on each printing condition correlated with the identification information included in the symbol. The identification information identifying the printing condition is included in each of the plural different symbols while being able to be read with the printing quality evaluation apparatus, which allows the recognition of the identification information corresponding to the symbol that is evaluated as the high printing quality by the printing quality evaluation apparatus side. As a result, the printing condition can be set by feeding back the identification information to the laser marking apparatus such that the read stability of the optical information reading apparatus is improved during the operation. Therefore, the setting of the proper printing condition can qualitatively be set irrespective of the visual checking or experience of the user.

According to still another embodiment of the invention, a printing quality evaluation apparatus that evaluates printing quality of each symbol based on captured images of plural symbols having different printing conditions, the plural symbols being printed in a printing target, the printing quality evaluation apparatus includes: an image acquiring section that acquires the captured image including each symbol printed in the printing target, the captured image being captured with resolution at which the printing quality of the symbol can be evaluated; a symbol extracting section that extracts the symbol in which the printing quality can be evaluated from the captured images acquired by the image acquiring section; a printing quality evaluation section that evaluates the printing quality of the symbol extracted by the symbol extracting section; an identification information recognition section that recognizes the identification information identifying each printing condition of the symbol, the printing condition being included in the symbol extracted by the symbol extracting section; and an evaluation output section that outputs the identification information, which is recognized by the identification information recognition section, and an evaluation result of the printing quality of the printing quality evaluation section according to the symbol extracted by the symbol extracting section. The identification information identifying the printing condition is included in each of the plural different symbols while being able to be read with the printing quality evaluation apparatus, which allows the recognition of the identification information corresponding to the symbol that is evaluated as the high printing quality by the printing quality evaluation apparatus. As a result, the printing condition can be set by feeding back the identification information to the laser marking apparatus such that the read stability of the optical information reading apparatus is improved during the operation.

According to a preferred embodiment of the invention, the printing quality evaluation apparatus further includes an evaluation display section that can display the evaluation result of the printing quality of the printing quality evaluation section and the identification information recognized by the identification information recognition section. Therefore, the user checks the evaluation display section to select the optimum identification information, and can feed back the optimum identification information to the laser marking apparatus.

According to a preferred embodiment of the invention, in the printing quality evaluation apparatus, the image acquiring section is an image capturing section that the captured image, which includes individual symbol printed in the printing target, with resolution at which the printing quality of the symbol can be evaluated, the printing quality evaluation apparatus further includes an image capturing control section that controls the image capturing section such that an image of the symbol is continuously captured while an image capturing parameter of the image capturing section is changed, the printing quality evaluation section calculates a score of read stability with respect to the symbol for a change of the image capturing parameter, and the evaluation display section displays the score and the identification information. Therefore, the user checks the score displayed on the evaluation display section and feeds back the identification information corresponding to the best score to the laser marking apparatus, so that the optimum printing condition can easily be set.

According to a preferred embodiment of the invention, in the printing quality evaluation apparatus, the evaluation display section displays a graph of the score while the image capturing control section changes the image capturing parameter. When having a look at the graph displayed on the evaluation display section, the user can easily set the optimum printing condition according to a change in brightness of the illumination or an illumination direction of the light changed by partial lighting of the illumination.

According to a preferred embodiment of the invention, in the printing quality evaluation apparatus, the evaluation display section can display the graph of the score and the captured image on an identical screen and, when one of points in the graph is selected on the identical screen, the symbol corresponding to the point in the captured image is highlighted. Therefore, when selecting the point of the score, the user can recognize the symbol in the captured image corresponding to the score.

According to a preferred embodiment of the invention, in the printing quality evaluation apparatus, the image capturing section captures an image of a specific partial region where the printing quality of at least one of the plural symbols can be evaluated, the partial region being narrower than a whole region where the plural symbols are printed. Therefore, the identification information identifying the printing condition is included in each symbol. Even if the image of the whole region is not captured, only by capturing the image of the specific partial region, the printing quality and the identification information can be output while correlated with each other.

According to a preferred embodiment of the invention, the printing quality evaluation apparatus further includes a target region setting section that specifies a target region in the captured image displayed on the evaluation display section, a user is caused to select the one or plural symbols in the target region. Therefore, the user selects only the symbol to be analyzed in the specific partial region, which allows the time necessary for the analysis to be shortened.

According to a preferred embodiment of the invention, in the printing quality evaluation apparatus, a matrix of the score can be displayed on the evaluation display section.

According to a preferred embodiment of the invention, the printing quality evaluation apparatus further includes a decoding section that decodes information included in the symbol extracted by the symbol extracting section. Therefore, for example, by directly coding the printing condition in the symbol, the information included in the symbol having the proper printing quality can be decoded to directly acquire the printing condition in which the symbol is printed. Alternatively, the link data in which the printing condition relating to the common printing parameter is coded can be read to acquire the printing condition.

According to still another embodiment of the invention, a printing condition setting program that sets a printing condition in order to print plural symbols having different printing conditions in a printing target with a laser marking apparatus, the printing condition setting program causes a computer to implement: a parameter setting function of setting at least one printing parameter to a variable parameter varying the printing condition in plural printing parameters constituting the printing conditions, and setting other printing parameters to fixed parameters; a printing condition generating function of substituting plural different parameter values for the variable parameter set by the parameter setting function while substituting fixed values for the fixed parameters set by the parameter setting function, thereby generating the plural different printing conditions; a printing data generation function of causing a printing quality evaluation apparatus to read different piece of identification information, and sets the identification information to an identifiable symbol to generate printing data, the identification information identifying at least information on the variable parameter included in the printing condition, the identification information being previously correlated with each of the plural different printing conditions generated by the printing condition generating function; and a printing data output function of transmitting the plural different symbols generated by the printing data generation function to the laser marking apparatus. The identification information identifying the printing condition is included in each of the plural different symbols while being able to be read with the printing quality evaluation apparatus, which allows the recognition of the identification information corresponding to the symbol that is evaluated as the high printing quality by the printing quality evaluation apparatus side. As a result, the printing condition can be set by feeding back the identification information to the laser marking apparatus such that the read stability of the optical information reading apparatus is improved during the operation. Therefore, the setting of the proper printing condition can qualitatively be set irrespective of the visual checking or experience of the user.

According to still another embodiment of the invention, a printing quality evaluation program that evaluates printing quality of each symbol based on captured images of plural symbols having the different printing conditions, the plural symbols being printed in the printing target, the printing quality evaluation program causes a computer to implement: an image capturing function of capturing an image including each symbol printed in the printing target, the image being captured with resolution at which the printing quality of the symbol can be evaluated; a symbol extracting function of extracting the symbol in which the printing quality can be evaluated from the image captured by the image capturing function; a printing quality evaluation function of evaluating the printing quality of the symbol extracted by the symbol extracting function; an identification information recognition function of recognizing the identification information identifying each printing condition of the symbol, the printing condition being included in the symbol extracted by the symbol extracting function; and an output function of outputting the identification information, which is recognized by the identification information recognition function, and an evaluation result of the printing quality of the printing quality evaluation function according to the symbol extracted by the symbol extracting function. The identification information identifying the printing condition is included in each of the plural different symbols while being able to be read with the printing quality evaluation apparatus, which allows the recognition of the identification information corresponding to the symbol that is evaluated as the high printing quality by the printing quality evaluation apparatus. As a result, the printing condition can be set by feeding back the identification information to the laser marking apparatus such that the read stability of the optical information reading apparatus is improved during the operation.

According to still another embodiment of the invention, a computer-readable recording medium is in which the program is stored. The recording medium includes magnetic disks, optical disks, magneto-optical disks, and semiconductor memories, such as CD-ROM, CD-R, CD-RW, a flexible disk, a magnetic tape, MO, DVD-ROM, DVD-RAM, DVD-R, DVD+R, DVD-RW, DVD+RW, Blu-ray, and HD DVD (AOD), in which the program is stored. The program includes not only the program that is distributed while stored in the recording medium, but also the program that is distributed while downloaded through a network line such as the Internet. The recording medium also includes an instrument in which the program can be recorded, for example, a general-purpose or dedicated instrument in which the program is implemented while being able to be executed in the form of software or firmware. Each piece of processing or each function included in the program may be executed by program software that can be executed by the computer. Processing of each unit may be executed by hardware such as a predetermined gate array (such as an FPGA and an ASIC) or the form in which the program software and a partial hardware module that constructs a part of the element are mixed.

BRIEF DESCRIPTION OF THE DRAWINGS

FIG. 42 is a view illustrating a state in which scores are displayed in a matrix shape in each element of a sample printing pattern;

FIG. 43 is a view illustrating the score distribution state that is displayed into the contour line;

FIG. 50 is a view illustrating a state in which the scores are two-dimensionally arrayed;

FIG. 51 is a schematic diagram illustrating a sample printing pattern used to print character string information;

DETAILED DESCRIPTION OF PREFERRED EMBODIMENTS

Figure 1:
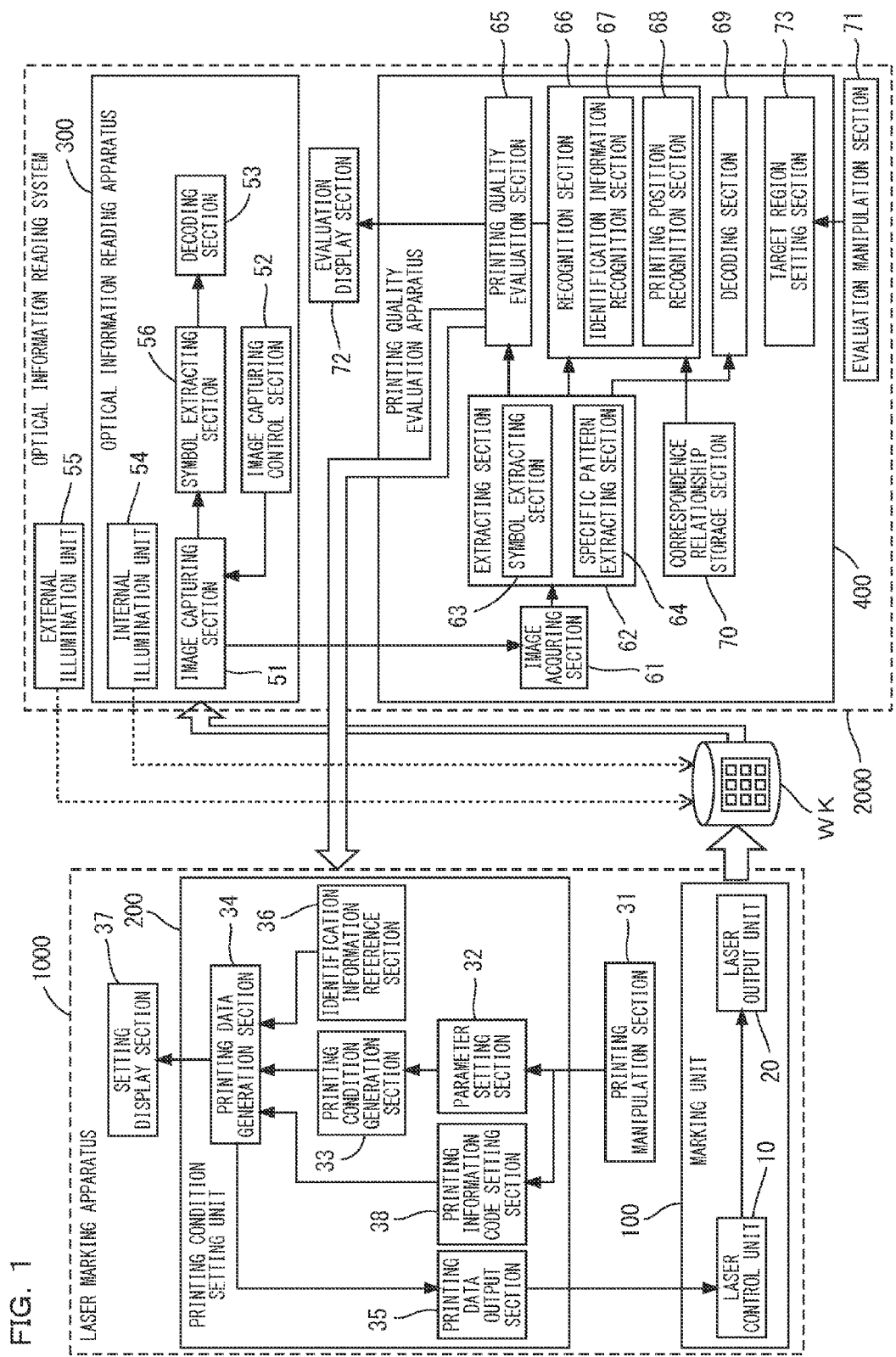
FIG. 1 is a block diagram illustrating a printing quality evaluation system according to a first embodiment of the invention.

Hereinafter, preferred embodiments of the invention will be described with reference to the drawings. However, the following embodiments demonstrate a printing quality evaluation system, a laser marking apparatus, a printing condition setting device, a printing quality evaluation apparatus, a printing condition setting program, a printing quality evaluation program, and a computer-readable recording medium, which implement the technical thought of the invention. In the invention, the printing quality evaluation system, the laser marking apparatus, the printing condition setting device, the printing quality evaluation apparatus, the printing condition setting program, the printing quality evaluation program, and the computer-readable recording medium are not limited to the following embodiments. Components described in claims of the invention are not limited to components of the embodiments. The invention is not limited to a size, a material, a shape, and a relative disposition of a component described in the embodiment unless otherwise noted. In the drawings, sometimes the size of the component and a positional relationship between the component are exaggerated for the purpose of the clear description. In the follow description, the same or homogeneous component is designated by the same name or numeral, and the detailed description is omitted as appropriate. In each element constituting the invention, plural elements are constructed by the same component, and the one component may act as the plural elements. On the other hand, the function of the one component may be implemented while divided into plural components.

The printing quality evaluation system, the laser marking apparatus, the printing condition setting device, and the printing quality evaluation apparatus, which are used in the embodiments of the invention, and a computer, a printer, an external storage device, and other peripherals, which are used to perform pieces of processing such as a manipulation, control, and display, are electrically, magnetically, or optically connected to conduct communication with each other through serial connection and parallel connection such as IEEE1394, RS-232x, RS-422, RS-423, RS-485, and USB or a network such as 10BASE-T, 100BASE-TX, and 1000BASE-T. The connection is not limited to the physical connection in which a wire is used, but wireless connection, such as a wireless LAN such as IEEE802.1x and Bluetooth (registered trademark), in which a radio wave, an infrared ray, and optical communication are utilized. For example, a memory card, a magnetic disk, an optical disk, a magneto-optical disk, and a semiconductor memory can be used as the recording medium in which data exchange and storage of a setting are performed. In the specification, the printing quality evaluation system, the laser marking apparatus, the printing condition setting device, and the printing quality evaluation apparatus include not only main bodies of the printing quality evaluation system, the laser marking apparatus, the printing condition setting device, and the printing quality evaluation apparatus, but also a printing quality evaluation system in which the printing quality evaluation system, the laser marking apparatus, the printing condition setting device, and the printing quality evaluation apparatus and the computer and peripheral devices such as the external storage device are combined.

In the specification, the printing quality evaluation system, the laser marking apparatus, the printing condition setting device, and the printing quality evaluation apparatus are not limited to a system that performs the laser marking, the printing condition setting, and the printing quality evaluation, and an apparatus or a method for performing pieces of processing, such as the input/output, display, calculation, and communication, which relate to the laser marking, the printing condition setting, and the printing quality evaluation, in hardware manner. The invention also includes an apparatus and a method for implementing the processing in a software manner. For example, an apparatus and a system, in which a program, software, a plug-in, an object, a library, an applet, a compiler, a module, a macro running on a specific program, and the like are incorporated in a general-purpose circuit or computer to be able to perform image generation and processing associated therewith also correspond to the printing quality evaluation system, the laser marking apparatus, the printing condition setting device, and the printing quality evaluation apparatus of the invention. In the specification, the computer includes a workstation, a terminal, a portable electronic device, and other electronic devices in addition to a general-purpose or dedicated electronic computer. In the specification, the program is not limited to a program that is solely used, but the program can be used in a mode in which a program acts as a part of a specific computer program, software, service, and the like, a mode in which a program is called to act as needed basis, a mode in which a program is provided as service in an environment of an OS and the like, a mode in which a program runs while always remaining in the environment, a mode in which a program runs a background, and a mode in which a program is positioned as another support program.

In the specification, the printing means not only cutting a surface of a printing target, but also processing of changing a color of a material by heat, namely, the case in which the surface of the printing target is not necessarily removed. The printing content is not limited to a character, a numeric character, a sign, a graphic, and the like, but the printing content includes a symbol such as a barcode, a two-dimensional code, and the like. Drawing the printing content on the surface of the printing target through processing such as stamping and tarnishing is called printing. Because the laser marking apparatus is an apparatus that irradiates a target with a laser beam to perform machining such as the printing, a use application of the laser marking apparatus is not limited to marking such as the printing, but the laser marking apparatus can be applied to other pieces of machining such as pre-treatment machining for forming a base of the surface of the printing target, the stamping, the cutting, drilling, trimming, scribing, and a surface treatment.

First Embodiment

Figure 2:
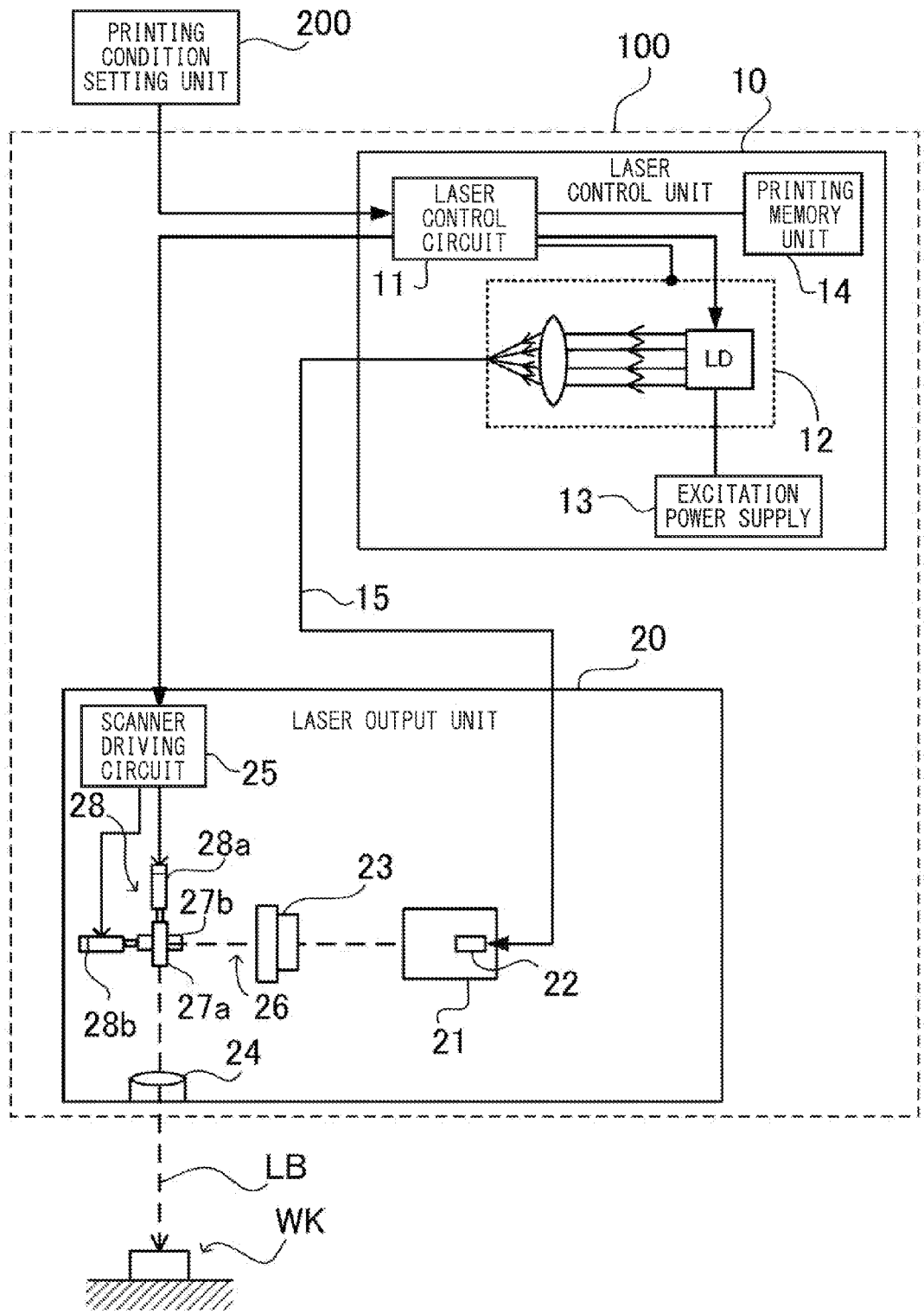
FIG. 2 is a block diagram illustrating a configuration of a laser machining apparatus.

FIG. 1 is a block diagram illustrating a printing quality evaluation system according to a first embodiment of the invention. The printing quality evaluation system of FIG. 1 includes a laser marking apparatus 1000 that prints a symbol to a workpiece WK of a printing target and an optical information reading system 2000 that reads the printed symbol to evaluate printing quality.
(Laser Marking Apparatus 1000)
The laser marking apparatus 1000 includes a marking unit 100 that constitutes a marking section and a printing condition setting unit 200 that constitutes a printing condition setting section. As illustrated in FIG. 1, the marking unit 100 includes a laser control unit 10 and a laser output unit 20. The printing condition setting unit 200 includes a parameter setting section 32, a printing condition generating section 33, a printing data generation section 34, a printing data output section 35, a printing information code setting section 38, and an identification information reference section 36.
(Marking Unit 100)
FIG. 2 is a block diagram illustrating a configuration of the marking unit 100. The marking unit 100 of FIG. 2 includes the laser control unit 10 and the laser output unit 20. In the marking unit 100, according to a printing condition set with the printing condition setting unit 200, a laser control circuit 11 of the laser control unit 10 transmits excitation light generated with a laser excitation unit 12 to a laser oscillating unit 21 of the laser output unit 20, and the laser control unit 11 irradiates a laser medium 22 constituting the laser oscillating unit 21, thereby generating a laser oscillation. The laser oscillation light is output from an outgoing end surface of the laser medium 22, a beam diameter is expanded with a beam expander 23, and the laser oscillation light is guided to a laser beam scanning unit 26. The laser beam scanning unit 26 reflects a laser beam LB and deflects the laser beam LB in a desired direction, and the surface of the workpiece WK is scanned with the laser beam LB output from a light focusing unit 24, thereby performing the machining such as the printing,
(Laser Control Unit 10)
The laser control unit 10 includes the laser control circuit 11, a printing memory unit 14, the laser excitation unit 12, and an excitation power supply 13. Setting contents such as the printing condition set with the printing condition setting unit 200 described later are stored in the printing memory unit 14. The laser control circuit 11 reads the setting contents from the printing memory unit 14 as needed basis, operates the laser excitation unit 12 based on a printing signal corresponding to the printing condition, and excites the laser medium 22 of the laser output unit 20. A semiconductor memory such as a RAM and a ROM can be used as the printing memory unit 14. Not only the printing memory unit 14 is incorporated in the laser control unit 10, but also a semiconductor memory card such as a PC card and a SD Card™ and a memory card such as a card-type hard disk, which can be inserted and removed, can be used as the printing memory unit 14. The printing memory unit 14 constructed by the memory card can easily be rewritten with an external device such as a computer. A content set with the computer is written in the memory card, and the memory card is set to the laser control unit 10, which allows the setting to be performed without connecting the printing condition setting unit 200 to the laser control unit 10. Particularly, in the semiconductor memory, data is read and written at high speed, and mechanically operating portion is eliminated. Therefore, the semiconductor memory has resistance to a vibration and the like, and the semiconductor memory can prevent a data loss accident caused by a crash unlike the hard disk.

The laser control circuit 11 outputs a scanning signal to the laser beam scanning unit 26 in order to scan the workpiece WK with the laser beam LB, which is oscillated by the laser medium 22 such that the set printing is performed, and the scanning signal operates the laser beam scanning unit 26 of the laser output unit 20. The excitation power supply that is of a constant-voltage power supply applies a predetermined voltage to the laser excitation unit 12. The printing signal that controls a printing operation is a PWM signal that switches ON/OFF of the laser beam LB according to HIGH/LOW of the printing signal, and one pulse of the printing signal corresponds to one pulse of the oscillated laser beam LB. In the PWM signal, laser intensity is decided based on a duty ratio according to a frequency of the PWM signal. Alternately, the laser intensity may be changed by a scanning speed based on the frequency.
(Laser Output Unit 20)
The laser output unit 20 includes the laser oscillating unit 21. The laser oscillating unit 21 that generates the laser beam LB includes the laser medium 22, an output mirror and a total reflection mirror, which are disposed opposite each other while separated from each other with a predetermined distance along an optical path of stimulated emission light emitted from the laser medium 22, an aperture that is disposed between the output mirror and the total reflection mirror, and a Q switch. The stimulated emission light emitted from the laser medium 22 is amplified by multiple reflection between the output mirror and the total reflection mirror, and mode selection is performed by the aperture while the stimulated emission light is passed and interrupted in a short period by the operation of the Q switch, thereby outputting the laser beam LB through the output mirror. The laser output unit 20 of FIG. 2 includes the laser medium 22 and the laser beam scanning unit 26. The laser oscillation of the laser medium 22 is generated by exciting the laser medium 22 with the laser excitation light incident from the laser excitation unit 12 through an optical fiber cable 15. The laser medium 22 has an excitation method of what is called end pumping in which the laser medium 22 is excited by inputting the laser excitation light from one of the end surfaces of the rod-shaped laser medium 22, and emits the laser beam LB from the other end surface.
(Laser Medium 22)
In the first embodiment, a rod-shaped solid-state laser medium made of $Nd:YVO_4$ is used as the laser medium 22. A wavelength of an excitation semiconductor laser for solid-state laser medium is set to 809 nm that is of a center wavelength of an absorption spectrum of $Nd:YVO_4$. Alternatively, for example, YAG, LiSrF, LiCaF, YLF, NAB, KNP, LNP, NYAB, NPP, and GGG, into which a rare-earth element is doped, can be used as the solid-state laser medium. The wavelength of the output laser beam can be changed to an arbitrary wavelength by a combination of the solid-state laser medium and a wavelength conversion element.

The wavelength conversion element that performs only the wavelength conversion may be used with no use of the solid-state laser medium, in other words, without constructing a resonator that oscillates the laser beam. In this case, the wavelength conversion is performed to the output light of the semiconductor laser. Examples of the wavelength conversion element include KTP(KTiPO$_4$), an organic nonlinear optical material and an inorganic nonlinear optical material such as KN(KNbO$_3$), KAP(KAsPO$_4$), BBO, and LBO, and a bulk-type periodically polled element such as LiNbO$_3$ (Periodically Polled Lithium Niobate (PPLN)) and LiTaO$_3$. The semiconductor laser for excitation light source of an up-conversion laser in which a fluoride fiber into which the rare-earth element such as Ho, Er, Tm, Sm, and Nd is doped can be used. Thus, in the first embodiment, various laser generation sources can properly be used.

The laser oscillating unit is not limited to the solid-state laser, but gas laser in which gas such as CO$_2$, helium-neon, argon, and nitrogen is used as a medium may be used as the laser oscillating unit. For example, in the case that a carbon dioxide gas laser is used, the laser oscillating unit is filled with a carbon dioxide gas (CO$_2$), electrodes are incorporated in the laser oscillating unit, and the carbon dioxide gas in the laser oscillating unit is excited to generate the laser oscillation based on a printing signal provided from the laser control unit.

(Laser Beam Scanning Unit 26)

The laser output unit 20 includes the laser beam scanning unit 26 in order to scan the laser output light on the workpiece. As illustrated in FIG. 2, the laser beam scanning unit 26 includes an X-axis scanner 27a and a Y-axis scanner 27b, which constitutes a pair of galvano-mirrors, and galvano-motors 28a and 28b each of which fixes the galvano-mirror to a turning shaft to turn the galvano-mirror. The galvano-motor 28 is driven by a scanner driving circuit 25. The X-axis and Y-axis scanners 27a and 27b are disposed orthogonal to each other, and can reflect the laser beam in an X-direction and a Y-direction to scan the workpiece with the laser beam. As illustrated in FIG. 2, the light focusing unit 24 is provided below the laser beam scanning unit 26. The light focusing unit 24 is constructed by a light focusing lens, and an fθ lens is used as the light focusing lens.

Figure 3:
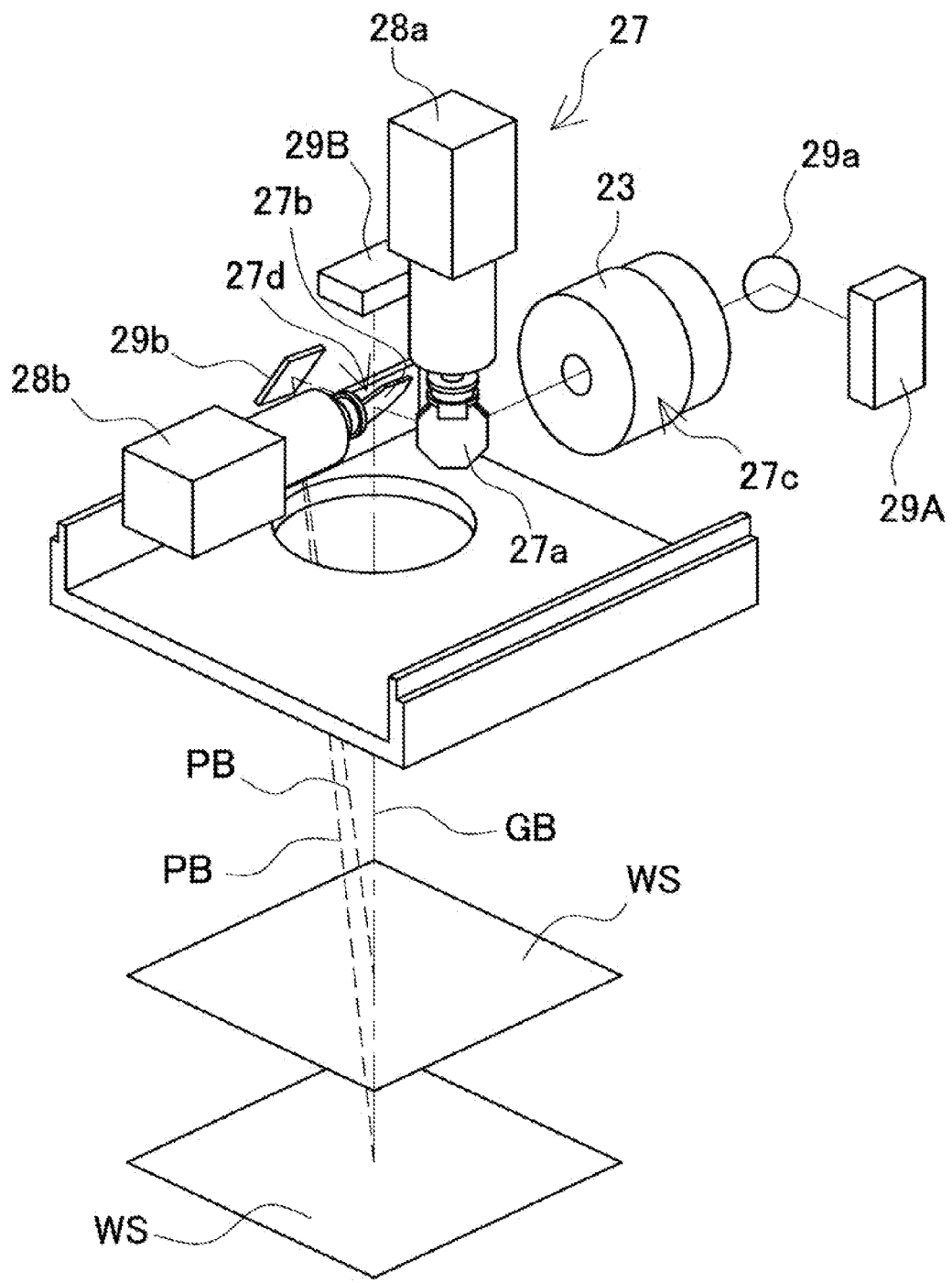
FIG. 3 is a perspective view illustrating disposition states of an X-axis scanner and a Y-axis scanner in a scanning unit.
Figure 4:
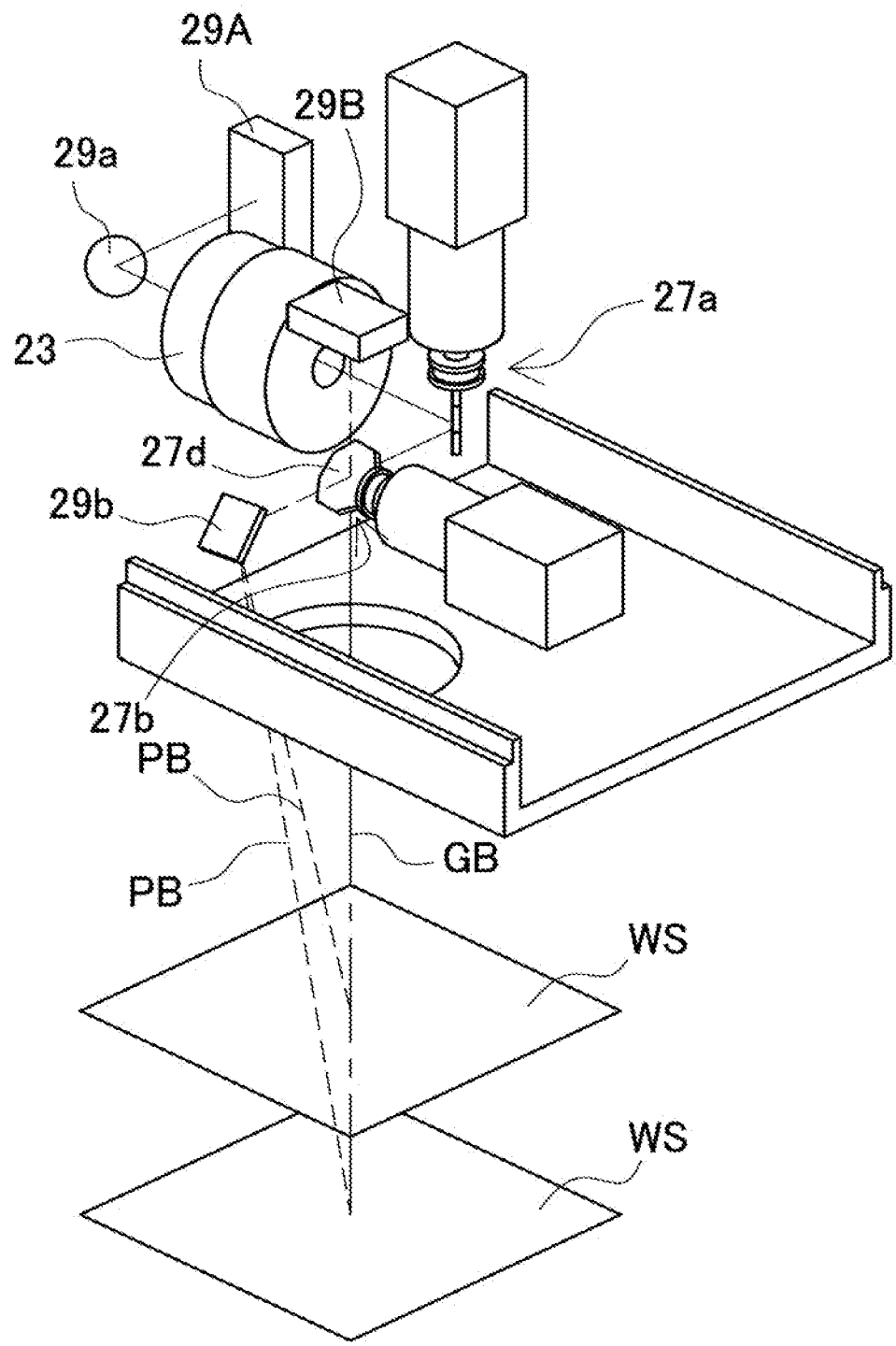
FIG. 4 is a perspective view illustrating the disposition states of the X-axis scanner and the Y-axis scanner of FIG. 3 when viewed from a backside direction.

The laser output unit 20 can scan the workpiece in not only the XY direction, but also a Z-direction (height direction). FIGS. 3 and 4 are perspective views illustrating an example of a laser beam scanning system that can three-dimensionally perform the printing. The laser beam scanning system of FIGS. 3 and 4 includes the beam expander 23 in which a Z-axis scanner whose optical path is matched with that of the laser oscillating unit that emits the laser beam is incorporated, the X-axis scanner 27a, and the Y-axis scanner 27b that is disposed so as to be orthogonal to the X-axis scanner 27a. In the laser beam scanning system, a working area WS is two-dimensionally scanned with the laser beam emitted from the laser oscillating unit with the X-axis scanner 27a and the Y-axis scanner 27b, and a working distance, namely, a focal distance can be adjusted in the height direction with the Z-axis scanner 27c. Therefore, the printing machining can three-dimensionally be performed.

Each of the X-axis scanner 27a and the Y-axis scanner 27b includes the galvano-mirror that is of the total reflection mirror as a reflecting surface of the light, the galvano-motor that fixes the galvano-mirror to the turning shaft to turn the turning shaft, and a position detecting unit that detects a rotation position of the turning shaft and outputs the rotation position as a position signal. Each scanner is connected to a scanner driving unit that drives the scanner. The scanner driving unit is connected to a scanner control unit, and the scanner driving unit receives a control signal controlling the scanner from the scanner control unit, and drives the scanner based on the control signal. For example, based on the control signal, the scanner driving unit adjusts a driving current that drives the scanner. The scanner driving unit includes an adjusting mechanism that adjusts a time change of a rotation angle of each scanner with respect to the control signal. The adjusting mechanism is constructed by semiconductor components, such as a variable resistor, which adjust each parameter of the scanner driving unit.

(Distance Pointer)

The laser beam scanning system includes a guide light source 29A that emits a guide laser beam GB and a half mirror 29a that is of a mode of a guide laser beam optical system, and the guide light source 29A and the half mirror 29a act as a distance pointer. The laser beam scanning system also includes a pointer light source 29B that emits a pointer light beam PB, a pointer scanner mirror 27d that is of a third mirror formed in a rear surface of the Y-axis scanner 27b, and a fixed mirror 29b that reflects the pointer light beam PB, which is incident from the pointer light source 29B and reflected by the pointer scanner mirror 27d, to irradiate the focal position with the pointer light beam PB. The pointer light source 29B, the pointer scanner mirror 27d, and the fixed mirror 29b act as a pointer light beam adjusting system. The distance pointer is adjusted such that a center of a guide pattern drawn with the guide laser beam GB is irradiated with the pointer light beam PB, which allows the distance pointer to indicate the focal position of the laser beam LB.

(Z-Axis Scanner 27c)

On the other hand, the Z-axis scanner 27c is constructed by the beam expander 23 that adjusts a spot diameter of the laser beam LB to control the focal distance. As illustrated in FIGS. 3 and 4, the beam expander 23 is disposed in a preceding stage of the galvano-mirror in order to effectively focus the laser beam LB into a small spot, and the beam expander 23 can adjust the focal position of the laser beam LB while adjusting the beam diameter of the laser beam LB emitted from the laser oscillating unit. In the first embodiment, the laser beam scanning system that can perform the three-dimensional printing is described. However, the invention can be also applied to a laser marking apparatus that can perform two-dimensional printing.

(Printing Condition Setting Unit 200)

The printing condition setting unit 200 will be described below with reference to FIG. 1. The printing condition setting unit 200 is connected to the laser control unit 10, and the printing condition setting unit 200 inputs the settings necessary to manipulate the laser marking apparatus 1000, and transmits the settings to the laser control unit 10. The setting contents are operating conditions of the laser marking apparatus 1000, namely, the printing condition, a specific printing content, and the like. At this point, printing parameters such as a laser power, a scanning speed, a Q switch frequency, a spot variable value, the number of printing times are mainly set as the printing conditions. The laser power is an output of the laser beam, the scanning speed is a laser beam scanning speed, the Q switch frequency is a frequency at which the Q switch is operated. The spot variable value is a parameter in which the spot diameter of the focal point is changed by deviating the focal position of the laser beam in the height direction from the surface of the workpiece. The number of printing times specifies the number of times which the same point is repeatedly canned.

Figure 5:
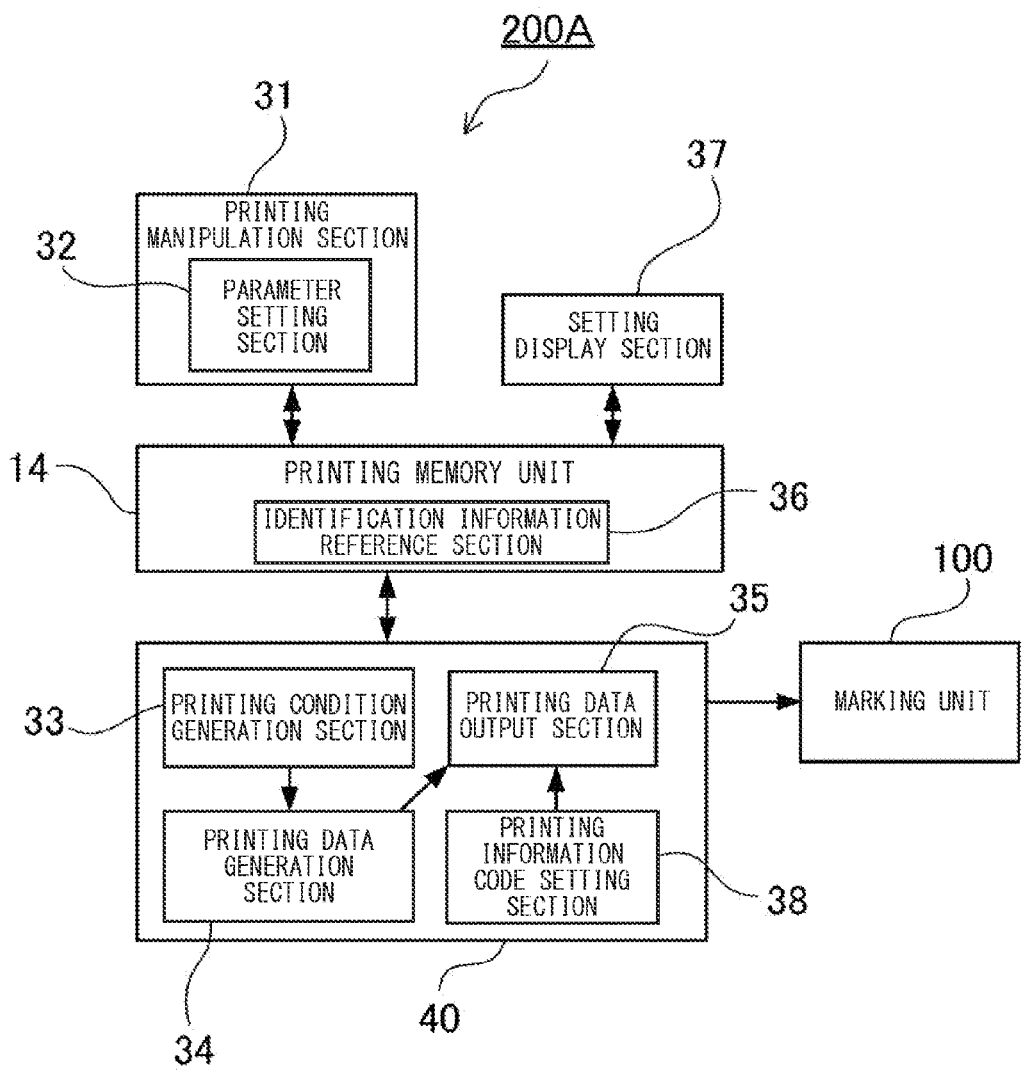
FIG. 5 is a block diagram illustrating a printing condition setting unit.

FIG. 5 is a block diagram illustrating the printing condition setting unit 200. The printing condition setting unit 200 of FIG. 5 includes a printing manipulation section 31, a printing calculation unit 40 that performs the setting of the printing condition and calculation of a tilt angle based on information input from the printing manipulation section 31, a setting display section 37 that displays the setting content and a calculation result, and the printing memory unit 14 in which various pieces of setting data are stored. The printing manipulation section 31 implements a function of setting the printing parameters of the printing conditions. In addition to the output of the laser beam and the scanning speed, for example, the printing parameters include the focal position of the laser beam, namely, a distance (height) from the workpiece to the laser beam outgoing surface. The printing memory unit 14 is one in which pieces of information such as the printing parameters set by the printing manipulation section 31 are stored, and the storage medium such as the fixed storage medium or the semiconductor memory can be used as the printing memory unit 14. The printing memory unit 14 acts as the identification information reference section 36 of FIG. 1 to be able to retain a correspondence table.

The printing calculation unit 40 implements the printing condition generating section 33, the printing data generation section 34, the printing data output section 35, and the printing information code setting section 38. The printing condition generating section 33 generates a plural sets of printing conditions each of which is changed within a specified range and a specified width from the printing parameters specified in certain ranges by the parameter setting section 32. The printing data generation section 34 generates the printing data to each of the plural printing conditions generated by the printing condition generating section 33. The printing data output section 35 outputs the finally-set printing conditions to a predetermined output destination. The printing information code setting section 38 sets printing information code in which the printing condition is encoded. The printing calculation unit 40 is constructed by an LSI or an IC. The setting display section 37 is a monitor such as an LCD and a cathode-ray tube. In addition to providing a dedicated display, a monitor of a computer may be used as the setting display section 37.

The printing manipulation section 31 is an input device such as a keyboard, a mouse, and a console. The setting display section 37 may act as both the printing manipulation section 31 and an evaluation display section 72 described later using the touch panel type setting display section 37. Therefore, the settings necessary for the laser marking apparatus can be performed by the setting section without connecting the computer to the external device.

Figure 6:
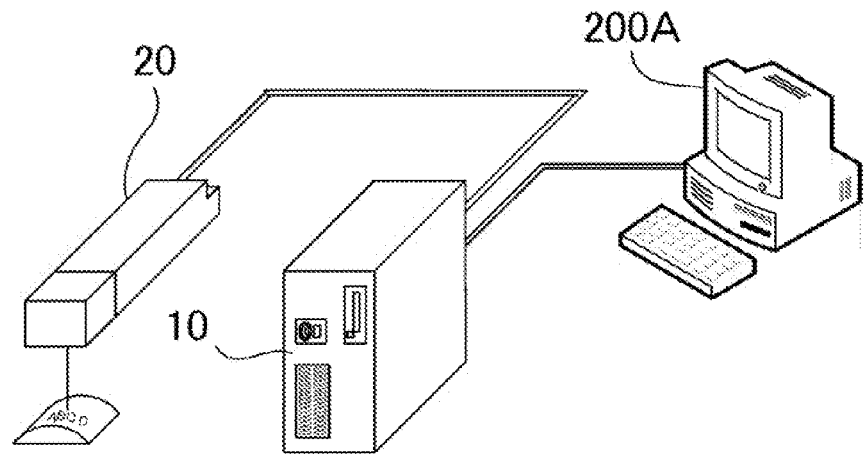
FIG. 6 is a schematic diagram illustrating a configuration a printing condition setting device is constructed by a computer in which a printing condition setting program is installed.

In FIG. 5, a printing condition setting device 200A is constructed by the dedicated hardware. Alternatively, the components of the printing condition setting device 200A may be constructed by software. Particularly, as illustrated in FIG. 6, a general-purpose computer can act as the printing condition setting device 200A by installing a printing condition setting program in the general-purpose computer. In FIG. 5, the marking unit 100 and the printing condition setting unit 200 are separately provided. Alternatively, the marking unit 100 and the printing condition setting unit 200 may be integrated. For example, the laser printing condition setting function may be added to the laser marking apparatus. An optical information reading section and a printing quality evaluation section 65 described later, which are included in the optical information reading system, may properly be integrated.

(Optical Information Reading System 2000)

On the other hand, as illustrated in FIG. 1, the optical information reading system 2000 includes an optical information reading apparatus 300 and a printing quality evaluation apparatus 400. In the optical information reading system 2000, the optical information reading apparatus 300 captures an image of a symbol printed in the workpiece with the laser marking apparatus 1000 under a common image capturing condition, and the printing quality evaluation apparatus 400 acquires the captured image. The printing quality evaluation apparatus 400 extracts the symbol that can be read from the captured image, and evaluates the read stability of the extracted symbol.

(Optical Information Reading Apparatus 300)

The optical information reading apparatus 300 of FIG. 1 includes an image capturing section 51 that captures the image of the symbol provided to the workpiece, an image capturing control section 52 that controls the image capturing section 51, a symbol extracting section 56 that extracts the symbol from the image captured by the image capturing section 51, a decoding section 53 that decodes information included in the symbol extracted by the symbol extracting section 56, and an internal illumination unit 54 that illuminates the workpiece. An external illumination unit 55 can be added as needed basis.

The optical information reading apparatus 300 is one that reads optical information such as a barcode and a two-dimensional code, an optical sign, and a character string (collectively referred to as a "symbol") to decode or recognize the information. For example, the optical information reading apparatus 300 is a barcode reader, a two-dimensional code reader, and an OCR. The external illumination unit 55 can be connected to the optical information reading apparatus 300 as needed basis. Generally the illumination is necessary for the two-dimensional code reader while the illumination is not necessary for the barcode reader. For example, the external illumination unit 55 is a ring illumination. The external illumination unit 55 illuminates the workpiece in conjunction with the internal illumination unit 54 incorporated in the optical information reading apparatus 300, or only the external illumination unit 55 illuminates the workpiece while the operation of the internal illumination unit 54 is stopped.

The optical information reading apparatus 300 is placed in a conveying route of commercial goods or goods, in which the symbol is printed or stamped, in a factory and a distribution base. During operation, the optical information reading apparatus 300 reads the information recorded in the symbol printed in commercial goods or goods, and the information is transferred to the host computer to analyze the information. Examples of the two-dimensional code include a QR code, a micro QR code, a Data Matrix (Data code, a Veri code, an Aztec code, PDF417, and a Maxi code. There are a stack type two-dimensional code and a matrix type two-dimensional code, and the invention can be applied to both the types of the two-dimensional codes. In the invention, the symbol of a read target is not limited to the two-dimensional code. The invention can be used for a one-dimensional code, other data symbols, and the OCR that performs character recognition.

(Printing Quality Evaluation Apparatus 400)

As illustrated in FIG. 1, the printing quality evaluation apparatus 400 includes an image acquiring section 61 that acquires the captured image, an extracting section 62, a printing quality evaluation section 65, a recognition section 66, a correspondence relationship storage section 70, an evaluation manipulation section 71, an evaluation display section 72, and a target region setting section 73. The evaluation display section 72 is a display or a monitor, and the evaluation manipulation section 71 is an input device that performs various manipulations and settings. The target region setting section 73 specifies a target region onto the captured image displayed on the evaluation display section 72. The extracting section 62 includes a symbol extracting section 63 that extracts the symbol and a specific pattern extracting section 64 that extracts a specific pattern. The recognition section 66 includes an identification information recognition section 67 that recognizes identification information and a printing position recognition section 68 that recognizes a printing position. In the case that the printing condition setting device 200A and the printing quality evaluation apparatus is constructed by the same computer in which the printing condition setting program and a printing quality evaluation program are installed, the monitor of the computer acts as both the setting display section 37 and the evaluation display section 72.

(Image Acquiring Section 61)

Figure 7:
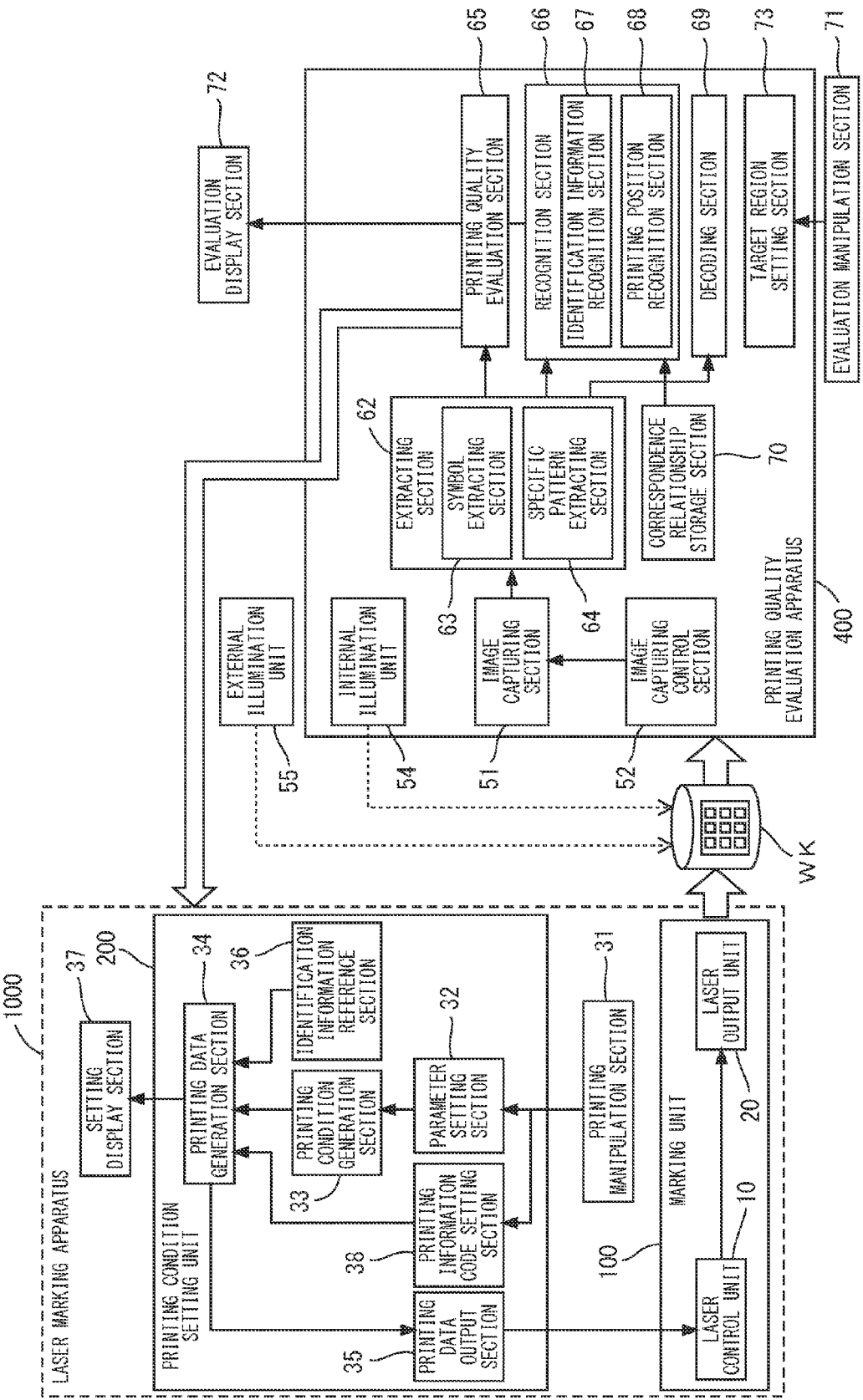
FIG. 7 is a block diagram illustrating a printing quality evaluation system according to a modification.

The image acquiring section 61 acquires the captured image including each symbol printed in the printing target with resolution at which printing quality of the symbol can be evaluated. For example, the image acquiring section 61 is an interface instrument (such as a wired or wireless communication interface) that acquires the image captured with the optical information reading apparatus 300 connected to the printing quality evaluation apparatus 400 or a reading apparatus (such as a DVD drive and a memory card reader) that reads a medium in which the captured image is recorded. As illustrated in FIG. 7, the image capturing section 51 such as a CCD camera may be provided in the printing quality evaluation apparatus 400 to directly capture the image. In this case, the image acquiring section 61 constitutes the image capturing section 51.

For example, a personal computer 3 in which the printing quality evaluation program is installed may act as the printing quality evaluation apparatus 400. In FIG. 1, the optical information reading apparatus 300 and the printing quality evaluation apparatus 400 are separately provided. Alternatively, the optical information reading apparatus 300 and the printing quality evaluation apparatus 400 may be integrated. The printing quality evaluation apparatus 400 is not limited to the evaluation of code printing in which the symbol is printed or stamped in goods, but the printing quality evaluation apparatus 400 may be applied to evaluation when the character string is read with the OCR. Generally the printing quality evaluation apparatus 400 is connected only when the printing quality is evaluated. When the proper printing condition is decided from the evaluation of the printing quality, the printing quality evaluation apparatus 400 is detached, and the symbol reading working is performed only with the optical information reading apparatus 300 during the actual operation. The optical information reading apparatus and the printing quality evaluation apparatus may integrally be configured such that the printing quality evaluation function is implemented in the optical information reading apparatus. That is, the optical information reading apparatus 300 may have the functions of the extracting section 62 such as the symbol extracting section 63 and the specific pattern extracting section 64. In FIG. 1, the laser marking apparatus 1000 includes the printing condition setting unit 200 and the marking unit 100 by way of example. Alternatively, the printing condition setting unit and the marking unit may integrally be configured, or the printing condition setting unit and the marking unit may separately be configured.

(Image Capturing Sections 51)

The image capturing section 51 captures the image including each symbol printed in the workpiece with the resolution at which the printing quality of the symbol can be evaluated. The image capturing section 51 includes an image capturing element, such as a CMOS and a CCD, which is of an optical reading element. The optical information of the barcode or the QR code can be read to a micro region with high resolution by increasing the distance between the image capturing element and a lens assembly.

(Image Capturing Control Sections 52)

The image capturing section 51 is controlled by the image capturing control section 52. The image capturing control section 52 continuously captures the image of the symbol while image capturing parameters of the image capturing section 51 are changed. Examples of the image capturing parameters include brightness, a filter, and a lighting pattern. Only one image capturing parameter may be changed, or an index of read easiness may be obtained by changing the plural image capturing parameters.

(Printing Quality Evaluation Sections 65)

The printing quality evaluation section 65 evaluates the printing quality of the symbol extracted by the symbol extracting section 63. Specifically, the printing quality evaluation section 65 calculates a score of the read stability relative to the changes of the image capturing parameters of the symbol, and the score and the identification information are displayed on the evaluation display section 72. As described above, in the printing quality evaluation apparatus 400, a reading trial is performed while the image capturing parameters are changed with respect to a sample code SC in the captured image, and the obtained score of the read stability of the sample code SC is displayed, which allows a suggestion of the printing condition setting to be provided to a user. Therefore, the user checks the score displayed on the evaluation display section 72 and feeds back the identification information corresponding to the best score to the laser marking apparatus 1000, so that the optimum printing condition can easily be set.

(Printing Condition Setting Method)

A procedure for setting the printing conditions of the laser marking apparatus 1000 using the printing condition setting device 200A will be described below with reference to user interface screens of FIGS. 8 and 10 to 14. A configuration in which the printing condition setting program is installed in the computer of FIG. 6 is used as the printing condition setting device 200A. The screens illustrated in FIGS. 8 and 10 to 14 are the user interface screens of the printing condition setting program displayed on the setting display section 37 of FIG. 1.

Figure 8:
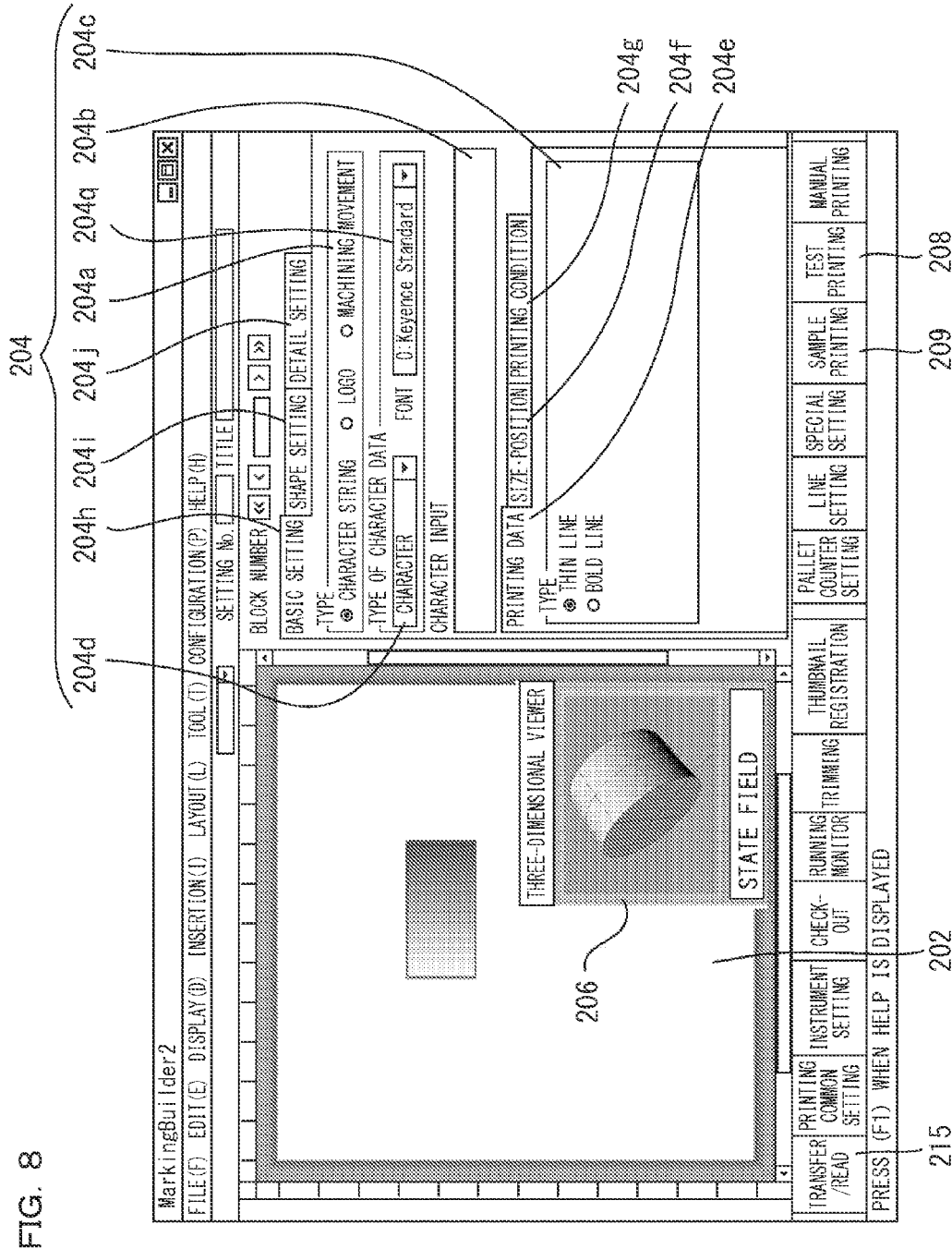
FIG. 8 is a view illustrating a user interface screen of the printing condition setting program.

FIG. 8 illustrates the user interface screen of the printing condition setting program that sets the printing contents. Referring to FIG. 8, an edit display field 202 in which an image of a machining pattern printed on the workpiece is provided on the left of the screen, and a printing pattern input field 204 in which various pieces of data are specified as specific machining conditions is provided on the right of the screen. In the printing pattern input field 204, a "basic setting" tab 204h, a "shape setting" tab 204i, and a "detail setting" tab 204j can be changed as a tab that selects setting items. In FIG. 8, the "basic setting" tab 204h is selected, and a machining type specifying field 204a, a character data specifying field 204d, a character input field 204b, and a detail setting field 204c are provided in the "basic setting" tab 204h. In the machining type specifying field 204a, a printing pattern including the character string or the symbol and the image such as a logo, a pattern, and a graphic is specified as the type of the machining pattern, or whether the operation is performed as the machine is specified. In FIG. 8, the character string, the logo, the graphic, and the operation of the machine are selected from the machining type specifying field 204a by radio buttons. In the character data specifying field 204d, the class of the character data is specified. In the character data specifying field 204d, one of the character, the barcode, the two-dimensional code, and an RSS/composite code (CC) is selected from a pull-down menu. The more detail class is selected in a class specifying field 204q according to the class of the selected character data. The class of a font when the character is selected, the class of the barcode, such as CODE 39, ITF, 2 of 5, NW7, JAN, and Code 28, is specified when the barcode is selected, the class of the two-dimensional code, such as the QR code, a micro QR code, and Data Matrix, is specified when the two-dimensional code is selected, and the class of the RSS code or the class of the RSS composite code, such as RSS-14, RSS-14 CC-A, RSS Stacked, RSS Stacked CC-A, RSS Limited, and RSS Limited CC-A, is specified when the RSS/RSS composite code is selected. In the character input field 204b, character information to be printed is input. When the characters are selected in the character data specifying field 204d, the input characters are directly printed as the character string. On the other hand, the machining pattern in which the character string input according to the class of the selected symbol is encoded is generated when the symbol is specified. In addition to a machining condition setting unit 3C, a machining generation unit may generate the machining pattern. In the first embodiment, the printing calculation unit 40 generates the machining pattern. In the detail setting field 204c, the details of the printing conditions are specified by switching a "printing data" tab 204e, a "size position" tab 204f, and a "printing condition" tab 204g.

A preview of an edit state of the printing data is displayed in the edit display field 202. FIG. 8 illustrates a two-dimensional view (plan view of a horizontally-placed cylinder solid) of the workpiece WK, and the user can arbitrarily change a display scale factor, an attitude, and a disposition of the workpiece by the mouse manipulation or coordinate specification. In the edit display field 202, scrolling display of the screen can be performed according to the displayed size. The printing contents to be printed are set onto the workpiece, and displayed so as to be pasted on the workpiece. The set printing contents are displayed as a blockish printing block, and the movement or the change of the printing condition are possible in units of blocks. A block number is added to each printing block such that the printing blocks are distinguished from each other. The user can add any comment to each printing block such that the printing contents can be distinguished or discriminated from each other.

The three-dimensional printing data can sterically be displayed. In FIG. 8, a three-dimensional viewer field 206 in which the three-dimensional printing data is sterically displayed is displayed in the lower right of the edit display field 202. A perspective view of the cylinder solid that is of the workpiece WK is displayed in the three-dimensional viewer field 206. In the workpiece WK displayed in the three-dimensional viewer field 206, preferably the manipulation to change the attitude, the angle, and the scale factor and a rotation manipulation can be performed. For example, the workpiece WK is rotated or moved by directly dragging the workpiece WK from the three-dimensional viewer field 206. In the three-dimensional viewer field 206, ON/OFF of the display can be performed. In addition to displaying the three-dimensional viewer on another screen, for example, the display of the edit display field may be changed in the three-dimensional manner.

After the generation of the printing data and the setting working are performed using the printing condition setting program, the obtained printing data is transferred from the printing condition setting program to the laser control unit 10 of the laser marking apparatus. A "transfer•read" button 215 provided in the lower left of the screen of the printing condition setting program is pressed to perform the transfer. Therefore, the setting data is transferred to the printing memory unit 14 of the laser control unit 10, and expanded to change the setting contents, whereby the new printing conditions are reflected.

In the user interface screen of the program, the disposition, the shape, the display mode, the size, the color, and the pattern of each input field and each button can properly be changed. The easy-to-see display in which the evaluation or the determination can easily made or the easy-to manipulate layout can be obtained by changing the design. For example, the detail setting screen may be displayed by another window, the plural screens may simultaneously be displayed on the same screen. In the user interface screen of the program, the ON/OFF manipulation and the specification of the numerical value input or the command input to the virtually-provided buttons and input fields are performed by the printing manipulation section 31 connected to the computer in which the program is incorporated. As used herein, the word of "press" means not only that the user physically touches and manipulates the buttons, but also that the user performs the click or selection to spuriously press the buttons using the manipulation sections such as the printing manipulation section 31 and the evaluation manipulation section 71. The input/output device constituting the manipulation section is connected to the computer in the wired or wireless manner, or the input/output device is fixed to the computer. Various pointing devices such as the mouse, the keyboard, a slide pad, a track point, a tablet, a joystick, a console, a jog dial, digitizer, a light pen, a numeric key pad, a touch pad, and an acu-point can be cited as the general manipulation sections. The input/output devices can be used for not only the program manipulation but also the manipulation of the hardware such as the printing quality evaluation apparatus 400. A touch screen or a touch panel is used as the evaluation display section 72 that displays the interface screen, and the user may directly touch the screen by a user's hand to perform the input or the manipulation. Alternatively, sound input or existing input sections may be used, or these input methods may be combined.

(Test Printing Mode)

Figure 78:
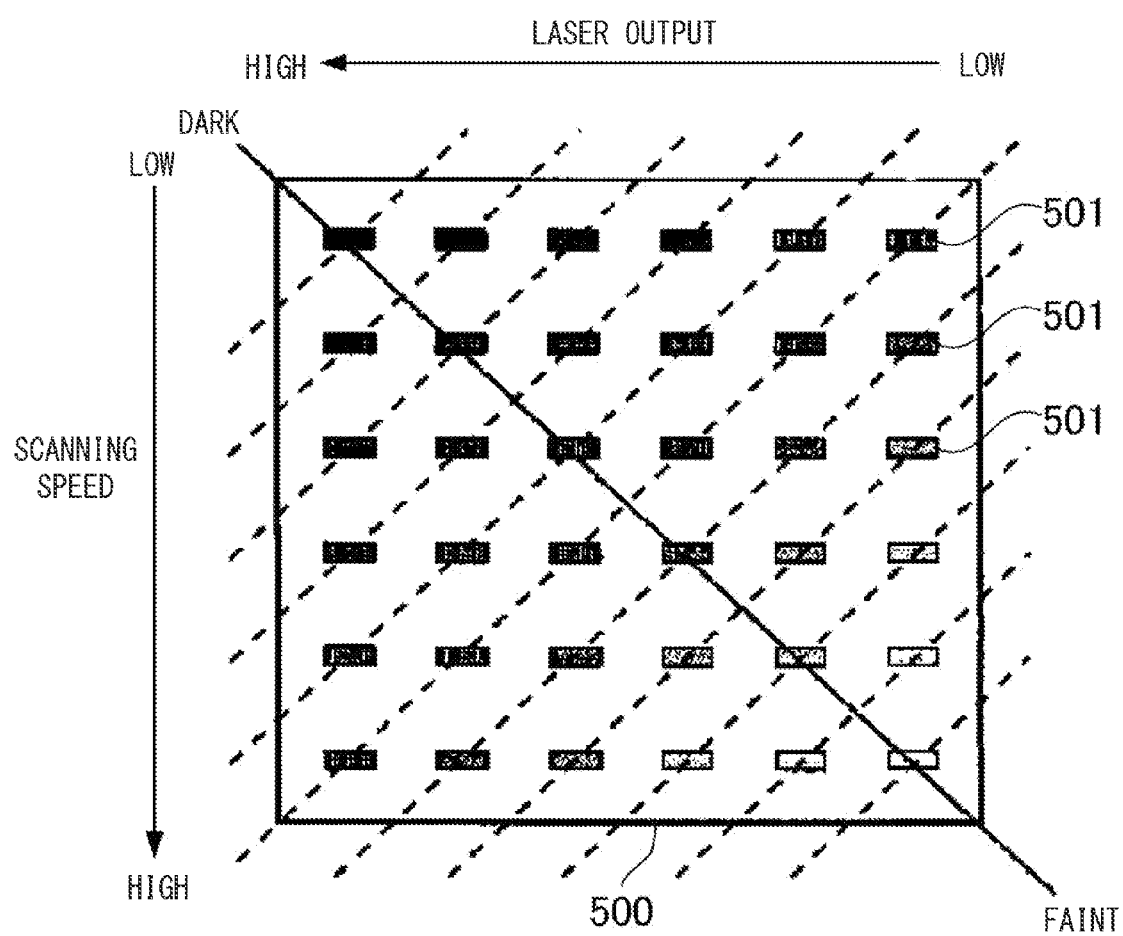
FIG. 78 is a plan view illustrating an example of a printing list.

The printing condition setting device 200A illustrated in the block diagram of FIG. 5 includes plural printing modes. For example, in the screen of FIG. 8, a test printing mode can be performed when a "test printing" button 208 provided in a lower stage of the printing pattern input field 204 is pressed. In the test printing mode, the printing conditions of the scanning speed of the laser beam and the laser output (laser power) are set by performing the test printing in two-dimensional matrix manner. That is, while the plural printing conditions are generated by changing two of the printing parameters constituting the printing conditions of the laser beam, the cell-shaped printing is performed on each condition. For example, as illustrated in FIG. 78, the cells are two-dimensionally printed, the printing condition of each cell is changed such that the laser output is gradually decreased in the horizontal direction, and the printing condition of each cell is changed such that the scanning speed is gradually enhanced in the vertical direction. As a result, the printing is performed such that the printing result dilutes from the upper left toward the lower right. The user selects the cell in which the desired printing result is obtained from the two-dimensional array, and the user sets the scanning speed and the laser output of the corresponding laser beam.

(Sample Printing Mode)

The printing condition setting device 200A also includes a sample printing mode in order to set the more proper printing condition to the workpiece. The sample printing mode implements the printing quality evaluation function in which, after the plural symbols are printed on a trial basis on different printing conditions (sample printing conditions), the printing quality is qualitatively evaluated not by the visual checking of the user, but with the printing quality evaluation apparatus 400. In the sample printing mode, two printing parameters are arbitrarily selected as variable parameters from the printing parameters constituting the printing conditions, remaining printing parameters are set to fixed parameters, the variable parameters are changed while the fixed parameters are maintained at fixed values, and the plural sample codes SC are printed. At this point, a sample printing pattern SP is printed. In the sample printing pattern SP, one of the two variable parameters is set to a vertical axis, and the other is set to a horizontal axis, and the plural sample codes SC are two-dimensionally arrayed. The sample code SC having the proper printing quality is extracted from the sample printing pattern SP, whereby the sample printing condition in which the sample code SC is printed can be recognized as the proper printing condition. As necessary, the sample printing is repeatedly performed while a variable range or a variable width of the variable parameter is changed, or while the variable parameter is changed to another variable parameter, thereby finally selecting the proper set of printing parameters.

A procedure for setting five printing parameters of the laser power, the scanning speed, the Q switch frequency, the spot variable value, and the number of printing times to proper values by performing the sample printing mode will be described below with reference to a flowchart of FIG. 9. The sample printing mode is started by pressing a "sample printing" button 209 provided in the lower stage of the printing pattern input field 204 in the screen of FIG. 8, the screen transitions to a template selection screen 210 of FIG. 10, and "selection of template" is displayed in a step display field 211 provided in an upper stage of the template selection screen 210.

(Selection of Template in Step S901)

Figure 10:
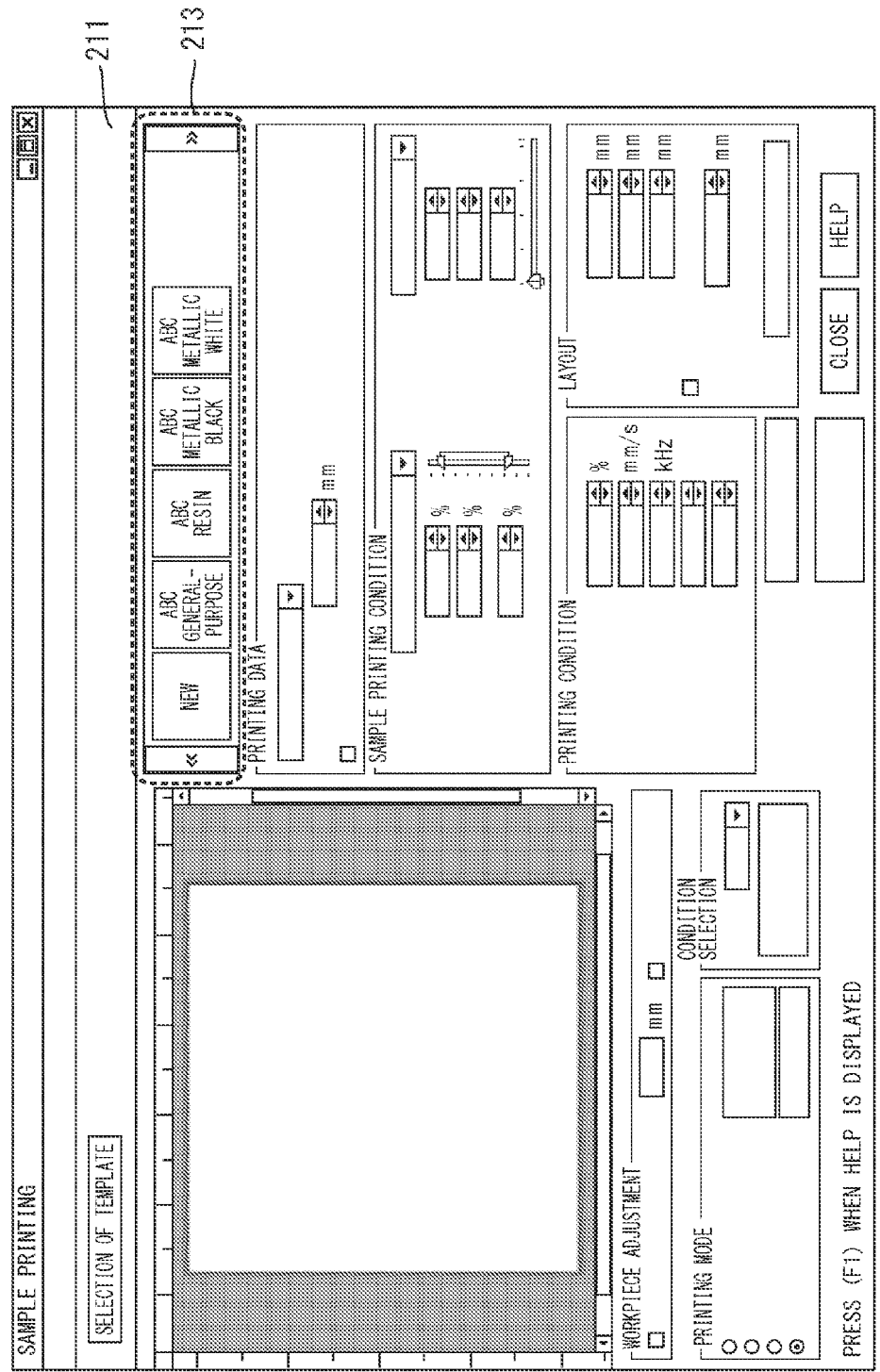
FIG. 10 is a view illustrating a template selection screen.
Figure 11:
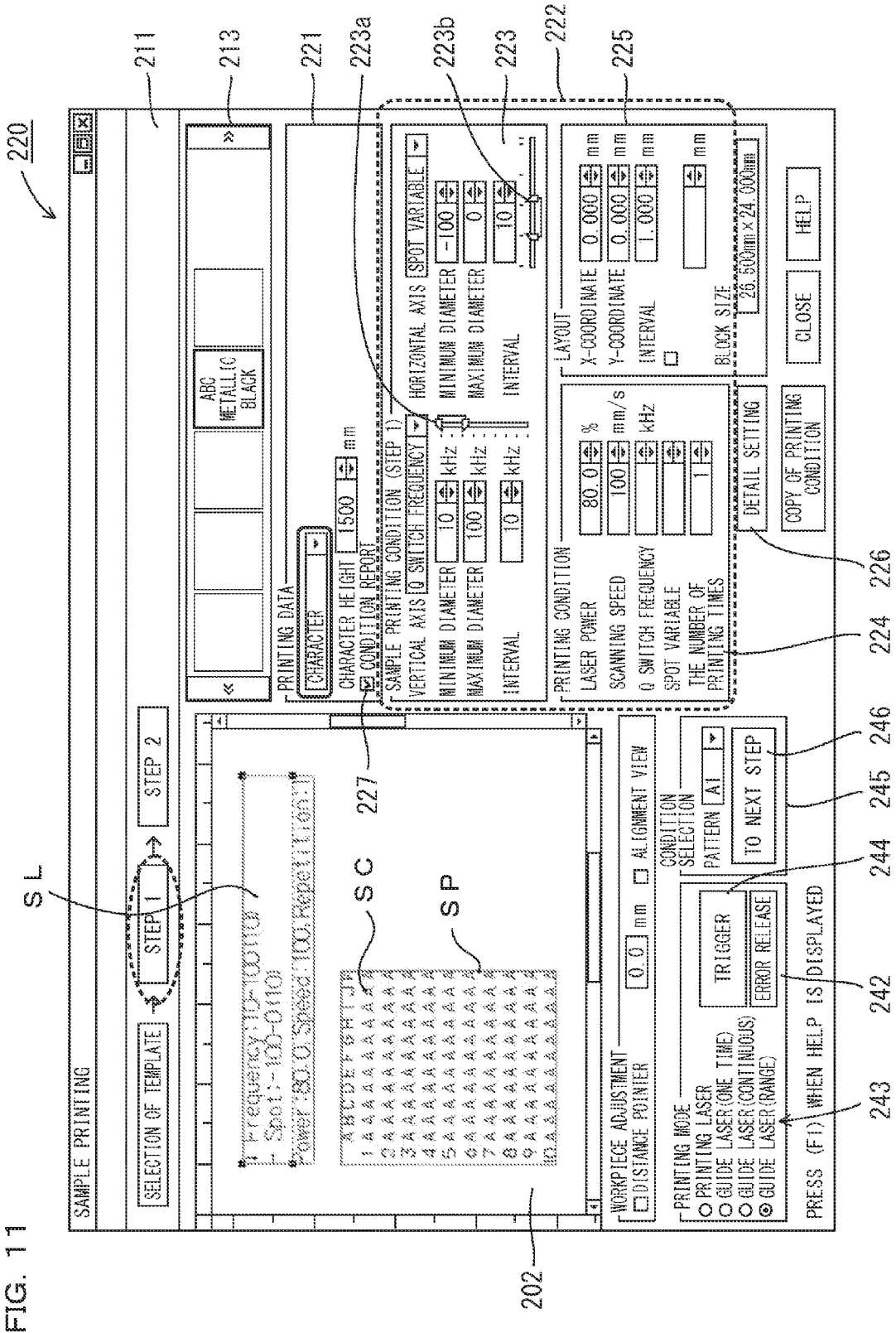
FIG. 11 is a view illustrating a first sample printing condition setting screen.

In the screen of FIG. 10, a material for the workpiece that is of the printing target is selected (Step S901). Typical materials for the workpieces are previously prepared as the template, and the user selects a desired template button from a template button group 213 provided in the upper stage on the right of the screen. For example, a resin, an example in which black printing is performed to metal, an example in which white printing is performed to metal, and a general-purpose condition are prepared as the template. When one of the template buttons is pressed, the recommended printing conditions are automatically set according to the setting of the selected template. Specifically, as illustrated in FIG. 11, gray-out of other template buttons are performed, and a value set by the template is automatically input to each item of the sample printing condition specifying field 222. The template may newly be produced. In this case, when the new template button is pressed, an arbitrary value can be set to each setting item.

(Setting of First Sample Printing Condition in Step S902)

When one of the templates is selected from the screen of FIG. 10, a highlight of the step display field 211 in the upper stage of the screen transitions from "selection of template" to "step 1", and the template selection screen 210 transitions to a first sample printing condition setting screen 220 of FIG. 11. At this point, a first sample printing condition is set (Step S902). On the right of the screen of FIG. 11, a printing data specifying field 221 and the sample printing condition specifying field 222 that is of one mode of the parameter setting section 32 are provided below the template button group 213. A variable parameter setting field 223, a fixed parameter setting field 224, and a layout setting field 225 are provided in the sample printing condition specifying field 222. The edit display field 202 in which the printing contents are displayed is provided on the left of the screen. At this point, the variable parameter setting field 223 constitutes the first sample printing condition setting field in which the first sample printing condition is set.

In FIG. 11, the metallic black template is selected. That is, when a metallic black button is pressed in the template selection screen 210 of FIG. 10, the template selection screen 210 transitions to the first sample printing condition setting screen 220 of FIG. 11, the first sample printing condition that is suitable to perform black printing to the metallic workpiece is automatically input to the sample printing condition specifying field 222. Generally, in order to the perform black printing to the metallic workpiece, the laser power is increased, and the scanning speed is slowed. The Q switch frequency is decreased and set such that the higher energy is provided. Conditions suitable to perform white printing to the metallic workpiece are set when a metallic white button is pressed.

(Variable Parameter)

In the sample printing mode, the two printing parameters are selected as the variable parameters from the five printing parameters, and remaining printing parameters are set to the fixed parameters. The variable parameter is selected in a variable parameter setting field 223, and the fixed parameter is selected in a fixed parameter setting field 224. In FIG. 11, the printing parameter selected in the variable parameter setting field 223 is automatically set so as to be not able to be changed in the fixed parameter setting field 224. In this case, the Q switch frequency and the spot variable are selected as the variable parameters. As a result, the grayout of a numerical value field is performed in the fixed parameter setting field 224, and a minimum value is displayed in red.

(Variable Parameter Setting Field 223)

The two variable parameters (vertical-axis variable parameter and horizontal-axis variable parameter) that constitute the vertical axis and the horizontal axis of the sample printing pattern SP are selected in the variable parameter setting field 223. In FIG. 11, the Q switch frequency is selected as the vertical-axis variable parameter, and the spot variable is selected as the horizontal-axis variable parameter. The minimum value and the maximum value of the variable value, which define a variable range of each variable parameter, and an interval to be changed are also specified.

(Sliders 223a and 223b)

In addition to numerically inputting each item, sliders 223a and 223b are prepared, and the displayed numerical value can continuously be changed by manipulating the sliders 223a and 223b. Each of the sliders 223a and 223b includes a minimum-value slider that indicates the minimum value and a maximum-value slider that indicates the maximum value. A range bar is provided between the minimum-value slider and the maximum-value slider. When the range bar is dragged with the mouse, the range is kept constant, and the minimum value and the maximum value can be changed while interlocked with each other. When each of the minimum-value slider and the maximum-value slider is solely dragged, only the minimum value or the maximum value is changed, and the interval is automatically changed according to the changed minimum value or maximum value.

The slider also has a function of visually displaying the positions of the minimum value and the maximum value, which are currently set, in the range where each variable parameter can be set. Therefore, the user can visually recognize the current range and how to change the range by seeing the slider. In FIG. 11, the vertical-axis slider 223a that adjusts the vertical axis and the horizontal-axis slider 223b that adjusts the horizontal axis are vertically and horizontally disposed, respectively. Therefore, the user visually and easily recognizes which variable parameter is adjusted.

In FIG. 11, in the Q switch frequency, the minimum value is set to 10 kHz, the maximum value is set to 100 kHz, and the interval is set to 10 kHz. In the spot variable, the minimum value is set to −100 (no unit), the maximum value is set to 0, and the interval is set to 10. According to the conditions of the set variable parameters, the sample printing pattern SP in which the sample codes SC are two-dimensionally arrayed is displayed in the edit display field 202, and the user can check the actual sample printing image. On the conditions of FIG. 11, 10 symbols are displayed in the vertical axis (column direction) and 11 symbols are displayed in the horizontal axis (row direction), namely, 110 symbols are displayed in the 10-by-11 matrix. The number of columns and the number of rows are automatically decided according to the range of the minimum value to the maximum value and the interval, which are set in each variable parameter. When the setting value is changed in the variable parameter setting field 223, the sample printing pattern SP whose image is displayed in the edit display field 202 is updated in real time.

(Fixed Parameter Setting Field 224)

The value of each printing parameter is set in the fixed parameter setting field 224. In FIG. 11, the laser power, scanning speed, and the number of printing times are adjusted except the fixed parameters (Q switch frequency and spot variable), which cannot be changed because the Q switch frequency and the spot variable are set as the variable parameters. An initial value of each fixed parameter is previously set to a proper value or a proper value region according to the selected template. The user decides the fixed parameter values based on a work type and a printing color. However, the fixed parameter value is not decided in an unambiguous manner, but a range (optimum zone) of a preferable value may be guided on the user interface screen to cause the user to finally decide the fixed parameter value.

In a layout setting field 225, a printing position of the sample printing pattern SP is specified. In the layout setting field 225, an X-coordinate, a Y-coordinate, and an interval between the sample codes SC are numerically specified. The block size of the sample printing pattern SP is also displayed. When the numerical value is changed, the block size is updated according to the numerical value.

(Printing Data Specifying Field 221)

The class of the sample printed character data is specified from the printing data specifying field 221. In the printing data specifying field 221, the character, the two-dimensional code, the dotted two-dimensional code, the barcode, and the specific pattern are selected from the pull-down menu. When the character is selected, the printing quality can be evaluated by the visual checking of the user. When the two-dimensional code or the specific pattern is selected, the printing quality can be evaluated with the printing quality evaluation apparatus 400. In FIG. 11, the character is selected in the printing data specifying field 221, and the sample printing pattern SP in which characters "A" are two-dimensionally arrayed as the symbols is displayed in the edit display field 202. In the sample printing pattern SP, the row number (1 to 10 in FIG. 11) that indicates the number of the row constituting the matrix and a column number (A to K in FIG. 11) that indicates the number of the column constituting the matrix are also displayed along with the vertical axis and the horizontal axis.

Figure 12:
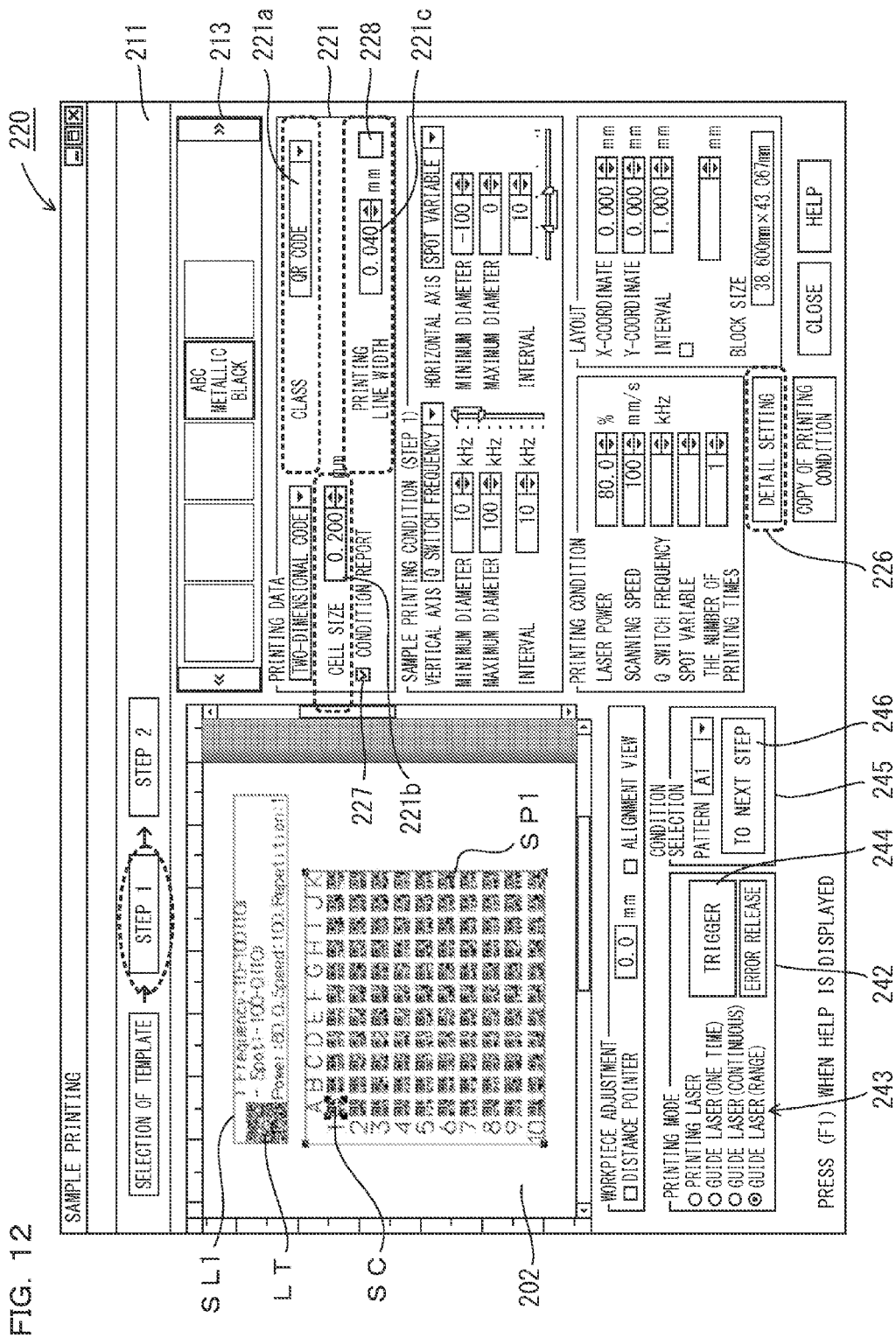
FIG. 12 is a view illustrating a state in which a two-dimensional code is selected in a printing data specifying field of FIG. 11.

When the two-dimensional code is selected in the printing data specifying field 221, the screen illustrated in FIG. 12 emerges (the plural two-dimensional codes are displayed in the edit display field 202), the class of the two-dimensional code, a cell size, and the printing line width can be specified.

The class of the two-dimensional code is specified in a code class specifying field 221a. At this point, the QR code, the Data Matrix, and the like can be selected. As to the cell size, the size of the cell that is of a minimum unit constituting the two-dimensional code is specified from a cell size specifying field 221b. As to the printing line width, the interval between the printed lines is specified from a printing line width specifying field 221c.

Figure 13:
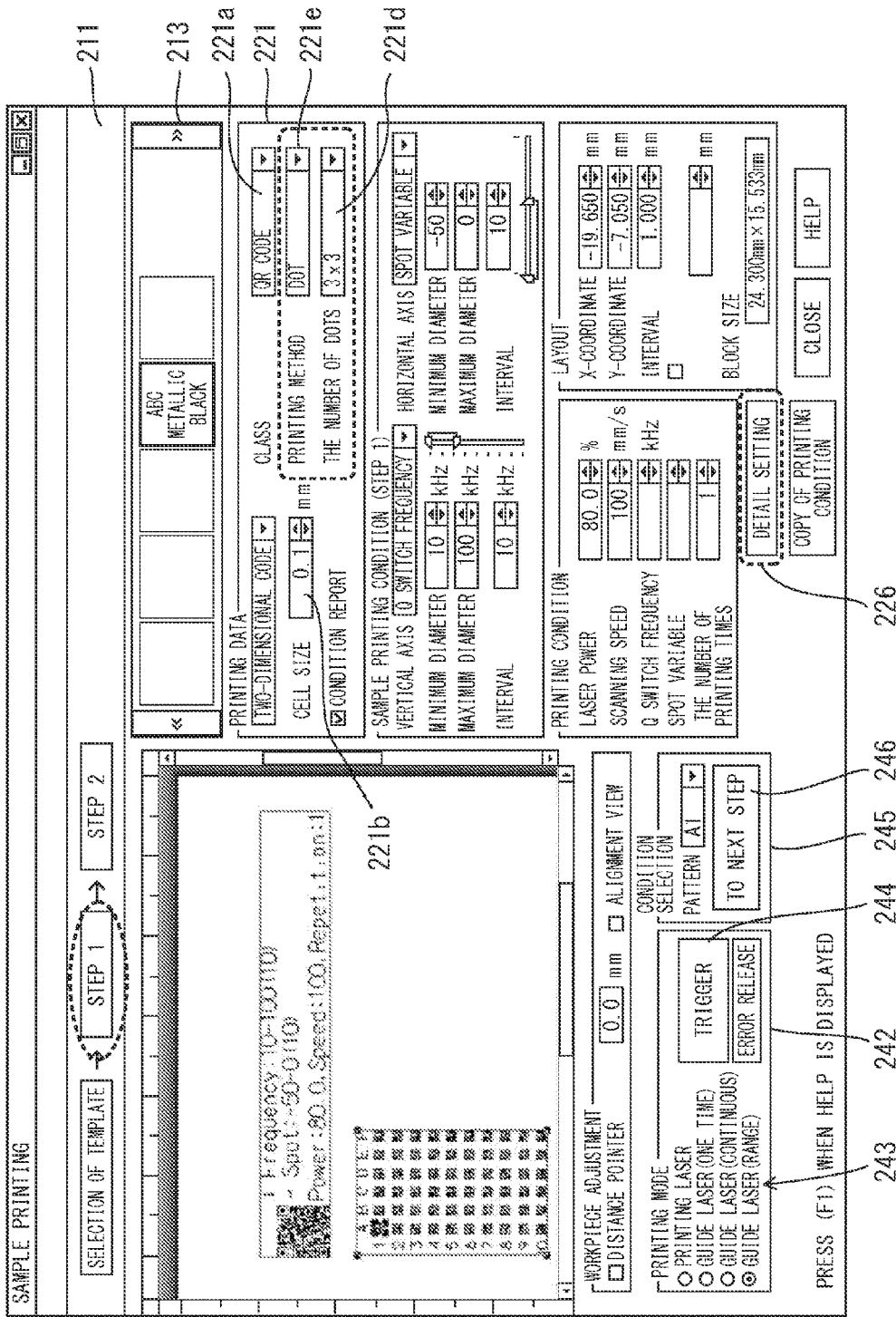
FIG. 13 is a view illustrating a dotted printing setting screen.
Figure 14:
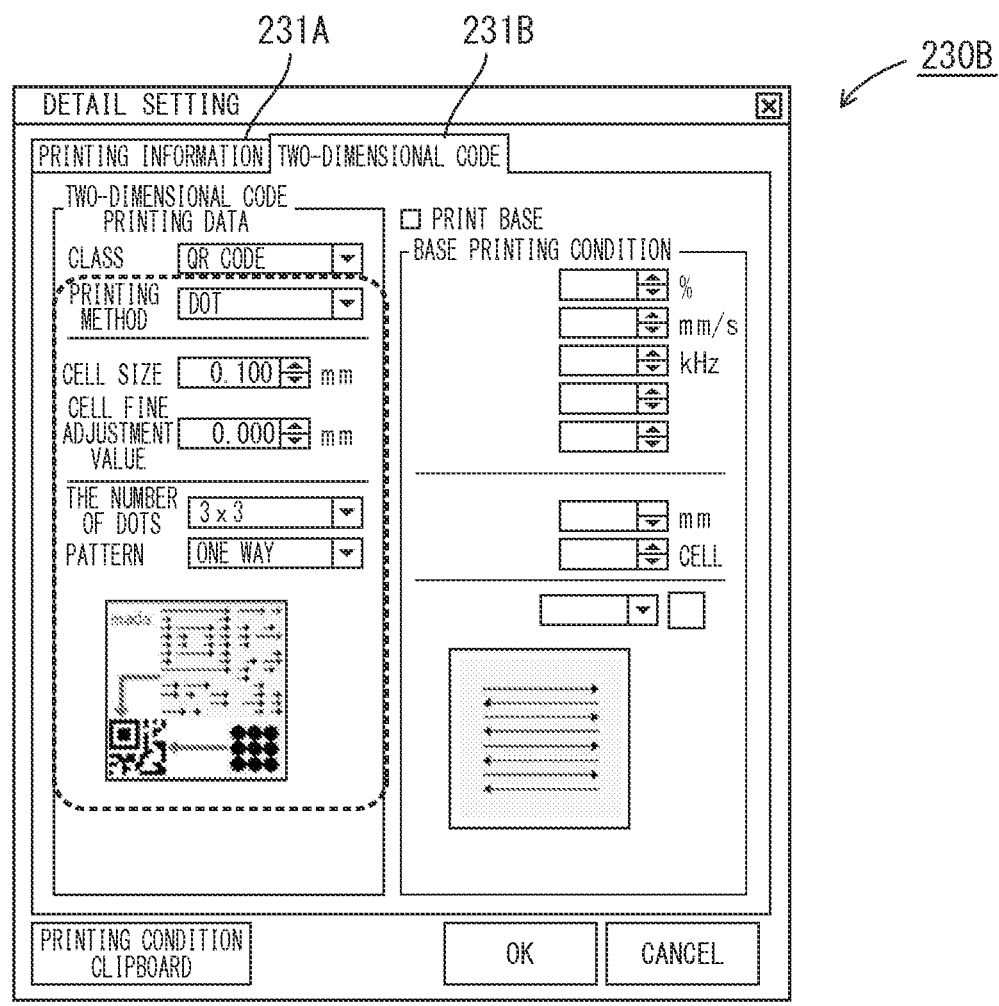
FIG. 14 is a view illustrating a detail setting screen that is displayed by pressing a "detail setting" button in FIG. 13.

In the first embodiment, the method in which a space is blacked out by drawing the line using the laser beam scanning is described as the printing method in which the laser beam is used. Alternatively, a dotted printing method in which the workpiece is irradiated with the dot-shaped laser beam to draw the sample code by the plural dots may be adopted. FIG. 13 illustrates an example of the setting screen when the dotted printing method is adopted. Referring to FIG. 13, not the blacking-out printing method but the dot-shaped printing method is selected in a printing method specifying field 221e, and the number of dots necessary to draw one cell can be specified from a dot count specifying field 221d (for example, 3 by 3). When a "detail setting" button 226 is pressed in the screen of FIG. 13, a detail setting screen 230B of FIG. 14 emerges, and one way or two ways of the dot pattern can be specified from the two-dimensional code tab in addition to the dot count.

(Condition Report Selection Field 227)

Whether the sample printing conditions are printed can be specified by a condition report generation section. In FIGS. 11 and 12, a condition report selection field 227 is provided as the condition report generation section in the printing data specifying field 221. When the condition report selection field is checked, and a sample printing condition character string SL indicating the sample printing conditions is displayed in the edit display field 202 such that the sample printing conditions are constructed by alphanumeric characters that can visually be recognized (read) by an operator and such that the specified sample printing conditions are printed. In FIG. 12, the QR code constituting a printing information code (link data LT) is displayed as the sample printing condition character string SL on the left. In the sample printing conditions, the variable parameters are displayed in the upper stage, and the fixed parameters are displayed in the lower stage. "↓" indicating that the Q switch frequency "Frequency" that is of the variable parameter is changed along the vertical axis of the sample printing pattern SP is displayed on the left, and the minimum value of 10 kHz, the maximum value of 100 kHz, and the change interval of 10 kHz are displayed as "10 –100 (10)" on the right. Similarly, "→" indicating that the spot variable "Spot" that is of the other variable parameter is changed along the horizontal axis of the sample printing pattern SP is displayed, and the minimum value of −100 (no unit), the maximum value of 0, and the change interval of 10 are displayed as "−100 –0 (10)".

The identification information correlated with the sample printing condition can be encoded by using the symbol such as the two-dimensional code as each sample code to which the sample printing is performed. In FIG. 12, in each sample code SC in a first sample printing pattern SP1, the printing position in the first sample printing pattern SP1 in which the two-dimensional code is printed is encoded. For example, "A1" is encoded in the sample code located in 1 by A and "K10" is encoded in the sample code located in 10 by K. Because the sample printing condition in each printing position corresponds to the sample printing condition set in the sample printing condition specifying field 222, the sample printing condition can be identified from the printing position. Because variable parameter is minimized in the printing position of "A1", the Q switch frequency becomes 10 kHz, and the spot variable becomes −100. Because the variable parameter is maximized in the printing position of "K10", the Q switch frequency becomes 100 kHz, and the spot variable becomes 0. Because the fixed parameter is the fixed value, the fixed parameter is not changed in the printing of each sample code. In FIG. 12, the laser power is set to 80%, the scanning speed is set to 100 mm/s, and the number of printing times is set to once. As described above, the desired sample code is selected, and decoded with the optical information reading apparatus 300 or the printing quality evaluation apparatus 400. Therefore, the printing condition in which the sample code is printed can be identified. According to the method, the character string encoded in the sample code is enough for the row and the column. Therefore, advantageously the small-size code, such as the micro QR code, in which only five characters can be encoded can be used as the sample code.

In the case that the code size is permissible to a certain extent, the sample printing condition can directly be encoded in each sample code SC constituting the sample printing pattern SP. In this case, when the desired sample code (two-dimensional code) is read and decoded from the sample printing pattern with the optical information reading apparatus, the sample printing condition in which the two-dimensional code is printed can directly be acquired, and a time necessary to produce a correspondence table or a time to necessary to refer to the link data can be eliminated.

(Printing Information Code)

Contents printed in the sample printing condition character string SL includes the printing information code (link data LT), in which details of the sample printing conditions are encoded in not only the character string but also the symbol such as the two-dimensional code. Therefore, which printing parameter is set to the variable parameter to perform the sample printing can be recognized by reading the link data LT with the optical information reading apparatus 300. In FIG. 12, the QR code is included as the link data LT in the first sample printing condition character string SL1 indicating the first sample printing condition, and "FR 10 100 10Y:SV −100 0 10 X:LP 80.0:SS 100:RE 1" is decoded as the contents equivalent to the character string indicating the sample printing conditions included in the first sample printing condition character string SL1 when the QR code is read. As used herein, "FR" means the Q switch frequency, "10 100 10 y:" means that the range of 10 to 100 kHz is changed in 10 kHz on the Y-axis. Similarly, "SV −100 0 10 X:" means that the spot variable is changed in each 10 within the range of 10 to 100 on the X-axis. "LP 80.0:SS 100:RE 1" means the laser power of 80%, the scanning speed 100 mm/s, and the number of printing times of 1. The printing information code setting section 38 generates the link data LT. In the configuration of the first embodiment, the QR code is included as the link data LT in the first sample printing condition character string SL1. Alternatively, only the first sample printing condition character string SL1 or the QR code may be printed. Therefore, the printing amount can be reduced.

(Detail Setting Button 226B)

Figure 15:
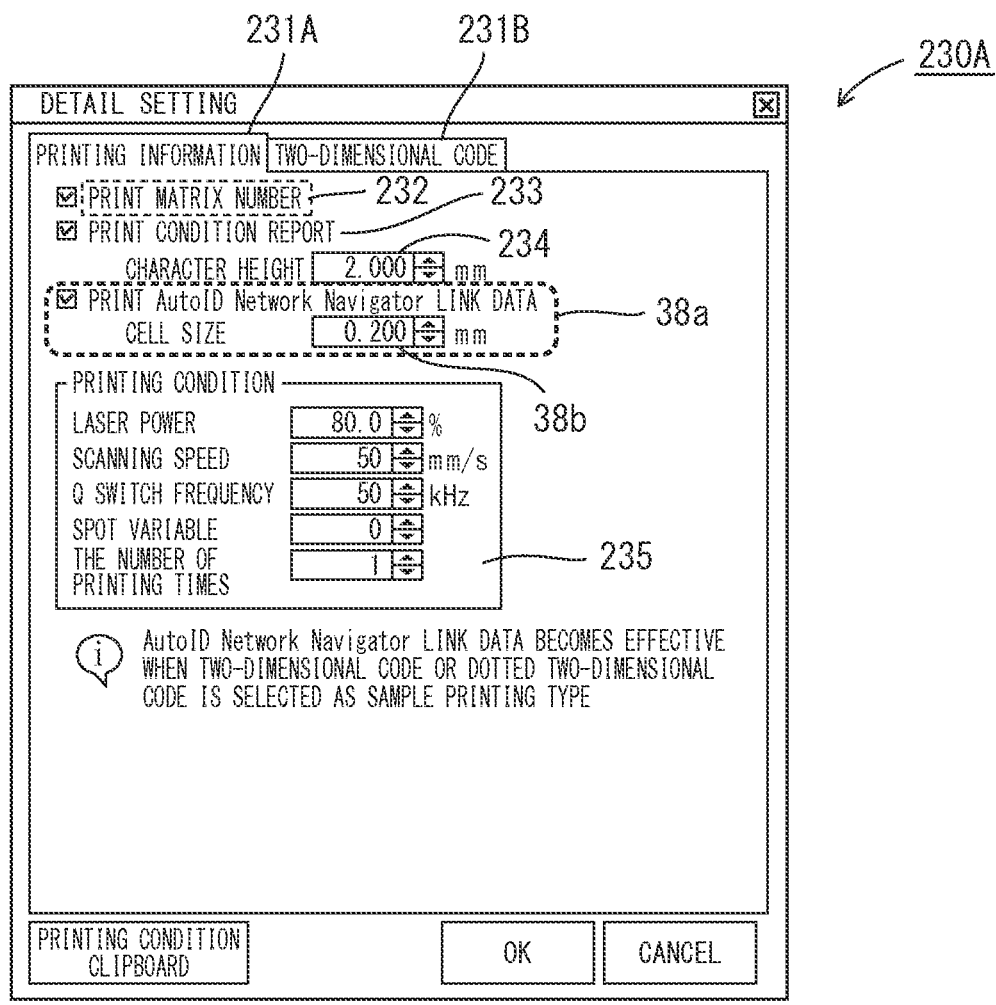
FIG. 15 is a view illustrating a detail setting screen that is displayed by pressing the detail setting button in FIG. 12.

A detail setting screen 230A of FIG. 15 is displayed when the "detail setting" button 226 provided in the lower stage of the screen of FIG. 12 is pressed. The screen of FIG. 15 includes a "printing information" tab 231A and a "two-dimensional code" tab 231B. When the "printing information" tab 231A is selected, the detail of the sample printing can be specified. For example, a coordinate axis display section 232, a condition report display section 233, and a character height specifying field 234 are provided. Whether the row number and the column number are printed in the vertical axis and the horizontal axis of the first sample printing pattern SP1 is specified in the coordinate axis display section 232. The existence or non-existence of the condition report printing is specified in the condition report display section 233. In the case that the printing is performed, a character height of the condition report (first sample printing condition character string SL1) is specified in the character height specifying field 234. The printing information code setting section 38 that sets the link data LT is also configured. Specifically, a link data printing checkbox 38a is provided, and the link data LT is printed by checking the link data printing checkbox 38a. In performing the printing, the cell size of the two-dimensional code of the link data LT can also be specified from a cell size specifying field 38b. Additionally, the printing conditions of the link data LT, the condition report, and the specific pattern described later can be specified by a specific printing condition specifying section 235.

Figure 16:
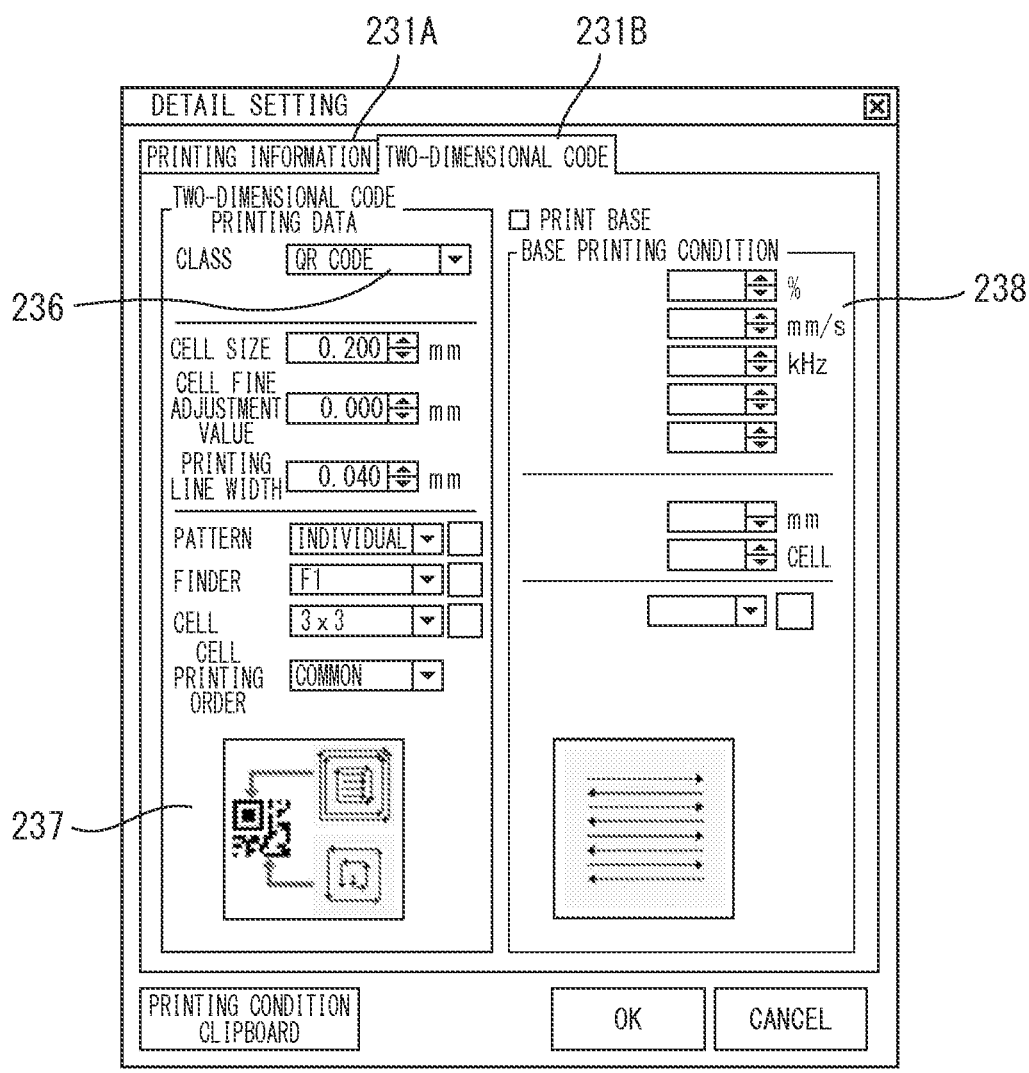
FIG. 16 is a view illustrating a screen in which a "two-dimensional code" tab is selected in FIG. 15.
Figure 17:
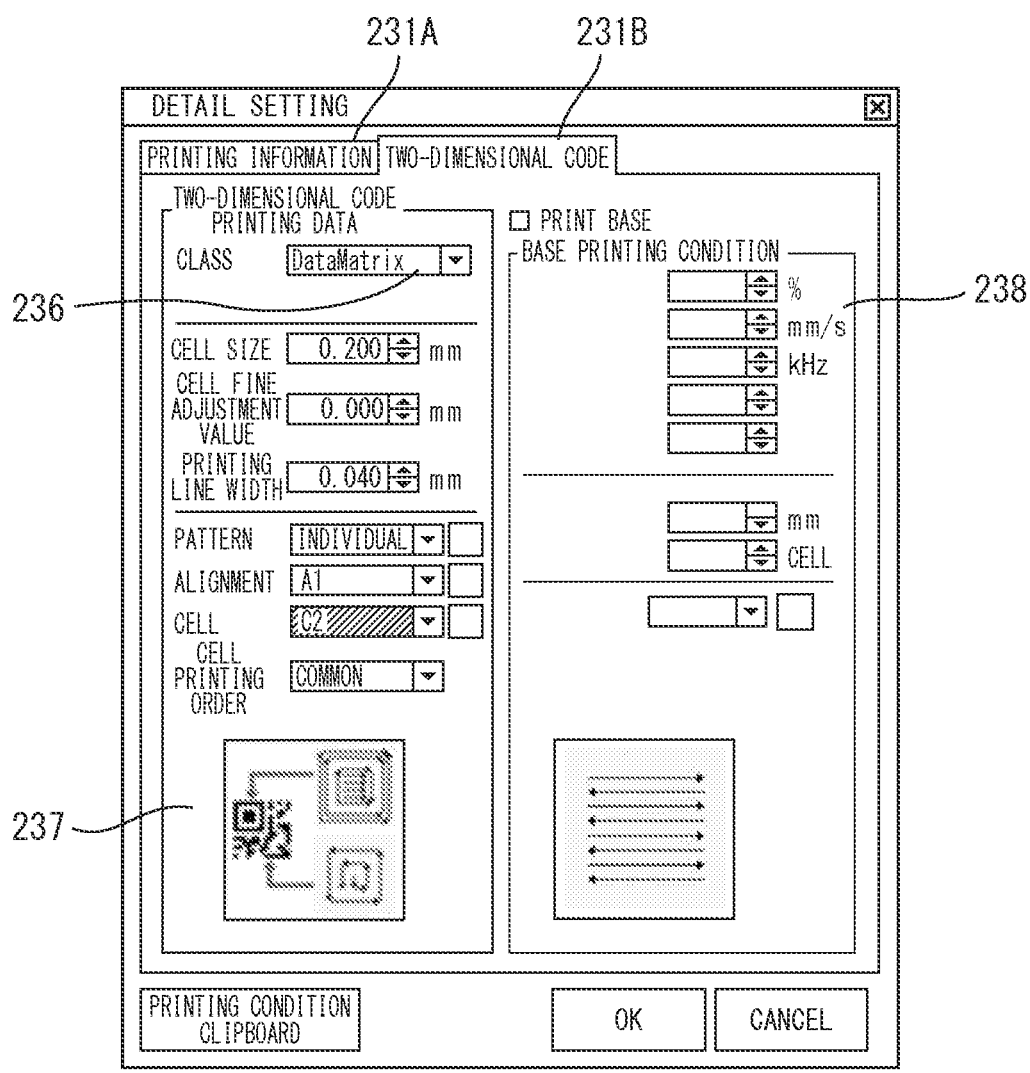
FIG. 17 is a view illustrating a state in which a data matrix is selected as a type of the two-dimensional code in FIG. 16.

When the "two-dimensional code" tab 231B is selected, the detail of the two-dimensional code to be printed can be set as illustrated in FIG. 16. The class of the two-dimensional code can be selected as the QR code, the Data Matrix, and the like from a class selection field 236. FIG. 16 illustrates an example in which the QR code is selected. The cell size of the selected two-dimensional code, a cell fine adjustment value, and the printing line width can be specified from a detail setting field 237. The pattern, a finder, the cell, and a cell printing order can also be specified in the detail setting field 237. The cell fine adjustment is used when a read rate is degraded because of an improper area of a space portion of the two-dimensional code. The area can be adjusted small without changing the blacking-out interval between the cells when the cell fine adjustment value is set to a large value, and the area can be enlarged when the cell fine adjustment value is set to a small value. On the other hand, when the Data Matrix is specified as the class of the two-dimensional code in the class selection field 236, the screen of FIG. 17 emerges, and the detail of the Data Matrix can similarly be specified from the detail setting field 237.

(Base)

The base can also be printed. For example, in marking the symbol on the workpiece, such as a casting, which has the textured surface, sometimes the high-quality printing can be performed by performing the marking after the base is machined. In such cases, a base machining printing condition (base machining condition) is enabled to be set to a condition different from the symbol printing condition from a base machining condition setting field 238, which allows the base machining to be more preferably performed. The base machining condition suitable to the base machining can be set in the screen of FIG. 16.

Figure 18:
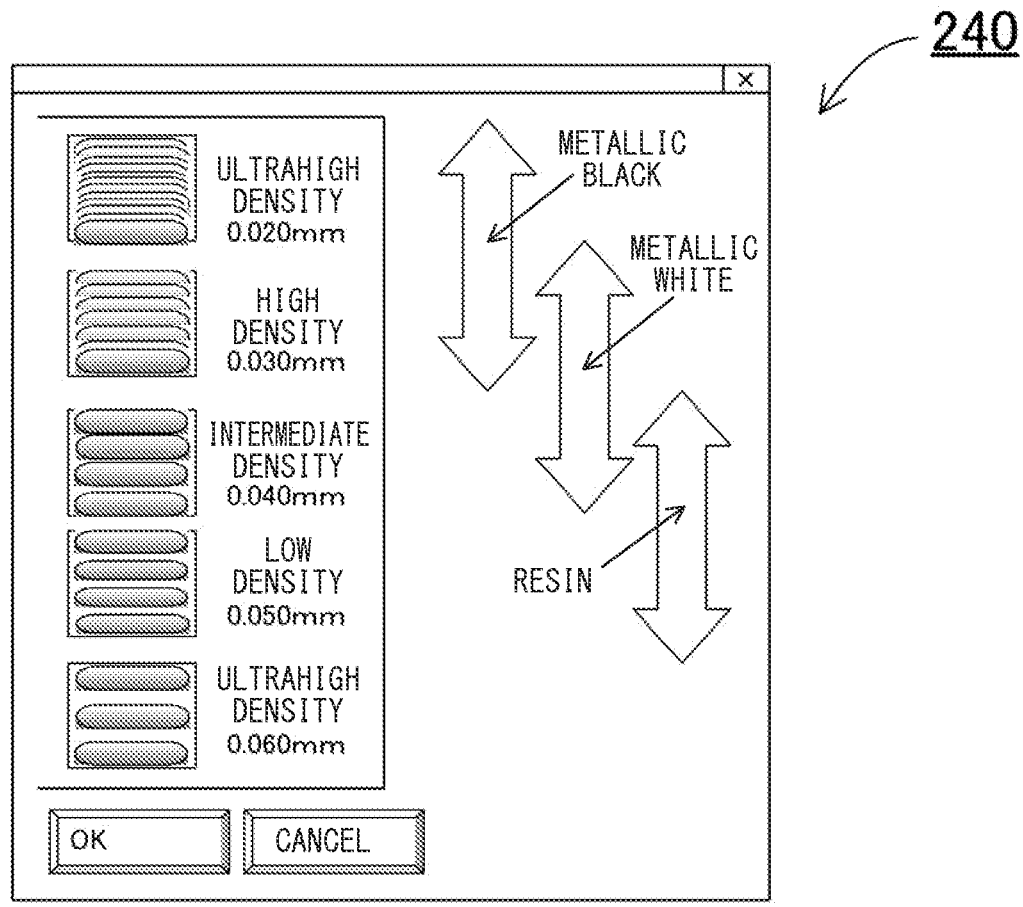
FIG. 18 is a view illustrating a printing line width specifying screen that is displayed by pressing a printing line width detail button in FIG. 12.

The printing line width can finely be adjusted. When the two-dimensional code is selected to press the printing line width detail button 228 in the printing data specifying field 221 on the screen of FIG. 12, a printing line width detail setting screen 240 of FIG. 18 emerges, and the printing line width can be specified from the printing line width detail setting screen 240. The printing line width is adjusted according to the material on the printing line width detail setting screen 240, thereby obtaining beautiful color production. For example, line density can properly be selected according to the material such that ultrahigh density is selected for the metallic black, such that high density is selected for the metallic white, and such that intermediate to low density is selected for the resin.

(Performance of First Sample Printing in Step S903)

Figure 9:
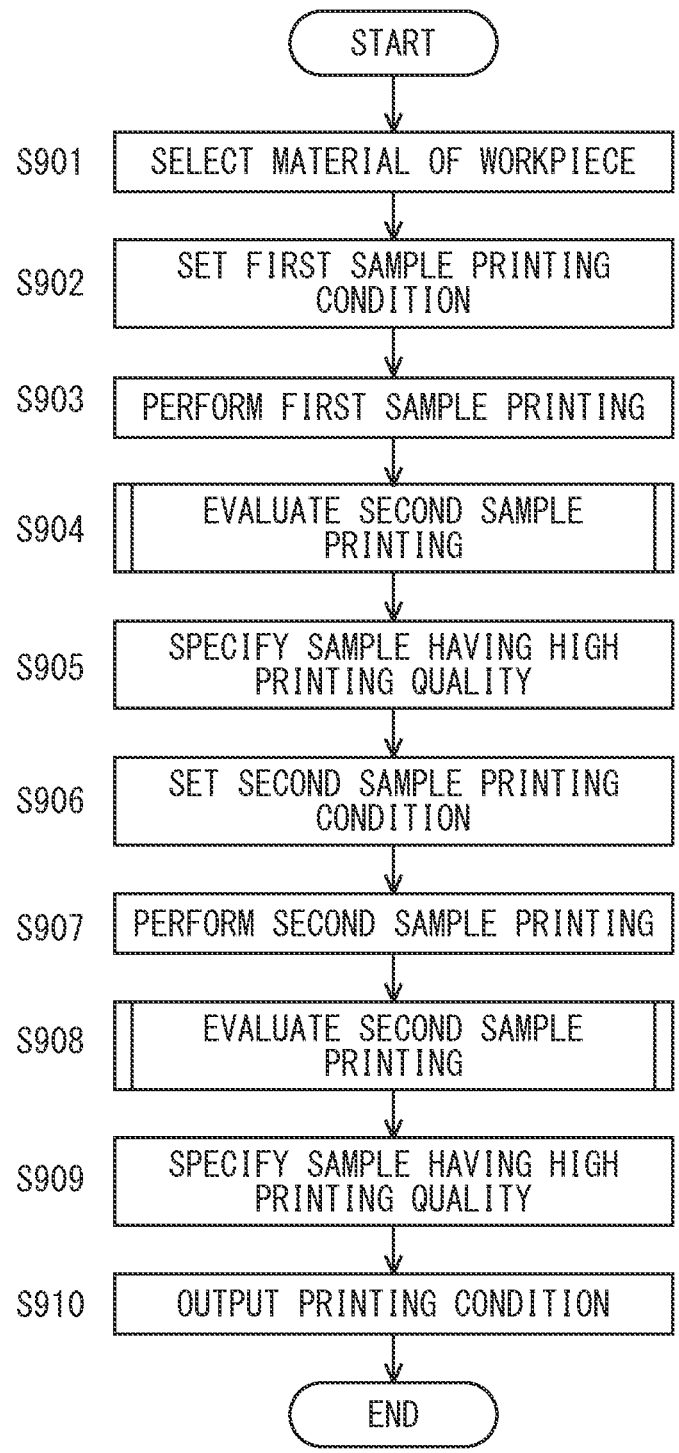
FIG. 9 is a flowchart illustrating a procedure for performing a sample printing mode.

When the first sample printing condition is input, the first-time sample printing (first sample printing) is performed (Step S903 of FIG. 9). In the screen of FIG. 12, a printing mode setting field 242 is provided in the lower stage of the edit display field 202. In the printing mode setting field 242, a printing mode selection section 243 that selects the printing mode is provided as radio buttons. A "trigger" button 244 is provided on the right of the printing mode selection section 243 in order to issue an instruction to perform the printing mode selected by the radio button to the laser marking apparatus 1000. When "printing laser" is selected by the printing mode selection section 243 to press the "trigger" button 244, a trigger signal issuing a command to perform the printing is transmitted to the laser marking apparatus 1000 to start the sample printing, and the first sample printing pattern SP1 is printed on the workpiece according to the specified first sample printing condition.

In advance of the sample printing, the workpiece should previously be disposed in an output position of the laser marking apparatus 1000. At this point, the workpiece can be scanned with the guide laser beam as needed basis such that the printing position, namely, the irradiation position of the laser beam is easily checked. Specifically, while the workpiece is set, when "guide laser" is selected in the printing mode setting field 242 to press the "trigger" button 244 on the screen of FIG. 12, the guide laser beam is emitted from the guide light source 29A of FIGS. 3 and 4, the workpiece is actually scanned with the guide laser beam, and the printing position is checked by an accidental image effect of the guide laser beam. The printing mode setting field 242 also acts as guide laser scanning mode selection section that selects a guide laser beam scanning mode. In this case, one of "one time" in which the workpiece is scanned with the guide laser beam only once, "continuous" in which the workpiece is continuously scanned, and "range" indicating the range where the sample printing pattern SP and the condition report are printed can be selected.

After the workpiece is positioned as needed basis, "printing laser" is selected in the printing mode setting field 242, and the "trigger" button 244 is pressed to perform the first sample printing. As a result, according to the set first sample printing condition, the matrix of the sample codes are printed in each sample printing condition in which the variable parameters of the Q switch frequency and the spot variable vary.

(Evaluation of First Sample Printing in Step S904)

The printing quality of the workpiece to which the first-time sample printing is performed is evaluated with the printing quality evaluation apparatus 400 (Step S904 of FIG. 9). Specifically, the image of the sample printing pattern SP printed in the workpiece is captured, the score indicating the read stability is calculated by the printing quality evaluation section 65, and the sample code having the high score, namely, the high printing quality is decided. The detailed evaluation of the first sample printing is described in the printing quality evaluation procedure described later.

(Selection of Sample Code Having High Score in Step S905)

When the sample code is properly decided, the first sample printing condition of the sample code is obtained (Step S905 of FIG. 9). At this point, a correspondence relationship between the first sample printing condition and the printing position is previously decided such that the first sample printing condition can be specified in the printing position of the sample code. Because the matrix of the sample codes is printed while the two variable parameters are changed, the value of each variable parameter can uniquely be decided in the printing position from the minimum value, the maximum value, and the interval of the variable parameter. Therefore, the first sample printing condition can be recognized from the printing position such that the printing position is specified by the condition selection section that identifies the printing condition based on the correspondence relationship. In FIG. 12, the printing position of the sample code is specified in a condition setting field 245 that is provided in the lower stage of the edit display field 202 and on the right of the printing mode setting field 242. In FIG. 12, row numbers and column numbers are horizontally and vertically displayed in the first sample printing pattern SP1 in the edit display field 202, and the printing position can be specified by the row and the column. Therefore, the printing position can be selected as one of "A1" to "K10" from the pull-down menu in the condition setting field 245. In this case, assuming that the sample code of the printing position "I9" has the high score, "I9" is specified in the condition setting field 245. The printing position of "I9" corresponds to the Q switch frequency of 90 kHz and the spot variable of –20 of the variable parameters. Therefore, these values are automatically input to a variable parameter setting field. When a "to next step" button 246 is pressed, the highlight of the step display field 211 in the upper stage of the screen is changed from "step 1" to "step 2", and the screen transitions to a second sample printing condition setting screen 220B of FIG. 19.

(Setting of Second Sample Printing Condition in Step S906)

Figure 19:
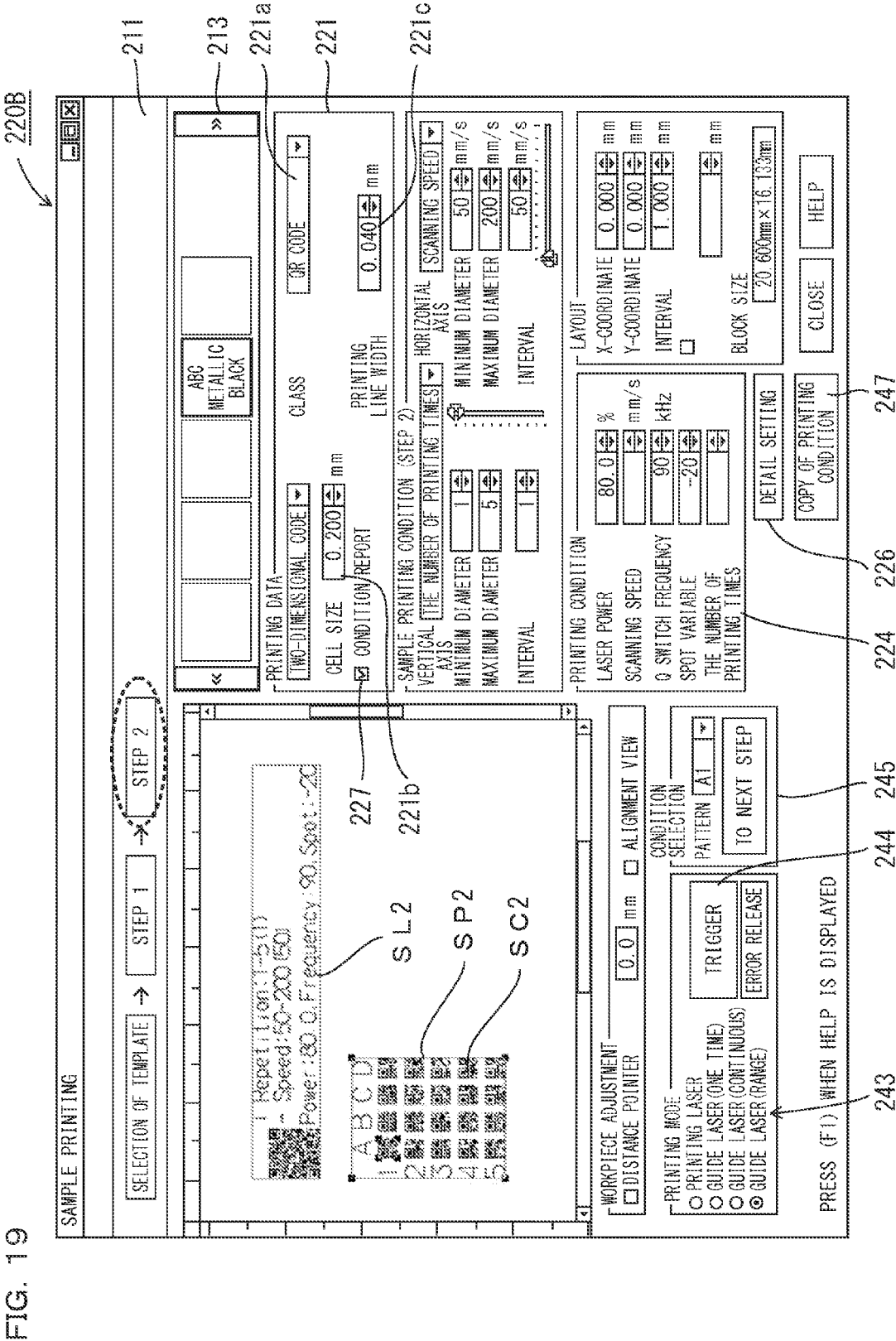
FIG. 19 is a view illustrating a second sample printing condition setting screen.

In the second sample printing condition setting screen 220B of FIG. 19, the second sample printing condition is set (Step S906 of FIG. 9). The second sample printing condition is set in order to perform the second-time sample printing. As a result of the first sample printing, the proper values become already clear for the Q switch frequency and the spot variable of the variable parameters. Therefore, the printing parameters of the Q switch frequency and the spot variable become the fixed parameters during the second sample printing. On the other hand, in the second sample printing condition, the number of printing times (first variable parameter) and the scanning speed (second variable parameter) are automatically set as a new set of variable parameters instead of the Q switch frequency and the spot variable. According to the selection of the condition setting field 245, the variable parameters are changed to the fixed parameters while other fixed parameters are changed to the variable parameters.

The minimum value, the maximum value, and the interval of each variable parameter and the value of the fixed parameter can be adjusted similarly to the setting of the first sample printing condition. In FIG. 19, the minimum value of one time, the maximum value of five times, and the interval of one time are specified as the number of printing times of the vertical axis, and the minimum value of 50 mm/s, the maximum value of 200 mm/s, and the interval of 50 mm/s are specified as the scanning speed of the horizontal axis. According to the setting of the second sample printing condition, a second sample printing pattern SP2 and a second sample printing condition character string SL2 are virtually displayed in the edit display field 202. Because the matrix of the second sample printing pattern SP2 depends on the minimum value, the maximum value, and the interval, the second sample printing pattern SP2 becomes the 5-by-4 matrix unlike the first sample printing pattern SP1. The symbol is changed because the printing condition different from the second sample printing condition is encoded in a second sample code SC2 according to the second sample printing condition.

The selection of the variable parameter in the second sample printing condition may previously be defined in the metallic black template. Similarly, that the sample printing is performed twice on the first sample printing condition and the second sample printing condition and default values each variable parameter and each fixed parameter may previously be defined in the template. When these are previously defined as the recommended conditions suitable to perform the black printing to the metallic workpiece, the user can easily decide the printing condition according to the recommended conditions eve if the user does not have knowledge of the proper printing parameter about the material. The values of the recommended conditions can also be adjusted, the printing condition can more properly be adjusted according to the actual environment. For example, the first variable parameter and the second variable parameter can properly be changed in both the first sample printing condition and the second sample printing condition. In the first embodiment, another printing parameter can be selected from the pull-down menu of FIG. 19. The numerical value can properly be changed to a desired value. Thus, the laser marking apparatus 1000 can deal with a demand of the skillful user who wants to adjust the finer printing conditions.

(Performance of Second Sample Printing in Step S907)

When the second sample printing condition is input, similarly the printing mode is selected by the printing mode selection section 243 to press the "trigger" button 244 on the second sample printing condition setting screen 220B of FIG. 19, thereby performing the second-time sample printing (second sample printing) (Step S907 of FIG. 9). In advance of the second sample printing, as described above, the position of the workpiece is adjusted as needed basis.

(Evaluation of Second Sample Printing in Step S908)

Similarly the printing quality performed is evaluated to the result of the second sample printing with the printing quality evaluation apparatus 400 (Step S908 of FIG. 9).

(Selection of Sample Code Having High Score in Step S909)

Similarly the second sample printing condition having the high score is decided (Step S909 of FIG. 9). In this case, it is assumed that the sample code of the printing position "B2" has the high score. Accordingly, when "B2" is selected in the condition setting field 245, the number of printing times of twice and the scanning speed of 100 mm/s are obtained as the printing conditions corresponding to the printing position, and these values are input to the fixed parameter setting field 224 (see FIG. 20).

(Output of Printing Condition in Step S910)

Figure 20:
FIG. 20 is a view illustrating a state in which a printing condition clipboard screen is opened.
Figure 21:
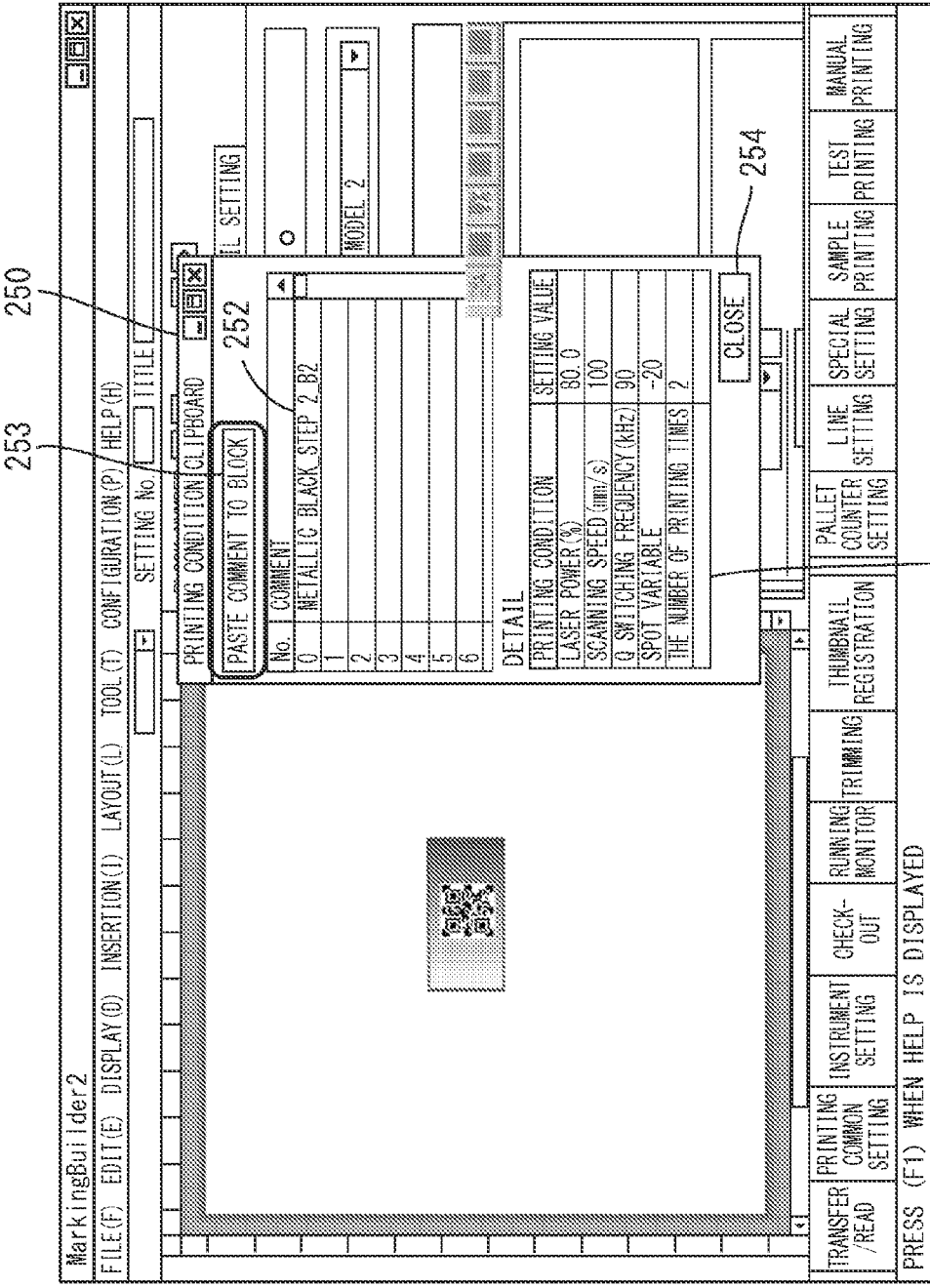
FIG. 21 is a view illustrating a state in which a printing condition is copied.

When the two-time sample printing is obtained to decide the printing conditions, these values are decided and output as the final printing conditions. In the first embodiment, when a "copy of printing condition" button 247 provided in the lower stage of the printing pattern input field 204 is pressed, a printing condition clipboard screen 250 is opened as illustrated in FIG. 20, the printing conditions set in the fixed parameter setting field 224 is transferred and displayed in a condition list 251 provided in the printing condition clipboard screen 250. At the same time, a list of currently-set printing blocks is displayed in a block list 252. The printing blocks displayed in the block list 252 are displayed in the order of the block number. A comment added by the user is also displayed in each printing block in order to distinguish the plural printing blocks from each other. The user selects the printing block, to which the printing conditions should be set, from the block list 252 on the printing condition clipboard screen 250. When the printing block is selected, a "paste printing condition to printing block" button 253 can be pressed (see FIG. 21), and the printing conditions are set to the printing block by pressing the "paste printing condition to printing block" button 253. The proper printing condition is searched in the sample printing mode, and the obtained proper result can be output. A "close" button 254 is pressed in order to end the sample printing mode. When the "close" button 254 is pressed, the screen returns to the original edit screen, and the printing block to which the printing conditions are already set can be confirmed in the edit display field 202. The two-dimensional code is displayed as the printing content in the printing block illustrated in FIG. 21, the printing conditions of the two-dimensional code are set to the printing conditions set in the sample printing mode (in this case, the Q switch frequency of 90 kHz, the spot variable of −20, the number of printing times of twice, the scanning speed of 100 mm/s, and the laser power of 80%).

(Search Parameter)

In the first embodiment, the two-time sample printing and the selection of the variable parameters in each sample printing (the Q switch frequency and the spot variable in the first sample printing, and the number of printing times and the scanning speed in the second sample printing) are previously defined as the metallic black template, and the template is set such that the recommended printing parameter values are automatically provided. The template is previously set by a proper combination such that the sample printing conditions are obtained in each material for the workpiece of the printing target. In the sample printing mode, a procedure to be set is guided to the user such that the processing in each step transitions in the flowchart of FIG. 9 and step display field 211. The user selects the material for the workpiece to repeat the sample printing in accordance to the guidance, which allows the user to implement the desired printing quality. Therefore, the user can easily set the printing condition even if the user does not have the detailed knowledge. Particularly, the first embodiment can solve the conventional problem in that, because the plural printing parameters affect each other in the complicated manner, depending on the material, it is necessary to decide the printing conditions through trial and error such that the proper printing quality is obtained. Because the user determines the printing quality by the visual checking in the related art, even if the printing quality of the workpiece is determined to be good by the visual checking of the user, possibly the read becomes instable when the workpiece is actually read with the two-dimensional code reader. On the other hand, in the method of the first embodiment, because the printing quality evaluation apparatus performs the evaluation whether the read working can actually be performed, the qualitative, high-reliability evaluation of the printing quality is implemented irrespective of the subjective view of the user. As described above, according to the first embodiment, the high-reliability marking can easily be performed.

The number of sample printing times is set to twice in the metallic black template. Alternatively, the number of sample printing times may be set to at least triple or only once. In the metallic black template, the laser power is not set to the variable parameter. Alternatively, for example, the "to next step" button 246 is further pressed on the second sample printing condition setting screen 220B to perform the third-time sample printing, and the laser power may be set to the variable parameter. It is not always necessary to select the two variable parameters, but one variable parameter may be selected. In the case that one variable parameter is selected, the sample printing pattern is displayed so as to one-dimensionally extend in the horizontal or vertical direction. For example, the laser power is set to the second variable parameter, and the first variable parameter is eliminated, thereby obtaining the horizontally long sample printing pattern.

Figure 22:
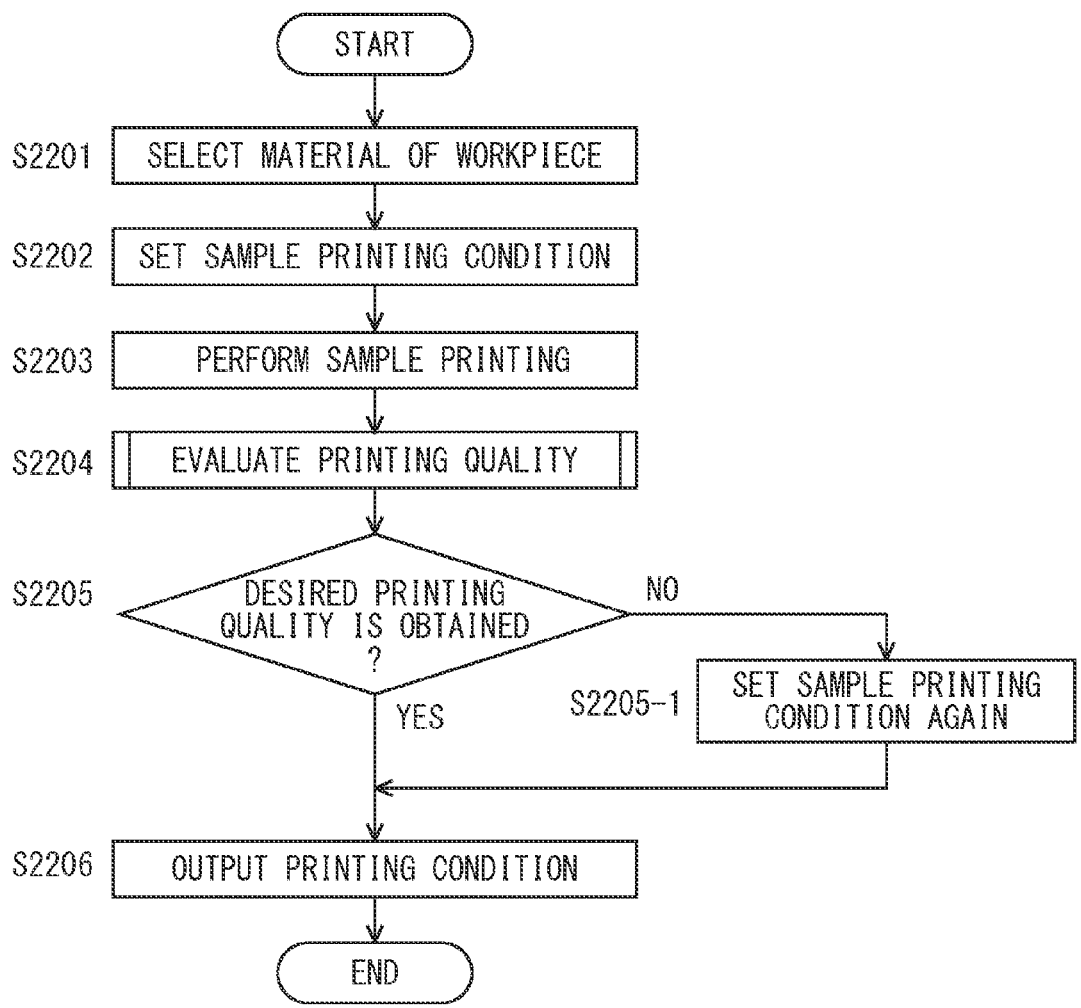
FIG. 22 is a flowchart illustrating a sample printing procedure when a new template is selected.

As described above, the number of sample printing times is previously and properly set according to the material for the workpiece. The user can arbitrarily set the sample printing conditions. For example, in the case that the new template is selected, the user can arbitrarily set the sample printing conditions including the number of sample printing times. In this case, FIG. 22 illustrates the procedure of the sample printing. In FIG. 22, the procedure of Steps 2201 to 2204, namely, the procedure until the first-time sample printing is performed is identical to that of FIG. 9. In Step S2205, whether the desired printing quality is obtained is determined based on the evaluation result of the printing quality in Step S2204. When the desired printing quality is obtained, the flow goes to Step S 2206 to become the same procedure as that of Step S910. On the other hand, when the desired printing quality is not obtained, the flow goes to Step S2206-2, the sample printing conditions are set again, and the flow returns to Step S2203 to perform the second-time sample printing. The procedure is repeated until the desired printing quality is obtained, the flow goes to Step S2206 when the desired printing quality is obtained, and the printing conditions are finally decided as described above.

(Printing Quality Evaluation Procedure)

The specific procedure for performing the printing quality evaluation with the printing quality evaluation apparatus 400, namely, the procedure for capturing the sample printing pattern SP printed in the workpiece, calculating the score indicating the read stability with the printing quality evaluation section 65, and deciding the sample code having the high score, namely, the high printing quality will be described below with reference to flowchart of FIGS. 24 and 25 and user interface screens of FIGS. 23 to 49. The printing quality evaluation procedure corresponds to the sample printing evaluation step (Steps S904 and S905 of FIG. 9) in the sample printing mode. FIGS. 23 to 49 illustrates the user interface screens of the printing quality evaluation program displayed on the evaluation display section 72 of FIG. 1. At this point, the printing quality evaluation program is integrated with the optical information reading program manipulating the optical information reading system 2000, and various settings of the optical information reading apparatus 300 can be performed from an optical information reading apparatus manipulation screen 260 of FIG. 23. Buttons executing various functions are disposed in the upper stage of the optical information reading apparatus manipulation screen 260. When a "printing optimization" button 262 is pressed, a printing quality evaluation function can be executed. In the first embodiment, the printing quality evaluation program manipulating the printing quality evaluation apparatus 400 is incorporated in the optical information reading program. Alternatively, the printing quality evaluation program and the optical information reading program may separately be configured, or one of the printing quality evaluation program and the optical information reading program may be called by the other.

(Printing Quality Evaluation Function) (Setting of Workpiece Placing Condition in Step S2401)

Figure 24:
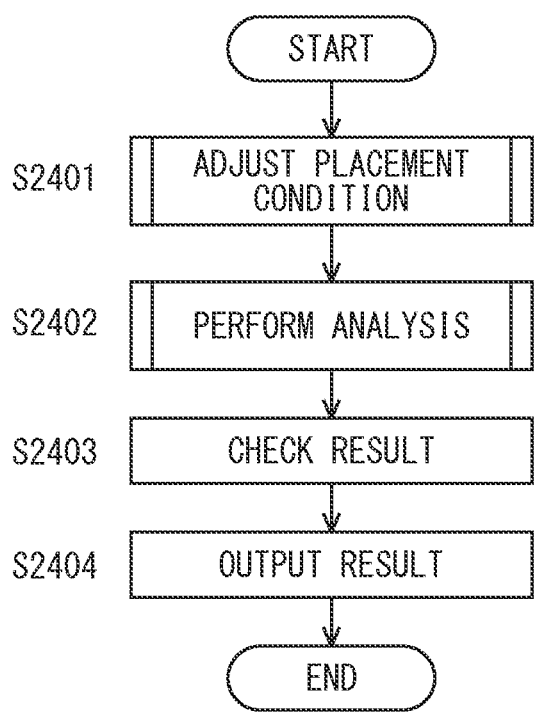
FIG. 24 is a flowchart illustrating a procedure for performing a printing quality evaluation.
Figure 25:
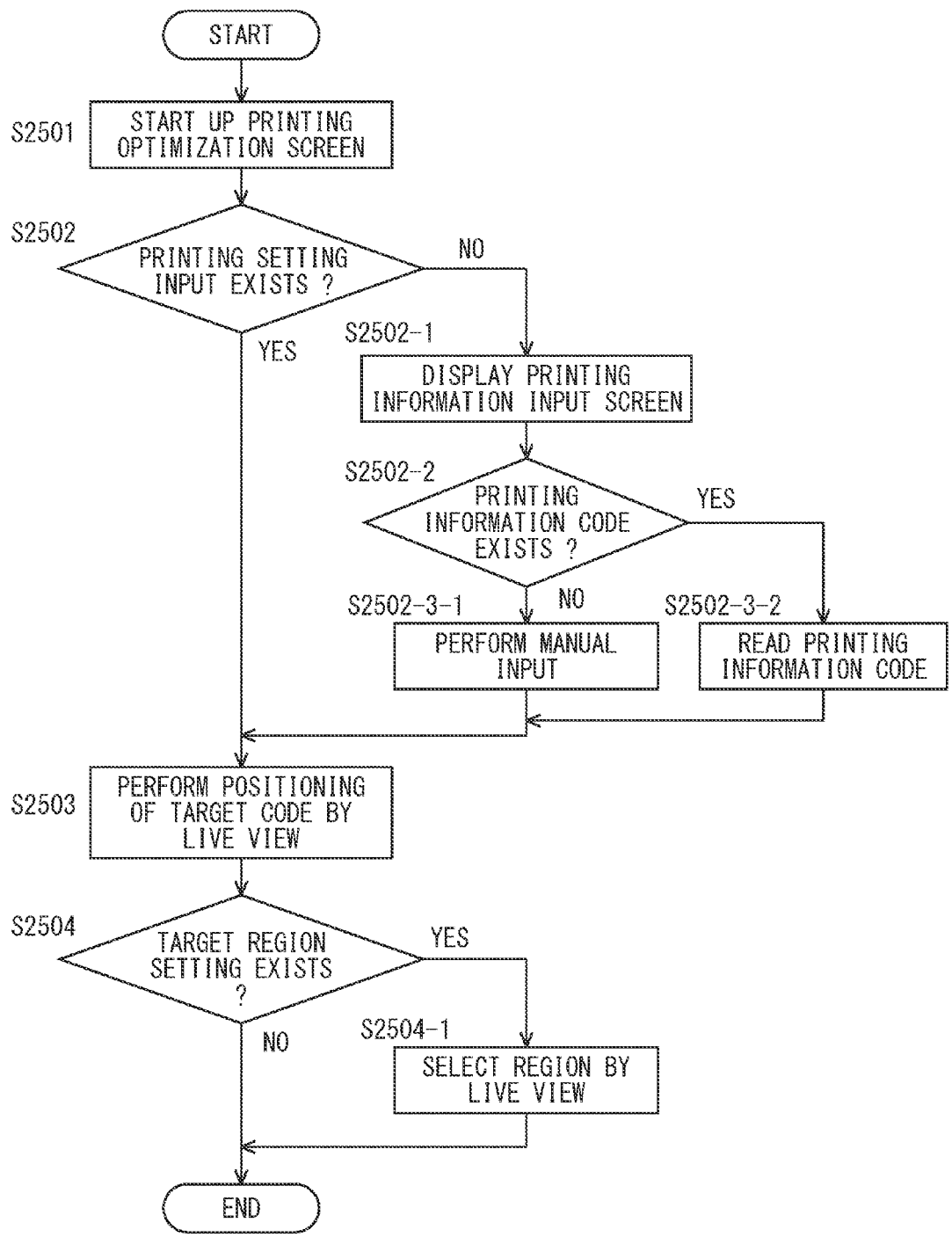
FIG. 25 is a flowchart illustrating a procedure for setting a workpiece placing condition.

As illustrated in Step S2401 of the flowchart of FIG. 24, a workpiece placing condition is set in order to execute the printing quality evaluation function. FIG. 25 illustrates the detailed procedure of the workpiece placing condition.

(Start-up of Printing Optimizing Screen 270 in Step S2501)

Figure 23:
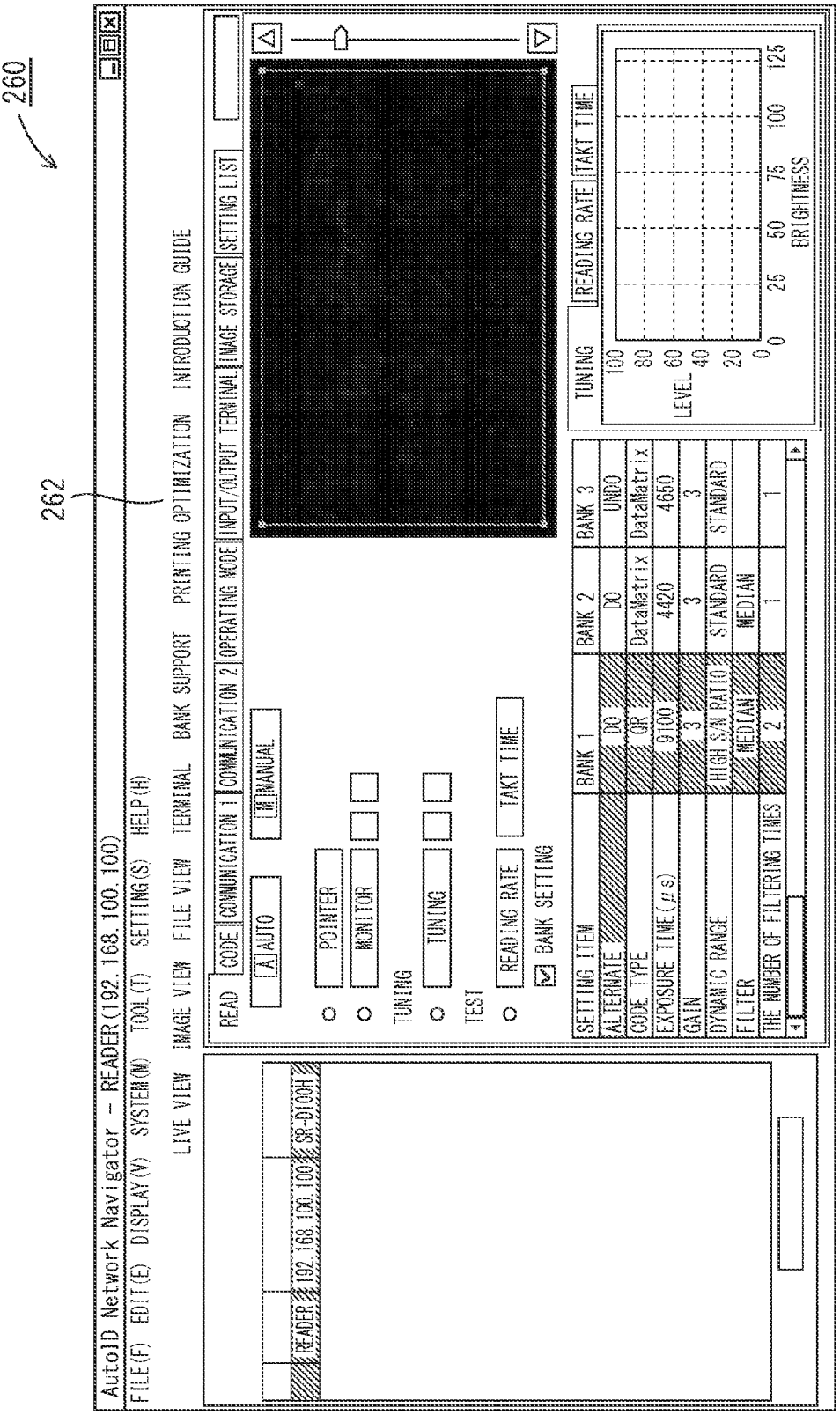
FIG. 23 is a view illustrating a user interface screen of an optical information reading program.
Figure 26:
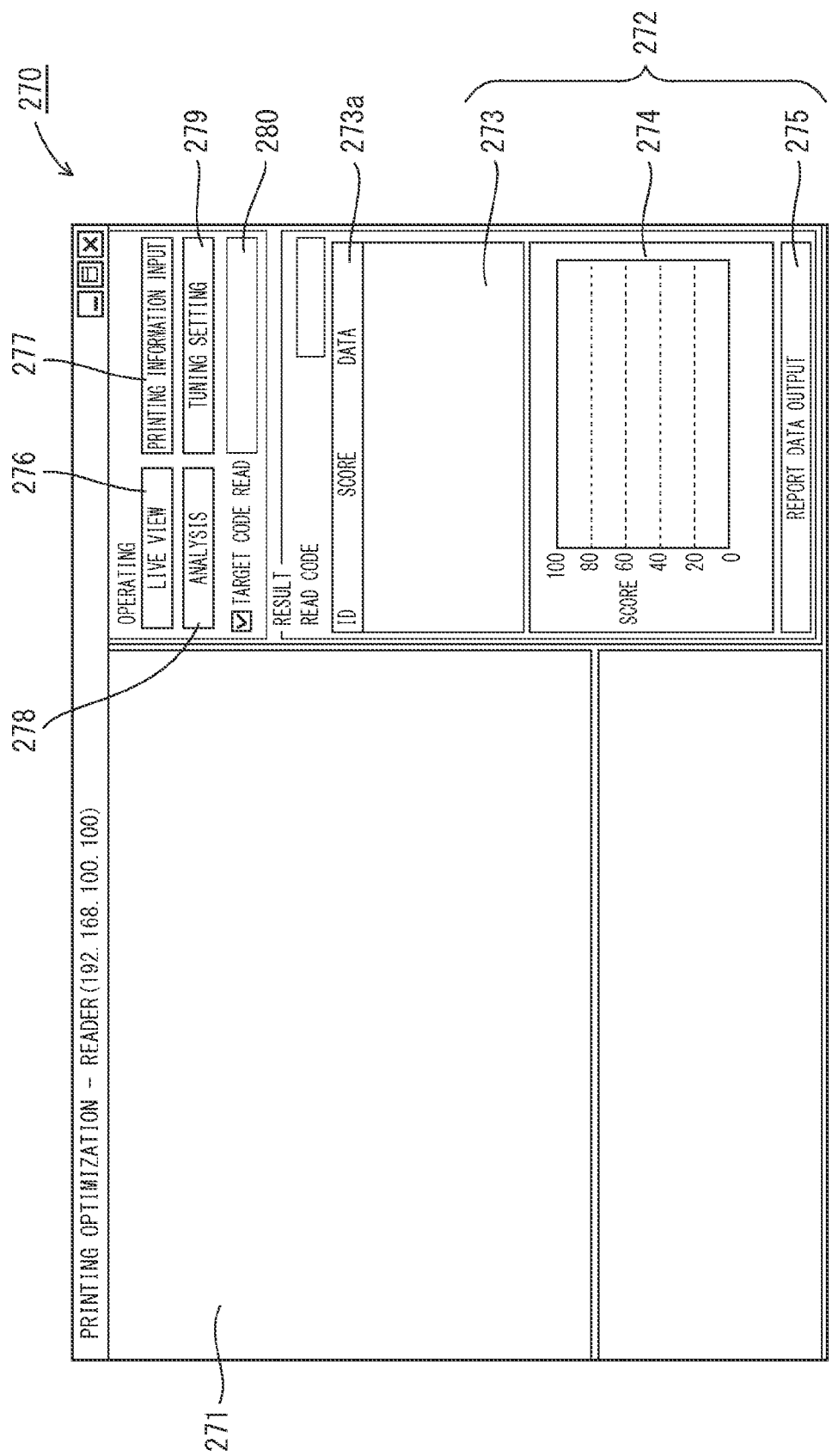
FIG. 26 is a view illustrating a printing optimizing screen.

Specifically, a printing optimizing screen 270 of FIG. 26 is displayed when the "printing optimization" button 262 is pressed on the optical information reading apparatus manipulation screen 260 of FIG. 23. In the printing optimizing screen 270, a display region 271 is provided on the left, and a manipulation region 272 is provided on the right. For example, an image of the symbol captured by the image capturing section 51 and a real-time image (live view) can be displayed in the display region 271. The buttons that perform various manipulations are provided in the manipulation region 272. A score displaying field 273 in which the score is displayed, a graph display field 274, and a "report data output" button 275, and the like described later are provided in the manipulation region 272.

At this point, only an ID, the score, and the data are displayed in an item field 273a of the score displaying field 273, and the variable parameter is added to the item field 273a when the printing information described later is input. The graph corresponding to the calculated score is displayed in the graph display field 274. In FIG. 26, a "live view" button 276, a "printing information input" button 277, an "analysis" button 278, a "tuning setting" button 279, and a "clear" button 280 and the like are provided in the upper stage of the manipulation region 272. When the "clear" button 280 is pressed, an analysis result is cleared.

Figure 27:
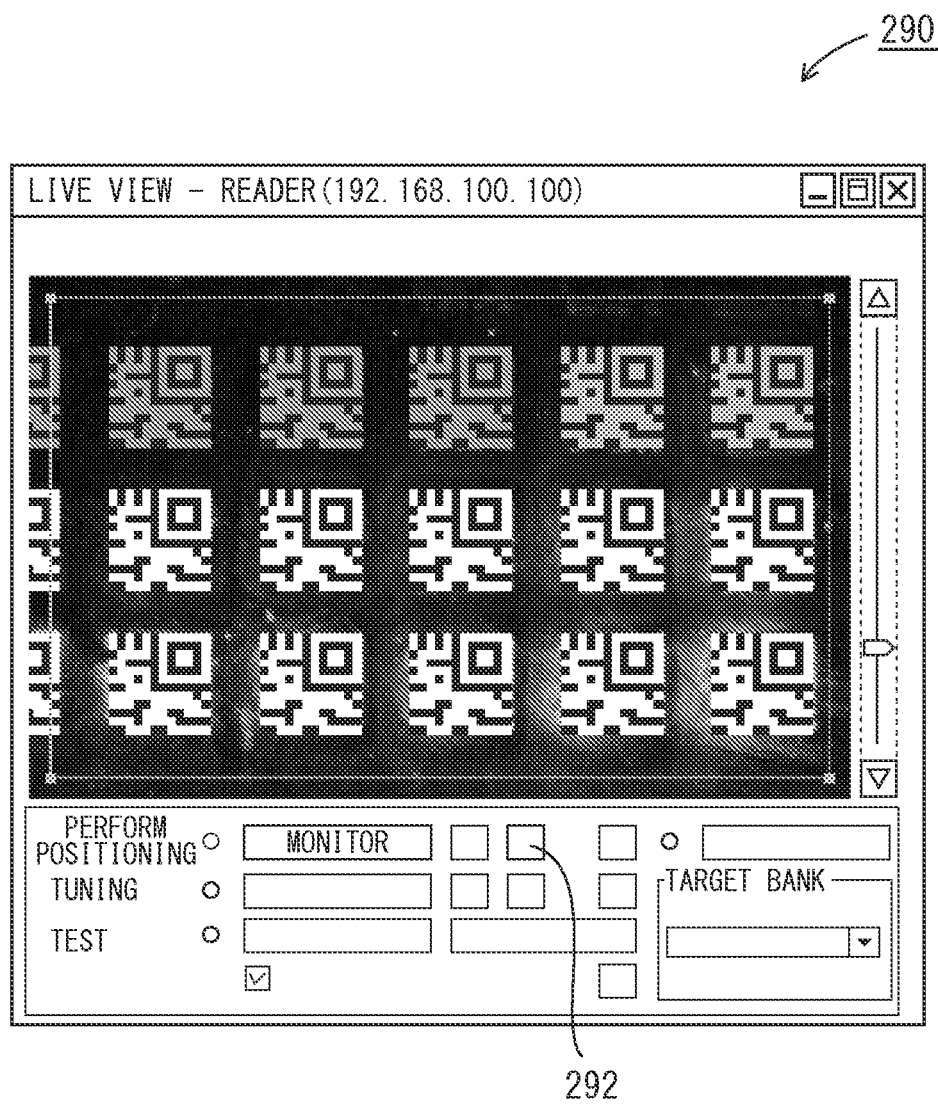
FIG. 27 is a view illustrating a live view screen.

First an illumination condition and a placement condition are adjusted in order to execute the printing quality evaluation function. A live view screen 290 of FIG. 27 is displayed when the "live view" button 276 is pressed on the printing optimizing screen 270 of FIG. 26. The image captured by the image capturing section 51 is displayed in real time on the live view screen 290. The user adjusts the illumination while viewing the real-time image (live image).

(Adjustment of Illumination Condition)

Figure 28:
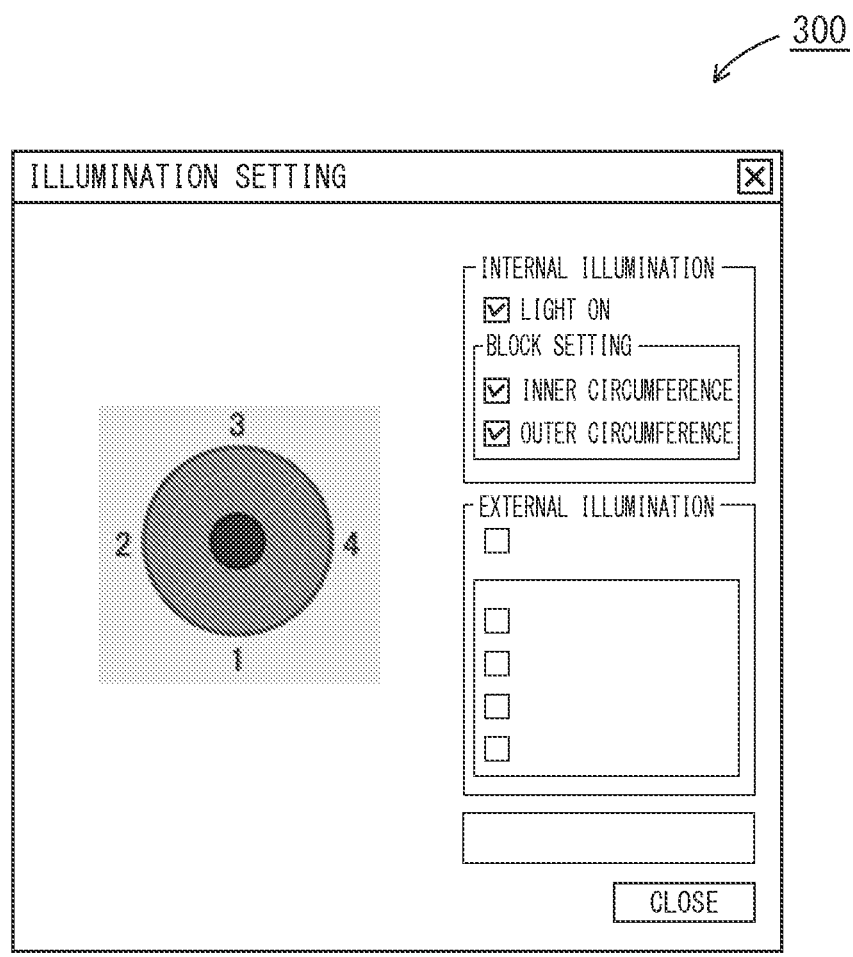
FIG. 28 is a view illustrating an illumination setting screen.

When an illumination setting button 292 is pressed on the live view screen 290 of FIG. 27, an illumination setting screen 300 of FIG. 28 is displayed, which allows the setting of the illumination condition. As described above, in addition to the internal illumination unit 54, the external illumination unit 55 can be connected to the optical information reading apparatus 300. When the external illumination unit 55 is connected to the optical information reading apparatus 300, the setting of the external illumination unit 55 can also be performed from the illumination setting screen 300. Each illumination unit can partially be lit. In the first embodiment, the illumination is radially divided (divided into blocks) into two lines of an inner circumference and one line of an outer circumference, and the illumination is circumferentially divided into four directions, namely, the left, right, top, and bottom. The user lights on or turns off the desired illumination block to adjust the illumination condition suitable for the image capturing of the sample code or the link data. The image can also be captured plural times while the illumination block or the brightness is changed. In this case, an illumination parameter to be changed is also set.

The user can adjust not only the illumination but also the placement position of the workpiece or the image capturing section 51 while viewing the real-time image. The adjustment of the placement position can be performed in Step S2503 in addition to this state.

(Tuning Setting)

Figure 29:
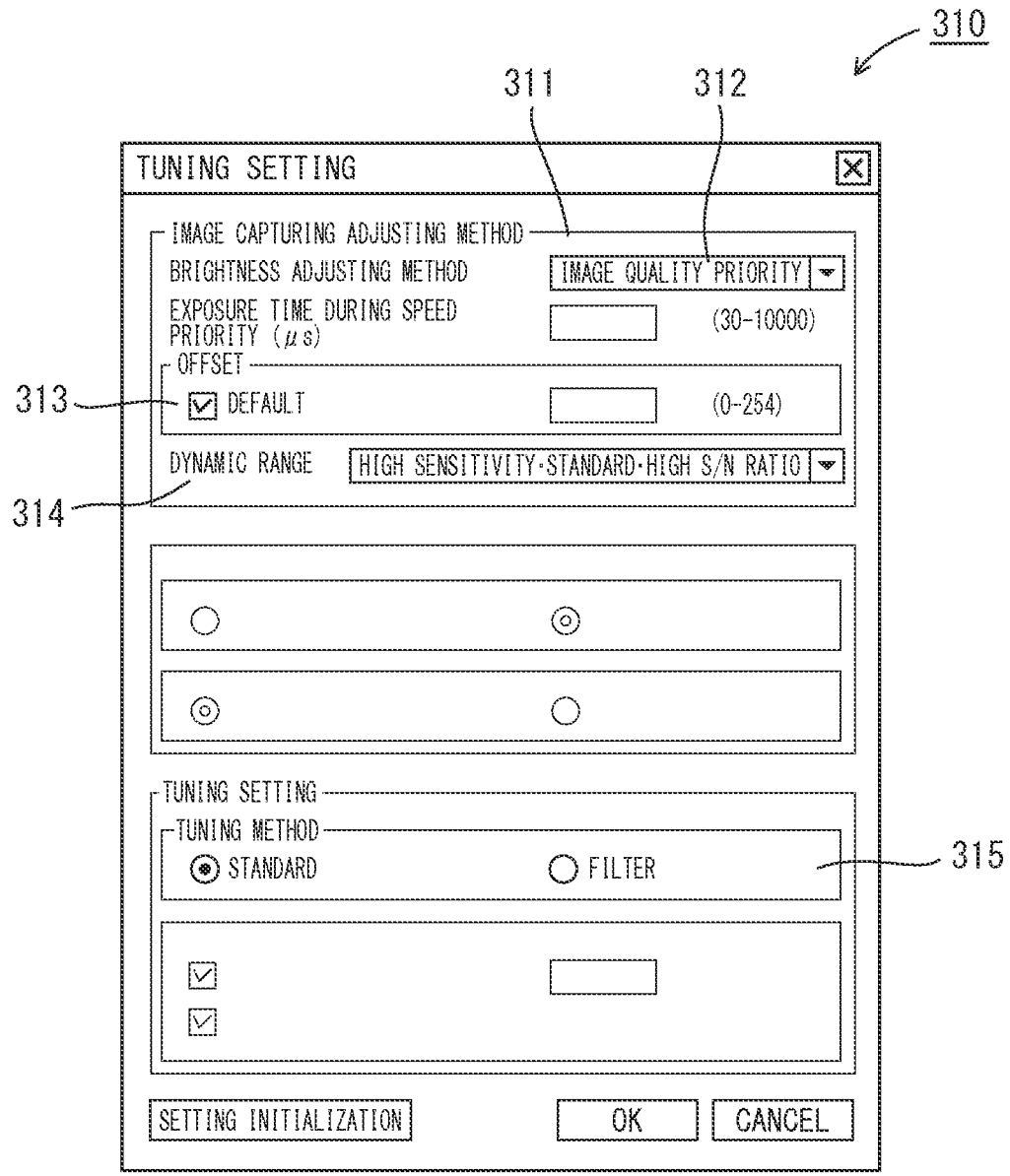
FIG. 29 is a view illustrating a tuning setting screen.
Figure 30:
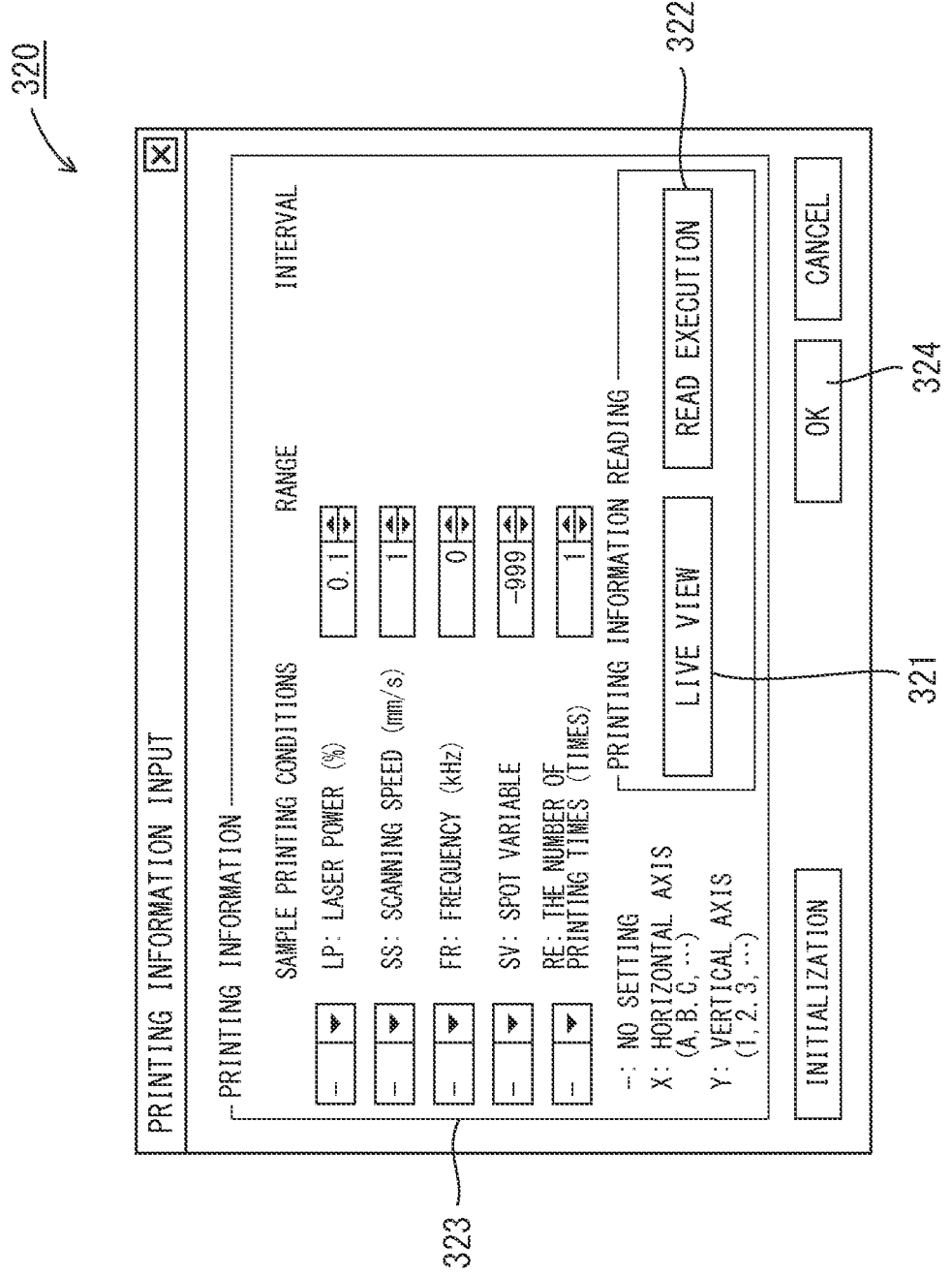
FIG. 30 is a view illustrating a printing information input screen.
Figure 31:
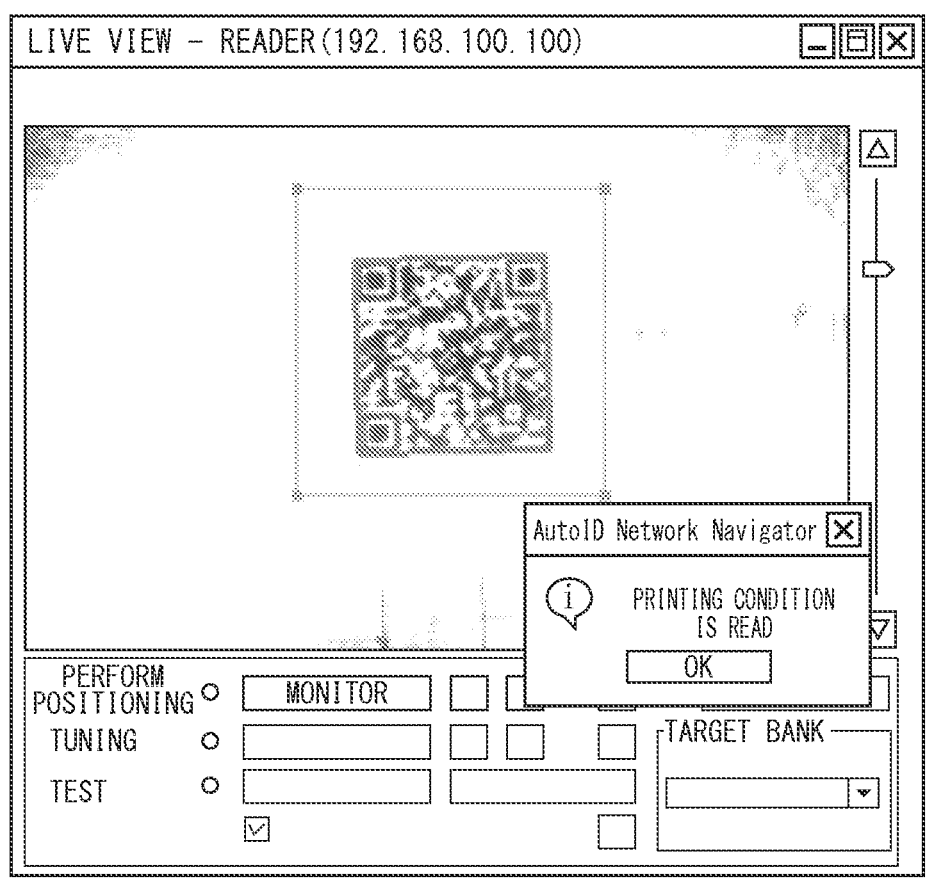
FIG. 31 is a view illustrating a state in which link data is read.

Tuning processing is also set along with the detailed adjustment of the illumination condition. The tuning means processing of calculating the score indicating a read margin of the sample code. Specifically, a tuning setting screen 310 of FIG. 29 is displayed when the "tuning setting" button 279 is pressed on the printing optimization screen 270 of FIG. 26. The setting is performed from the tuning setting screen 310 when the tuning is individually performed to the sample of the read target. An image quality adjusting method setting field 311 is provided in the upper stage of the tuning setting screen 310, and a brightness changing method can be set. At this point, the brightness is determined by (gain)×(illumination intensity)×(exposure time). "Image quality priority" or "speed priority" can be selected in a brightness adjusting method setting field 312 provided in the image quality adjusting method setting field 311. When "image quality priority" is selected, the exposure time is selected in a range of 30 µs to 5000 μs to restrict the maximum value of the gain up to 2.0 times. When "speed priority" is selected, the exposure time becomes the manual setting, and the numerical value can be specified. At this point, the exposure time can freely be set in the range of 30 μs to 10000 μs. The maximum value of the gain is set up to 5.4 times.

A reference point of the captured image can be changed in an offset setting field 313. The reference point means a level of the brightness at which the black is recognized, and the value of the reference point can be set to an arbitrary value of 0 to 254. When a default is selected, the reference point is set to 254.

A dynamic rage setting field 314 is decided by the selection of the brightness adjusting method of the tuning. At this point, four options of "Hi-DR", "high sensitivity", "standard", and "high S/N" are prepared in the dynamic rage setting field 314. In "Hi-DR", a dynamic range is expanded by log conversion of a pixel value. In "high sensitivity", the brightness of the pixel value is made a linear characteristic, and the sensitivity is set to four multiplying factors. In "standard", the brightness of the pixel value is made a linear characteristic, and the sensitivity is set to two multiplying factors. In "high S/N", the brightness of the pixel value is made a linear characteristic, and the sensitivity is set to the same multiplying factor.

Two types, namely, "standard" and "filter" can be selected in a tuning method setting field 315. In "standard", the input image is directly processed. In "filter", 21 types of pieces of preprocessing is performed to the input image, and the preprocessing having the highest read margin is automatically selected. In the preprocessing, 7 types of pieces of image processing of inflation, contraction, open, close, averaging, median, and unsharp mask are applied once to triple to perform pieces of processing including processing with no use of a filter to 22 types of images. As described above, the detail setting of the illumination condition and the tuning setting can be performed from the tuning setting screen 310.

(Existence or Non-Existence of Printing Information Input in Step S2502)

Then the printing information is input as needed basis. Specifically, the existence or non-existence of the printing information input is determined in Step S2502 of the flowchart of FIG. 25. The flow goes to Step S2503 when the input printing information does not exist, and the flow goes to Step S2502-1 when the printing information is input. In Step S2502-1, a printing information input screen 320 is displayed to input the printing information. Specifically, a "printing information input" button 277 is pressed on the printing optimization screen 270 of FIG. 26 to display the printing information input screen 320 of FIG. 30. The printing information can be input in the printing information input screen 320.

(Existence or Non-Existence of Printing Information Code in Step S2502-2)

Then the flow goes to Step S2502-2 to input the printing information. In the first embodiment, two ways of a manual input and an automatic input are prepared as the printing information input methods. The automatic input is performed by reading the printing information code (link data LT). Specifically, the existence or non-existence of the printing information code is determined in Step S2502-2. When the printing information code exists, the flow goes to Step S2502-3-2 to read the printing information code. At this point, a "live view" button 321 is pressed on the printing information input screen 320 of FIG. 30 to display a live view screen 290 of FIG. 31. The symbol (link data LT) is displayed on the live view screen 290, and a "read execution" button 322 is pressed to perform the read. The read data is decoded, and the decoded data value is input to the printing information input screen 320 as illustrated in FIG. 32.

On the other hand, when the printing information code does not exist in Step S2502-2, the flow goes to Step S2502-3-1 to perform the manual input. Specifically, the user directly and manually inputs the printing information from the printing information input screen 320 of FIG. 30 without displaying the live view screen 290 of FIG. 31. At this point, the printing parameter ("-" (no setting) is selected in a class selection field 323 of FIG. 32) or the variable parameter ("X" (horizontal axis) or "Y" (vertical axis) is selected in the class selection field 323 of FIG. 32) is selected as each printing parameter constituting the sample printing conditions, each value or range is specified. When the variable parameter is selected in the class selection field 323, input fields of the ranges and intervals are displayed as illustrated in FIG. 32. At this point, the Q switch frequency and the spot variable are set to the variable parameters, and the ranges and the intervals of the Q switch frequency and the spot variable are input.

(Completion of Printing Information Input)

Figure 32:
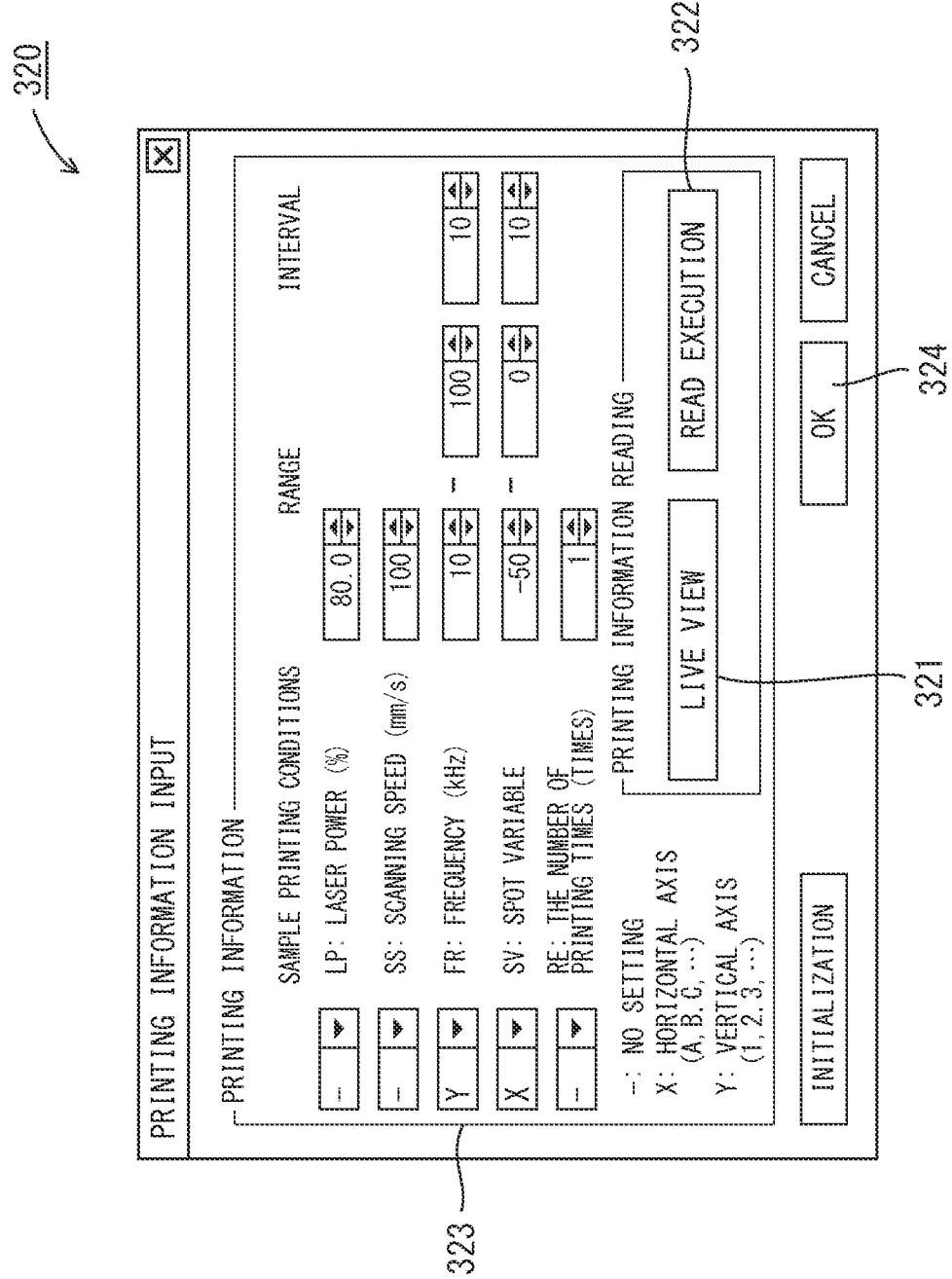
FIG. 32 is a view illustrating a state in which each piece of data read from the link data is input to the printing information input screen.
Figure 33:
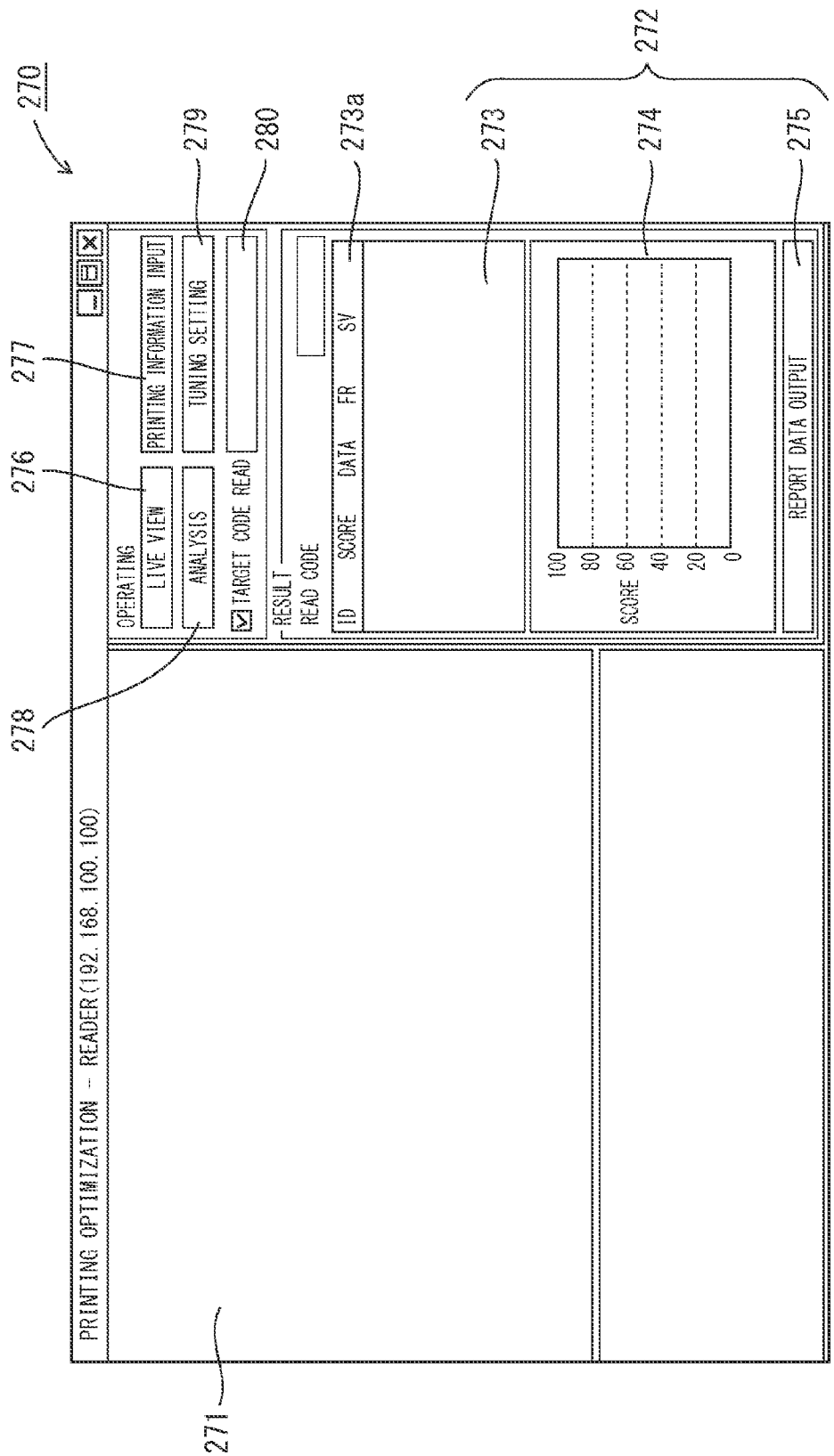
FIG. 33 is a view illustrating a state in which a variable parameter is added to an item name of the screen of FIG. 26.

When the printing information input is ended, an "OK" button 324 provided in the lower right of FIG. 32 is pressed to close the printing information input screen 320 and return to the printing optimizing screen 270. In the case that the variable parameter is included in the input printing condition, the item field 273a of the score displaying field 273 provided in the manipulation region 272 is changed so as to include the corresponding variable parameter. As illustrated in the screens of FIGS. 26 and 33, displays of FR (Q switch frequency) and SV (spot variable) are added to the item field 273a in addition to the ID number, the score, and the data of the sample code. A sort display function of performing a sort using the displayed numerical value is also provided for each item (the detail is described later). TACT (=(1/SS)×RE×1000) (SS is the scanning speed and RE is the number of printing times) can also be displayed as the item.

Therefore, a tact time of the printing is estimated, and the value of TACT can be used as an index that the tact time of the printing is shortened with increasing value of TACT.

(Positioning of Target Sample Code by Live View in Step S2503)

When the printing information is specified, the position of the workpiece is adjusted using the live view as needed basis such that the sample code of the image capturing target is captured in the screen (Step S2503).

(Target Region Setting in Step S2504)

The target region can also be set on the live view screen 290 (Step S2504). In the case that the target region is set, the flow goes to Step S2504-1, and a rectangular region is specified from the live view screen 290 so as to surround the sample code using the mouse and the like. For example, in the sample codes displayed in the live view screen 290, the user can specify the target region such that the sample code that clearly has the bad printing result is previously removed from the analytical target. The specification is performed by the target region setting section 73 illustrated in the block diagram of FIG. 1. Specifically, the desired target region is set on the captured image using the pointing device (evaluation manipulation section 71) such as the mouse. In addition to a frame shape that specifies a diagonal line, a free curved line may be used as the target region. Therefore, the user selects only the sample codes to be analyzed, for example, the three columns of the sample code in the live view screen 290 of FIG. 27 from the whole of the sample printing pattern or the state in which a specific portion of the sample printing pattern is displayed, and the time necessary for the analysis can be shortened such that the user selects only two lower columns in the three columns (FIG. 44) to restrict a target region OA.

The workpiece placing condition and the like are set as described above. The above procedure is described only by way of example, and the setting procedure and the like can be changed as appropriate. For example, the illumination condition and the printing condition may be input after the positioning of the workpiece.

(Analysis in Step S2402)

Figure 34:
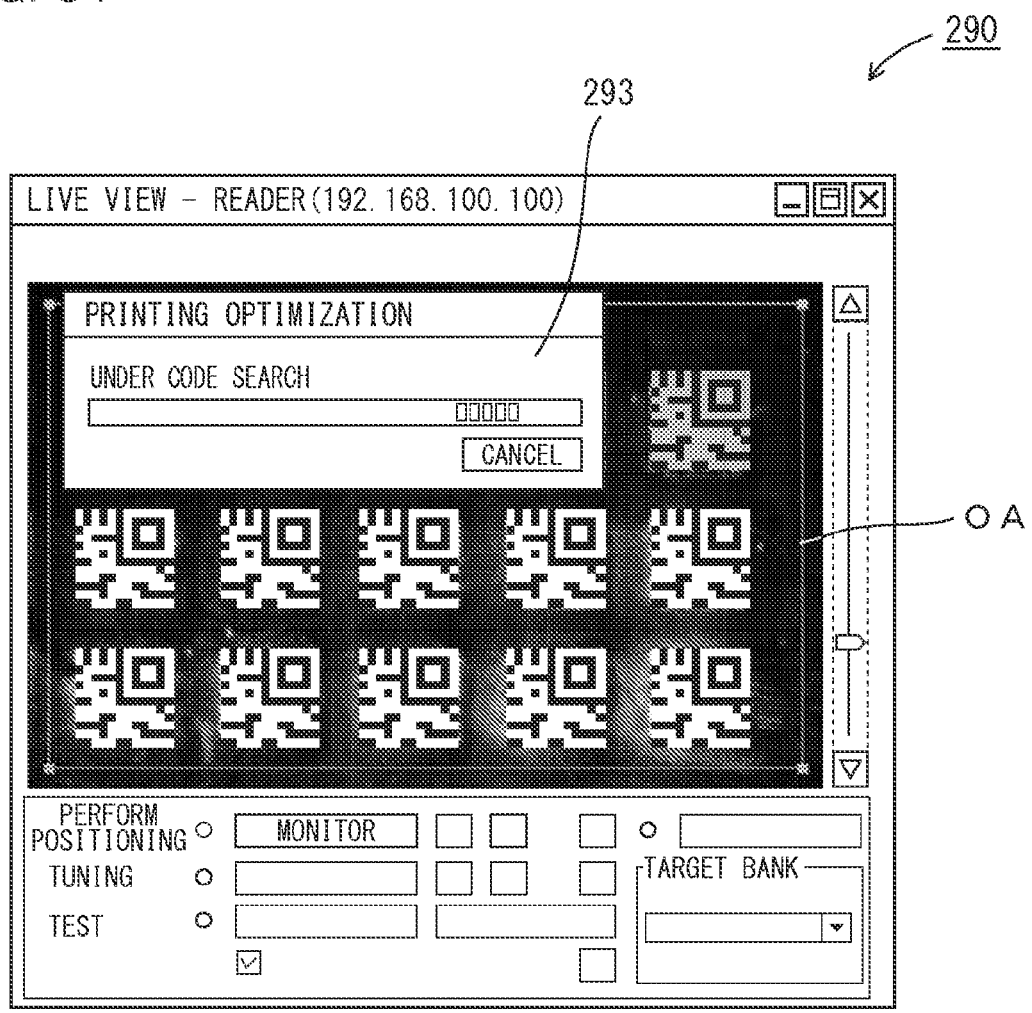
FIG. 34 is a view illustrating a state a sample code is searched while brightness of the illumination is changed.

Referring to the flowchart of FIG. 24, the description of the printing quality evaluation function will be continued. When the workpiece placing condition is set in Step S2401, the flow goes to Step S2402 to perform the analysis. An "analysis" button 278 is pressed on the printing optimizing screen 270 of FIG. 33. As illustrated in FIG. 34, the printing quality evaluation section 65 searches the sample code while the brightness of the illumination is changed. When the target region is set in Step S2504, the search is performed in the target region to extract the sample code that can be read through the image processing. When the target region is not set, the search is performed in a visual field displayed on the live view screen, and the sample code that can be read through the image processing is extracted. The procedure of the analytical processing will be described with reference to the flowchart of FIG. 35.

(Procedure of Analytical Processing)

Figure 35:
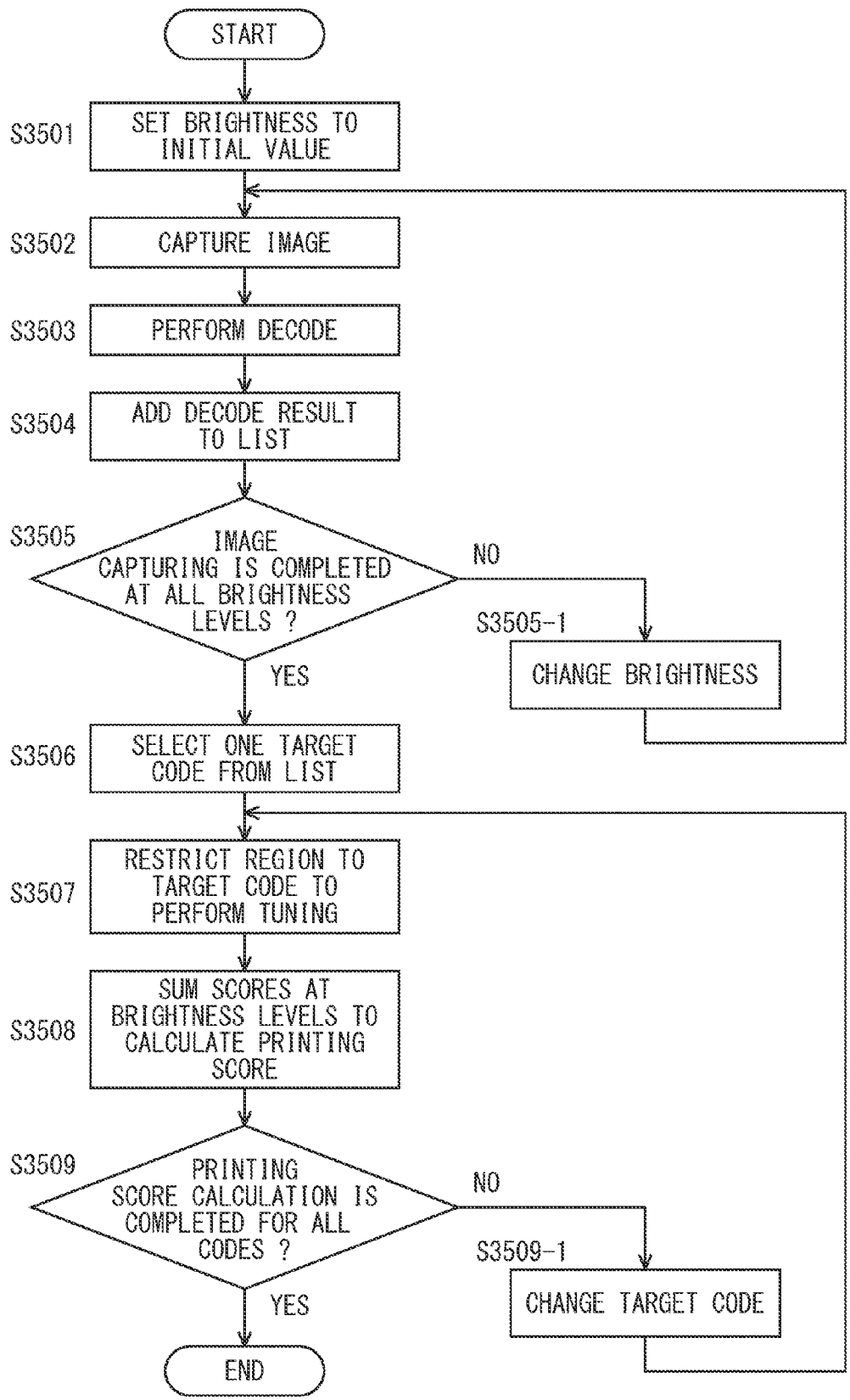
FIG. 35 is a flowchart illustrating an analytical processing procedure.

In the analytical processing of FIG. 35, the image of the sample code is repeatedly captured while the brightness of the illumination is changed as the illumination condition. Specifically, the brightness of the illumination is set to an initial value in Step S3501. The flow goes to Step S3502 to capture the image of the sample code. The image capturing is performed by the image capturing section 51, and the visual field is adjusted during the image capturing such that resolution suitable for the read is obtained in each sample code.

Figure 36:
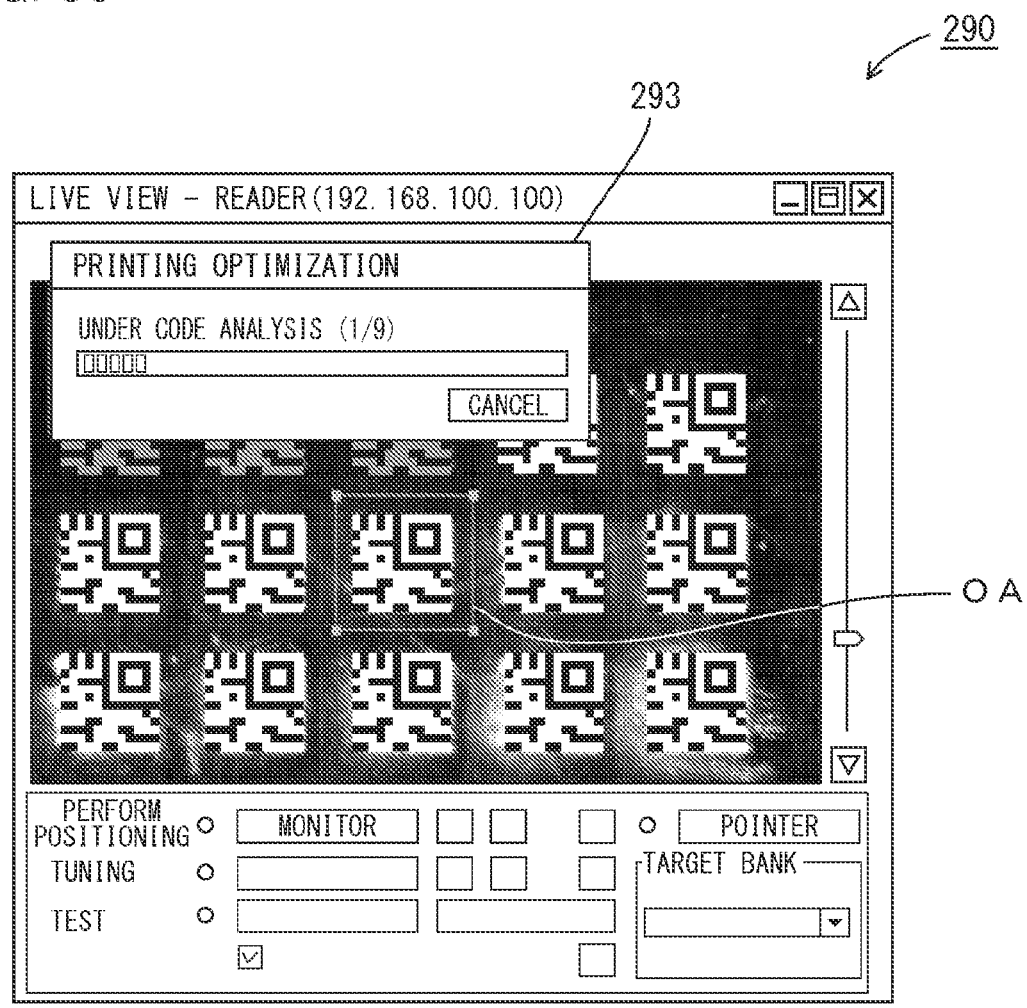
FIG. 36 is a view illustrating a state in which the detected sample code is displayed while surrounded into a frame shape.

In Step S3503, the symbol extracting section 63 extracts the sample code from the captured image, and the decoding section 53 or 69 performs decoding processing of the sample code. In Step S3504, the decoded result is added to the list. As illustrated in FIG. 34, in the live viewing image, when the captured image of the sample code is specified, the target region OA is displayed while superposed into the frame shape, and a progress bar 293 is displayed during the sample code analysis. When the sample code that can be read is found in the visual field, the found sample code is displayed while surrounded into the frame shape as illustrated in FIG. 36.

When the one-time image capturing is ended, whether the image capturing is completed for all the brightness values is determined in Step S3505. When the image capturing is not completed for all the brightness values, the flow goes to Step SS3505-1 to set the brightness to the next brightness value, and the flow returns to Step S3502 to repeat the image capturing. When the image capturing is completed for all the brightness values, the flow goes to Step S3506.

In Step S3506, one sample code that becomes the target is selected from the sample codes added to the list. Then the flow goes to Step S3507, the tuning is performed while restricted to the target sample code.

(Calculation of Printing Score)

In Step S3508, the scores of the brightness values are summed up to calculate a printing score.

The printing score is calculated by various methods. For example, the sum of the scores of the brightness values is multiplied by a predetermined coefficient, or a value proportional to the sum of the scores of the brightness values is adopted as the printing score. When the calculation of the printing score is completed for one sample code, whether the calculation of the printing score is completed for all the sample codes is determined in Step S3509. When the calculation of the printing score is not completed for all the sample codes, the flow goes to Step S3509-1 to change the target sample code, and the flow returns to Step S3507 to repeat the printing score calculation processing. When the calculation of the printing score is completed for all the sample codes, the analytical processing is ended.

(Partial Lighting Pattern of Illumination)

In the first embodiment, only the brightness of the illumination is changed as the change of the illumination condition by way of example. Alternatively, for example, a direction of the illumination may be changed as the change of the illumination condition. For example, in the illumination setting screen of FIG. 28, the plural illumination blocks are selected from the plural illumination blocks divided into four directions, namely, the left, right, top, and bottom, the image capturing is performed while the selected illumination blocks are switched to change a partial lighting pattern of the illumination, and the score can be calculated. Therefore, advantageously the illumination condition can properly be set to the condition suitable for the read.

(Result Checking in Step S2403)

Figure 37:
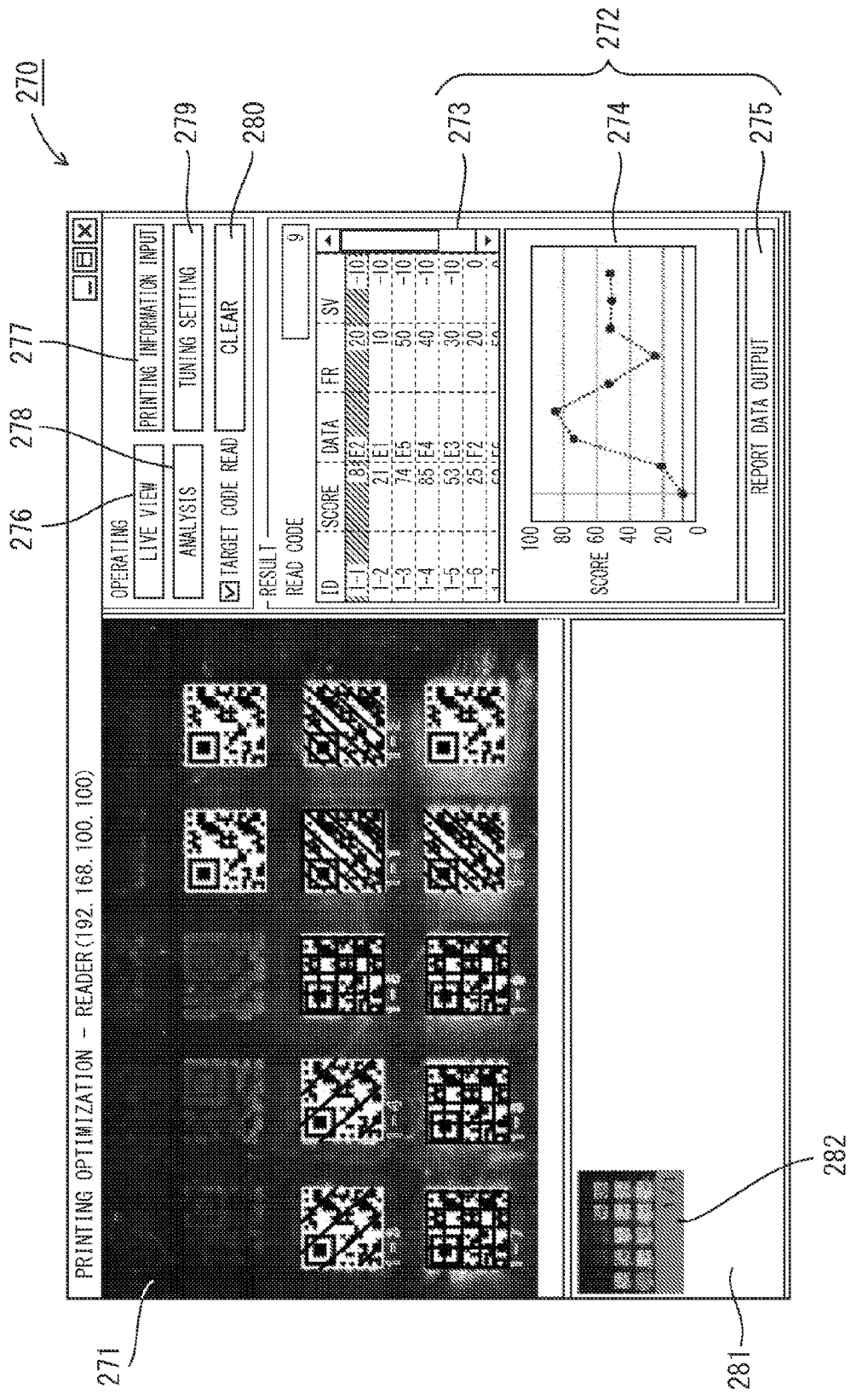
FIG. 37 is a view illustrating an analysis result.
Figure 38:
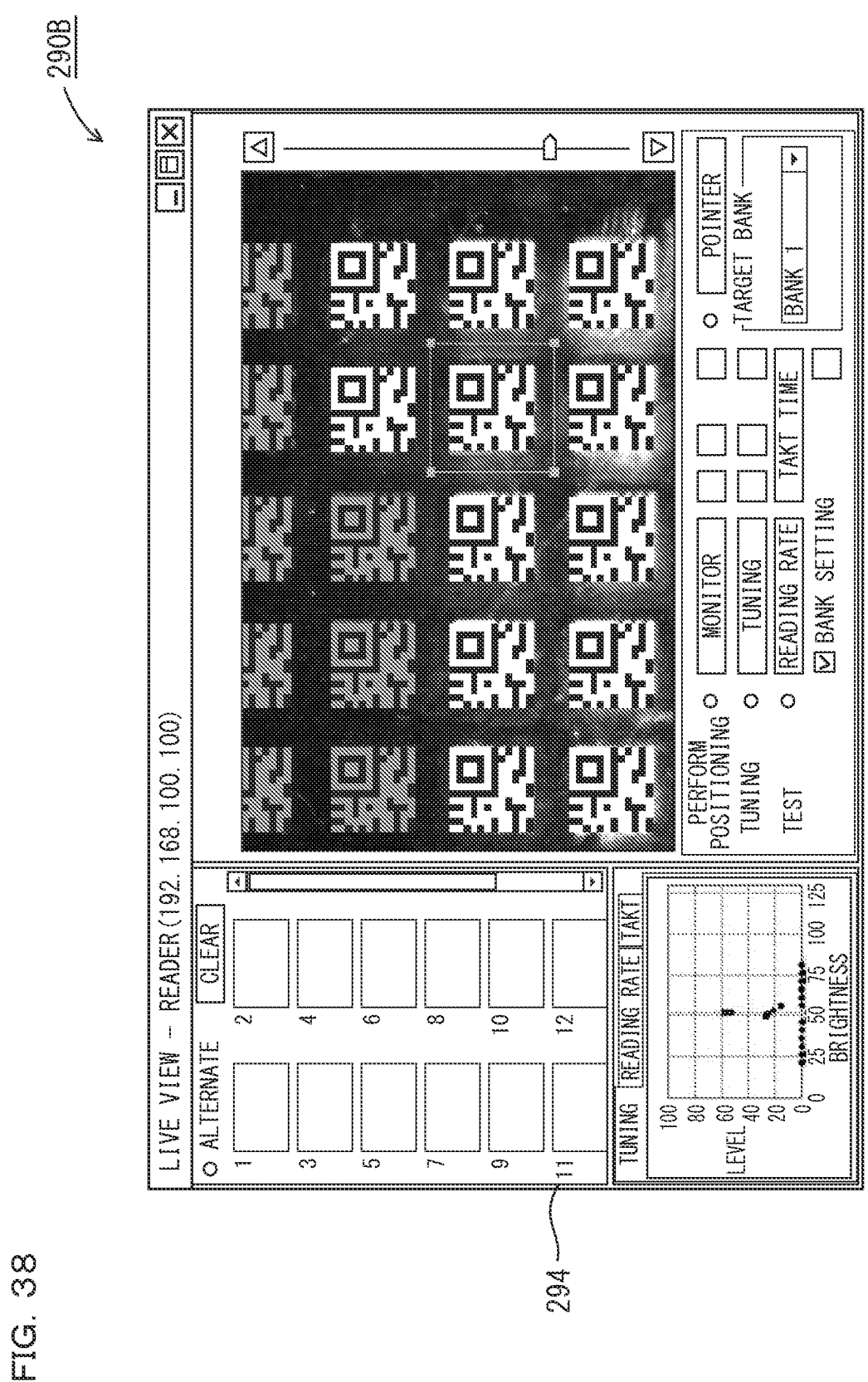
FIG. 38 is a view illustrating a live view screen that is displayed by selecting the sample code of 1-1 in FIG. 37.
Figure 39:
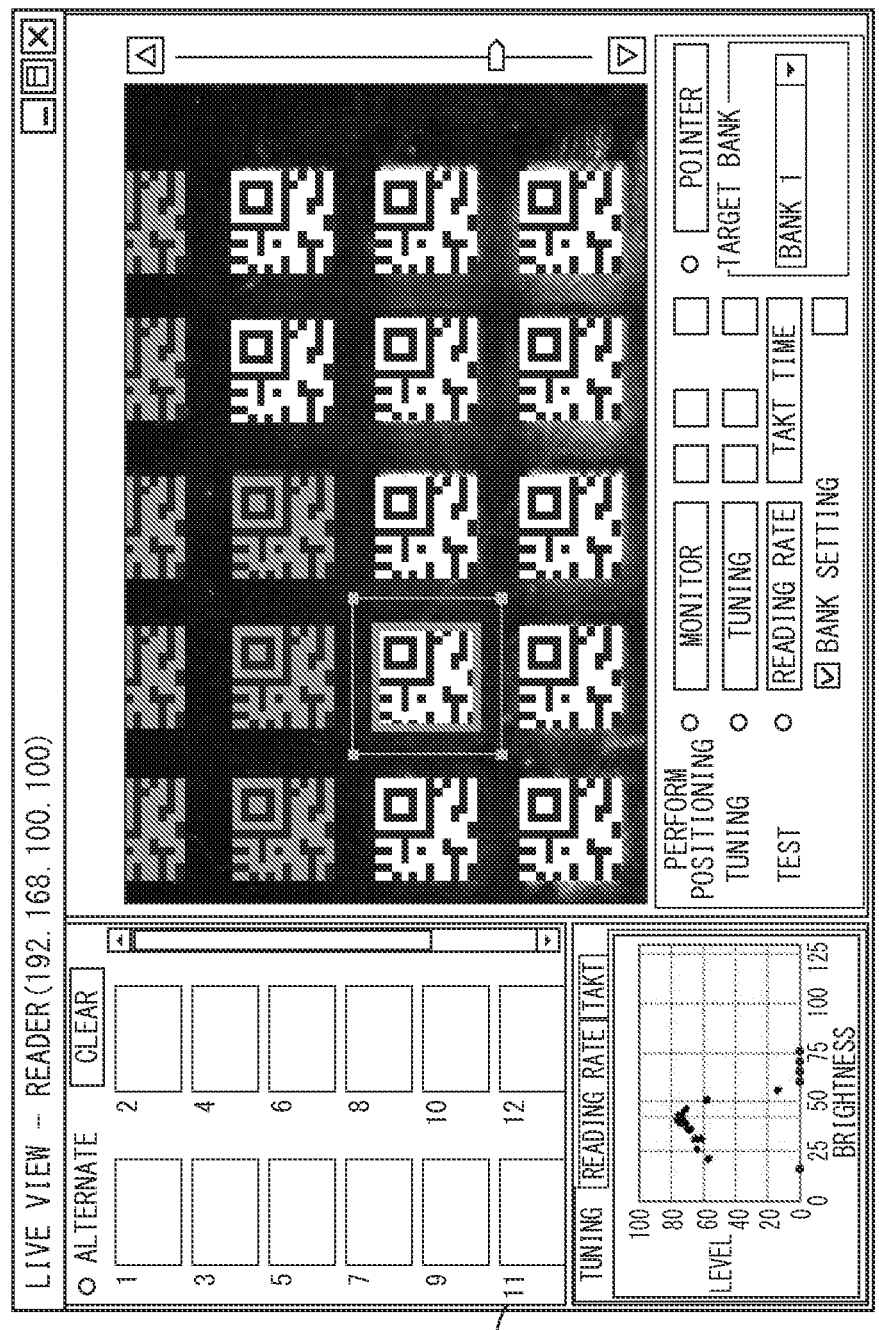
FIG. 39 is a view illustrating a live view screen that is displayed by selecting the sample code of 1-4 in FIG. 37.

Referring to the flowchart of FIG. 24, when the analytical processing is completed for all the sample codes, the flow goes from Step S2402 to Step S2403 to check the result. Specifically, as illustrated in FIG. 37, the captured images of the sample codes are displayed in the display region 271, and the scores are displayed in terms of the numerical value and the graph in the manipulation region 272.

(ID Number)

The ID number is provided to each successfully-read sample code in order found. The ID number is sequentially added such that "1-1" is added to the sample code that is initially found through the first analysis, and such that "1-2" is added to the sample code that is secondarily found through the first analysis. At this point, the nine sample codes are found. A history field 281 is provided in the lower stage of the display region 271, and a reduced image 282 of the first analysis result is displayed in terms of a thumbnail. When the subsequent analyses are performed, the thumbnail images are added to the history field 282. When the thumbnail image is selected, the corresponding analysis result is displayed in the upper stage of the display region 271. The thumbnail image acts as a switching section of the display region 271.

(Color Coding Display)

The found sample codes are displayed while color-coded. The color coding display enables the user to facilitate the visual discrimination between the sample codes that are easily read according to the result of the read stability such that the sample code that has the high score to stably perform the read is displayed in blue, such that the sample code having the intermediate score is displayed in green, and such that the sample code having the low score is displayed in red.

In the manipulation region 272, the calculated score and the graph of the score are displayed in score displaying field 273 and the graph display field 274 in order of the ID number of the sample code. In the graph display field 274, a cross-shaped red line indicates a point (plot point) selected by the user. Specifically, the points, the records, and the two-dimensional codes are displayed in the score displaying field 273, the graph display field 274, and the display region 271 in conjunction with one another. When one target is selected in one of the score displaying field 273, the graph display field 274, and the display region 271, the highlight display is performed in other regions. FIG. 37 illustrates a state in which the record having ID 1-1 (the score of "8") is selected in the score displaying field 273. In the graph display field 274, the cross-shaped red line is displayed such that the leftmost point having the score of "8" is highlighted.

At this point, each read margin is calculated when the sample code can be read at each brightness value while the brightness of the illumination is changed as the score value. When the read is performed while the brightness of the illumination is changed, the high score is obtained in the sample code in which the high read margin is obtained at the wide range of the brightness value.

When the tuning is performed again on the live view screen 290, a tuning result display field 294 is added to be able to display the detailed tuning result. When the desired sample code is selected from the successfully-read sample codes displayed in the display region 271 of FIG. 37 (or when the tuning is performed again after the selection of the desired sample code), the tuning result of the sample code is displayed on the live view screen 290. For example, when the sample code having the ID number of 1-1 in FIG. 37, the graph indicating the relationship between the brightness and the level of the tuning result is displayed in the tuning result display field 294 as illustrated in a live view screen 290B of FIG. 38 while the sample code having the ID number of 1-1 is displayed in the frame shape. When the sample code having the ID number of 1-4 in FIG. 37 is selected, the sample code having the ID number of 1-4 and the tuning result are displayed in the tuning result display field 294 as illustrated in a live view screen 290C of FIG. 39.

Figure 40:
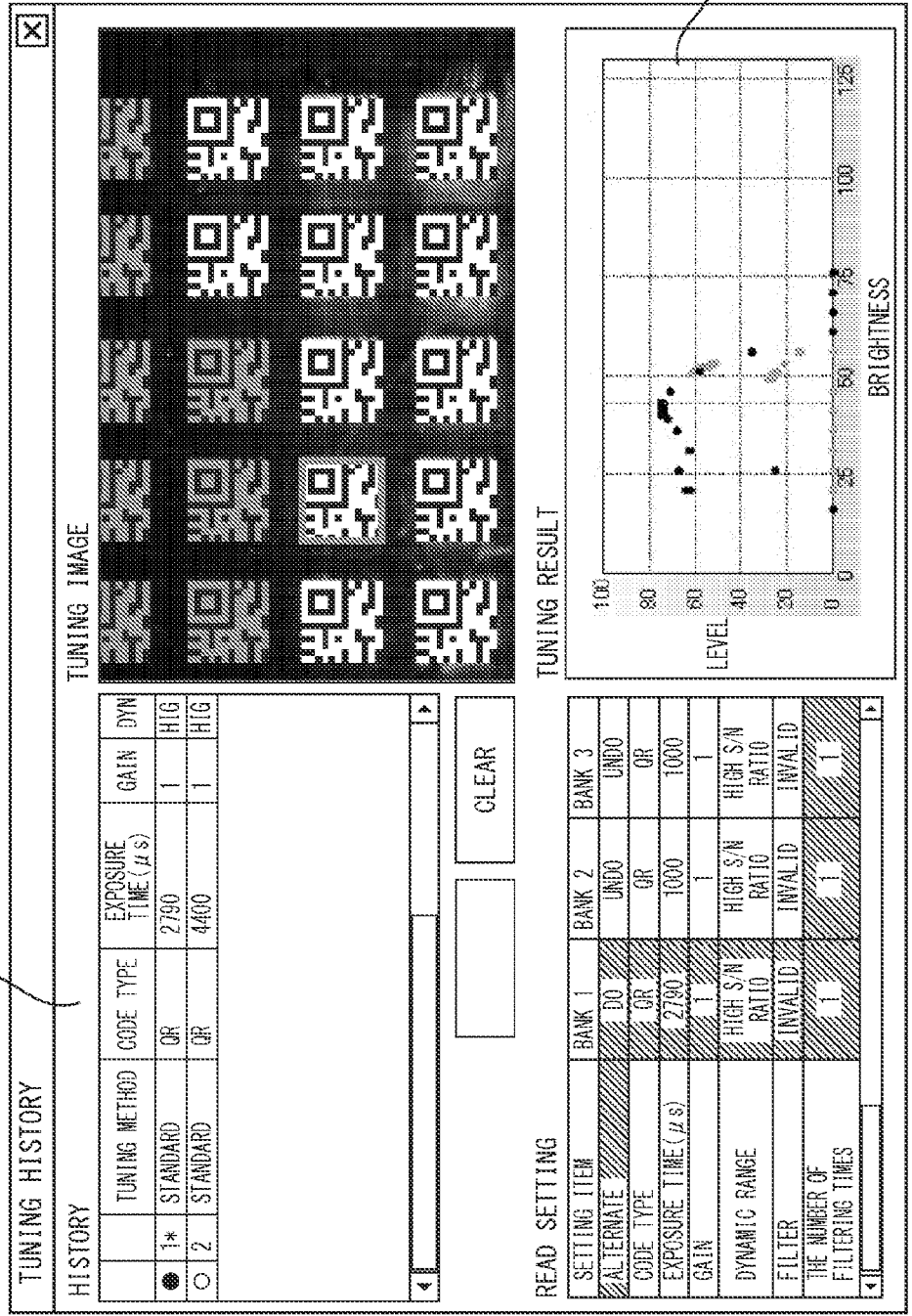
FIG. 40 is a view illustrating a state in which scores of the two sample codes are contrasted with each other.

The scores of the sample code can be compared to each other. Specifically, as illustrated in FIG. 40, a tuning history list 295 is displayed, and the graphs of the tuning results of the two sample codes are displayed in a tuning result display region 296 in the lower right of the screen while superposed. The plot values of the graphs are color-coded, and the detail of each sample code is displayed in the corresponding color in the tuning history list 295 in the upper left of the screen. Therefore, the read results of the sample codes can easily be compared to each other, and the sample code indicating the more preferably read result is easily selected.

Figure 41:
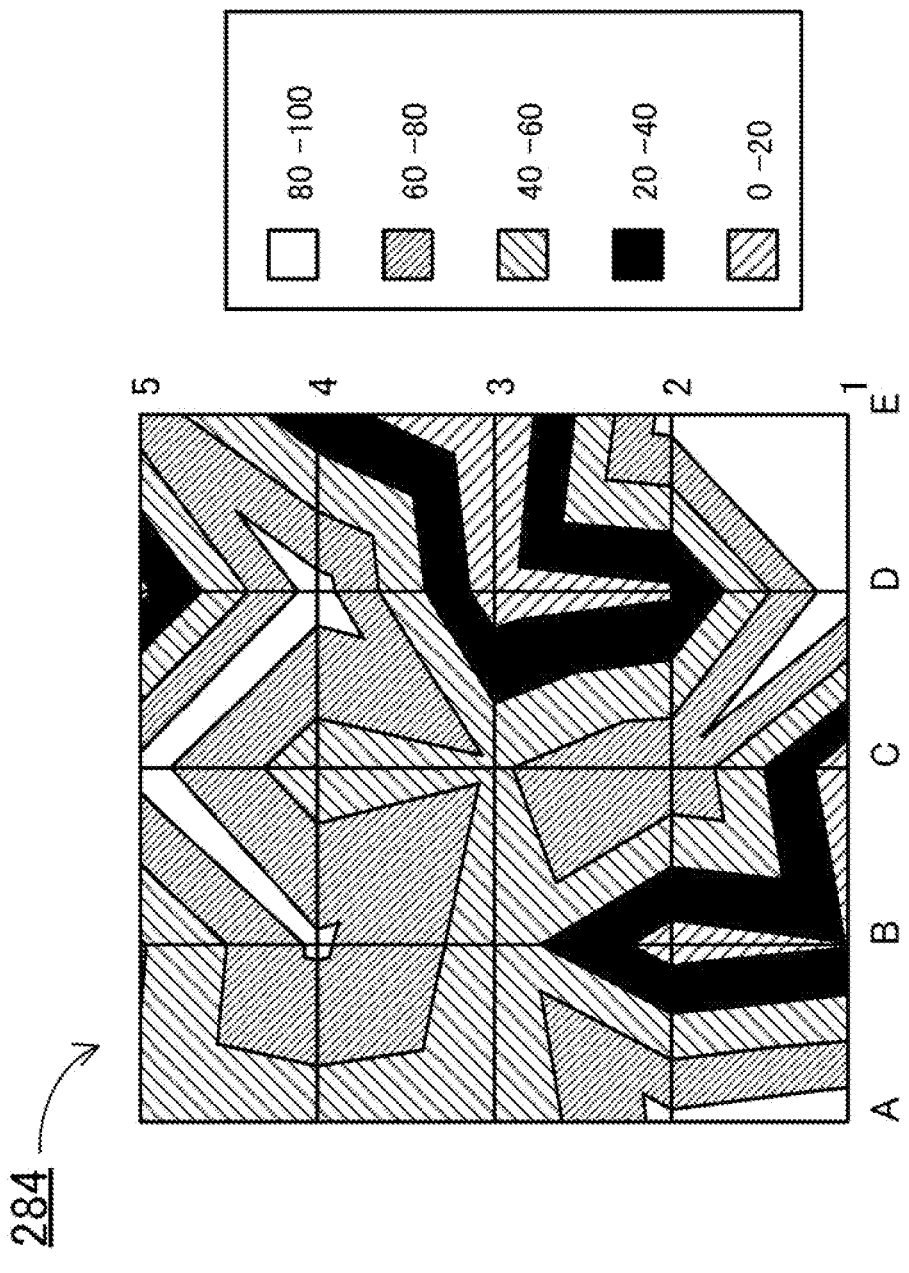
FIG. 41 is a view illustrating a score distribution state that is displayed into a contour line.

Thus, the sample code having the preferable printing quality is selected based on the score. The user selects the desired sample code based on the calculated score value. Particularly, because the sample codes indicating the preferable scores are color-coded in the display region 271, the user can select the sample code, which should most stably be read, while comparing the sample codes to each other. The user can properly select the sample code according to a distribution state of the color-coded sample codes. For the green sample code having the high score, in the case that the adjacent sample code has the low score, possibly the read stability is degraded even if the printing condition varies slightly. On the other hand, when the sample code is selected from the region where many green sample codes exist, the read can stably be performed even if the printing condition varies slightly. The score value is displayed while color-coded, so that the user can select the sample code, in which the more stable read result is expected, while referring to the distribution state. In addition to the color coding display of the sample code, for example, the distribution state can be displayed into a contour shape 284 as illustrated in FIG. 41. Alternatively, not only the user selects the sample code, but also the sample code indicating the best score can automatically be selected on the printing quality evaluation program side. When the user cannot select the desired sample code through the result checking in Step S2403, the flow may return to Step S2503 (FIG. 25) to repeat the analysis in Step S2402. In this case, Steps S2501 and S2502 of FIG. 25 may be omitted.

(Result Output in Step S2404)

When the sample code having the optimum printing quality is selected, the evaluation output section outputs the result (Step S2404). Specifically, the evaluation result or the identification information is displayed on the evaluation display section 72, or printed, or the identification information or the printing condition is directly output as the data to the laser marking apparatus 1000. The identification information or the printing condition is directly output to the laser marking apparatus 1000, which allows the printing quality evaluation to be fed back to the laser marking apparatus 1000. The user manually sets the printing condition of the laser marking apparatus 1000 based on the printing quality evaluation (Steps S904 and S908 of FIG. 9). Alternatively, the laser marking apparatus and the printing quality evaluation apparatus are connected to each other in the wireless or wired manner, and the printing quality evaluation apparatus generates a FB signal based on the printing quality evaluation result, and may feed back the FB signal to the laser marking apparatus. In the first embodiment, the sample workpieces are individually used for the sample printing with the laser marking apparatus and the printing quality evaluation with the printing quality evaluation apparatus. In the case that the same sample workpiece is used, obviously the numbers of the rows and columns of the matrix becomes identical.

(Report Output)

A report can also be output. When the "report data output" button 275 provided in the lower right of the screen of FIG. 37 is pressed, the score result is output as the report. For example, the output can be used in various modes such that the output is displayed on the screen or printed in paper, or such that the data is transmitted to the laser marking apparatus or other external devices, which are connected to the printing quality evaluation apparatus. As to a documentary form of the report output, for example, the score is displayed in each element of the sample printing pattern displayed in a matrix shape 285 as illustrated in FIG. 42. At this point, the element may be color-coded according to the score value. Alternatively, the distribution state of the color-coded score values can be displayed into a contour shape 284B as illustrated in FIG. 43.

(Synthesis of Plural Captured Images)

Figure 44:
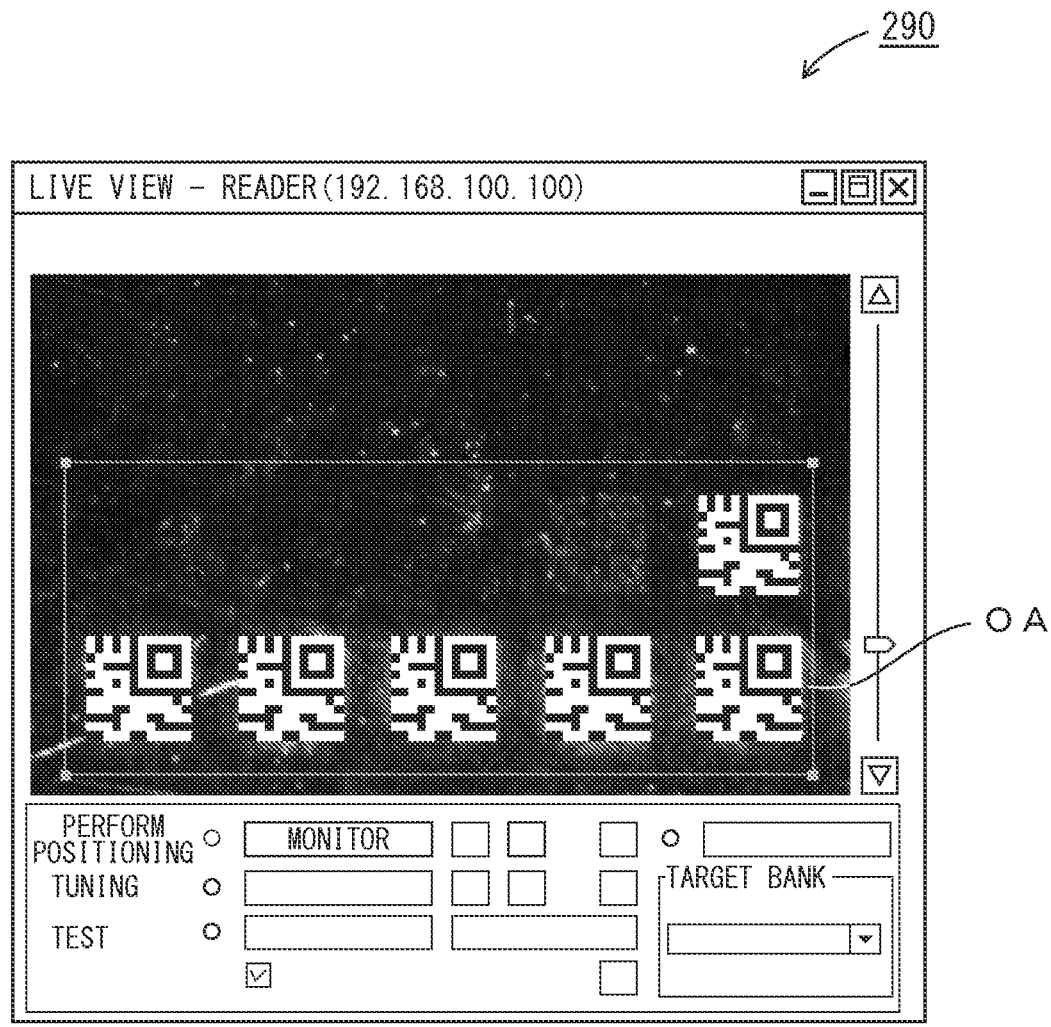
FIG. 44 is a view illustrating a state in which a target region is specified by a second-time captured image.
Figure 45:
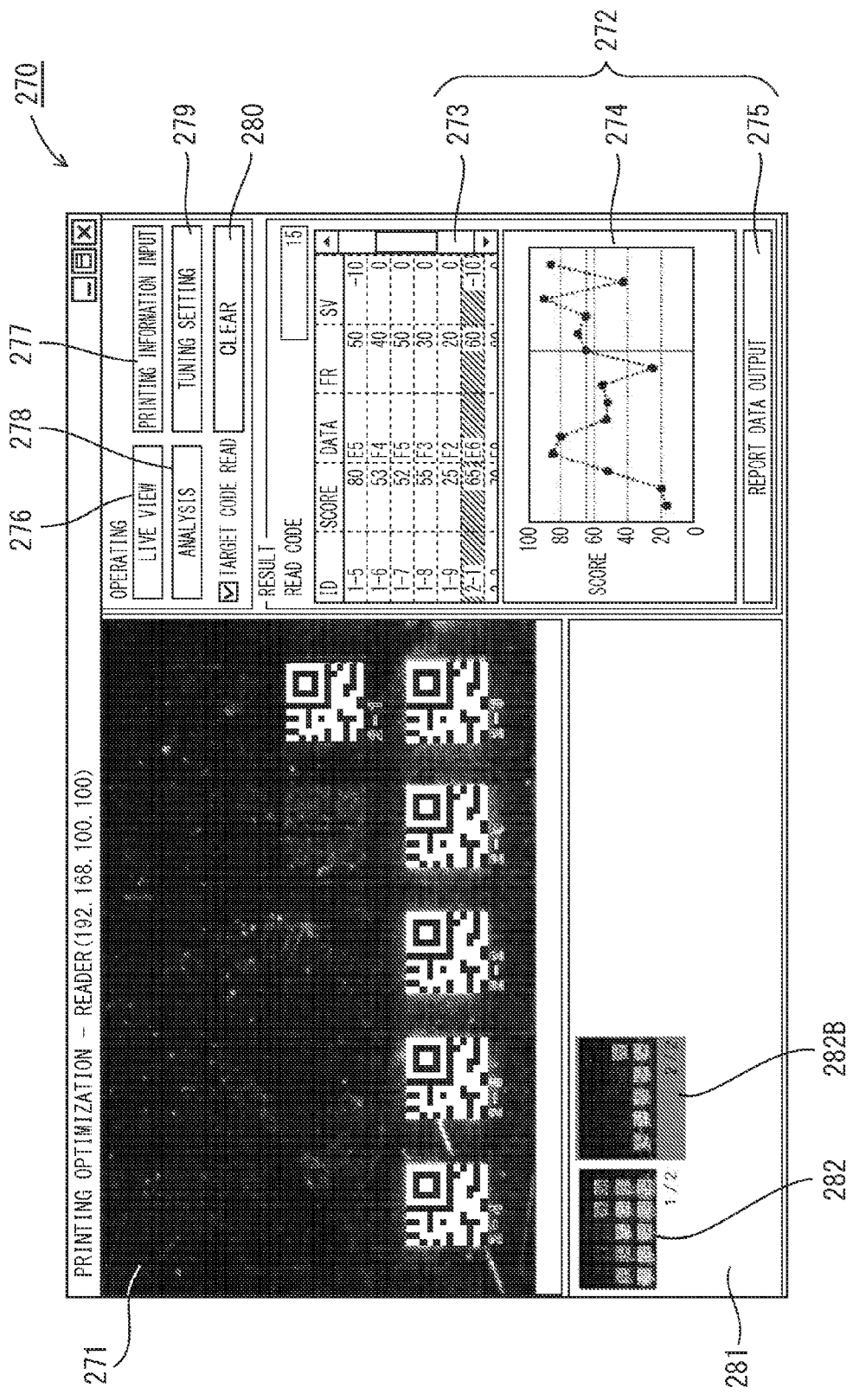
FIG. 45 is a view illustrating an analysis result of the second-time captured image.
Figure 46:
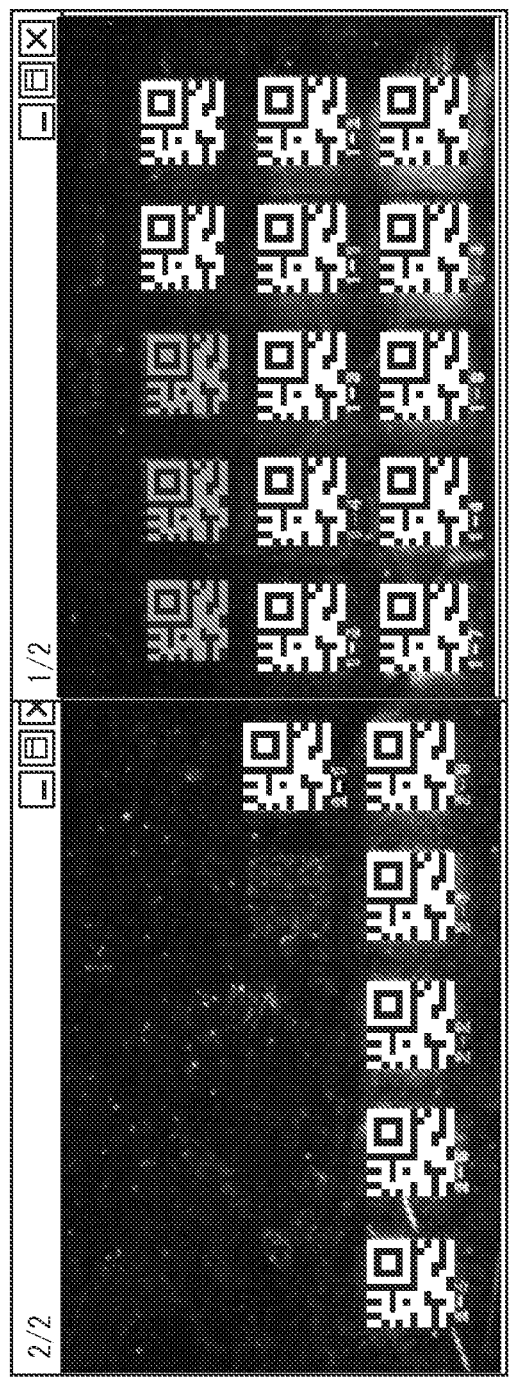
FIG. 46 is a view illustrating the analysis result displayed on a synthesis screen in which the captured images are synthesized.

As described above, it is necessary that the visual field be adjusted during the image capturing such that the resolution suitable for the read is obtained in each sample code. In the case that the number of sample codes is increased or in the case that the sample code has the large size, sometimes all the images of the sample codes cannot be captured in one screen. In such cases, it is necessary to perform the image capturing in plural batches. The state in which the image capturing is performed in plural batches will be described with reference to FIGS. 44 to 46. At the time the first image capturing (or analysis) is ended, the "live view" button 276 is pressed to display the live view screen 290 as illustrated in FIG. 37, and the visual field focuses on the second captured image as illustrated in FIG. 44. In FIG. 44, the target region OA that is of the analytical target is specified into the frame shape. Similarly, when the screen returns to the printing optimizing screen 270 of FIG. 37 to press the "analysis" button 278, the new captured image is analyzed, and the result is displayed as illustrated in FIG. 45. A reduced image 282B of the second captured image is added as the thumbnail to the history field 281 in the display region 271. As needed basis, the read images are synthesized as illustrated in FIG. 46, and the analysis result can be displayed on one screen while color-coded. All the images of the sample codes are captured with the proper resolution, and the analysis results can be compared.

The printing quality evaluation program includes a sort display function of the printing parameter and a matrix display function of the score as an analysis auxiliary function.

(Sort Display Function)

Figure 47:
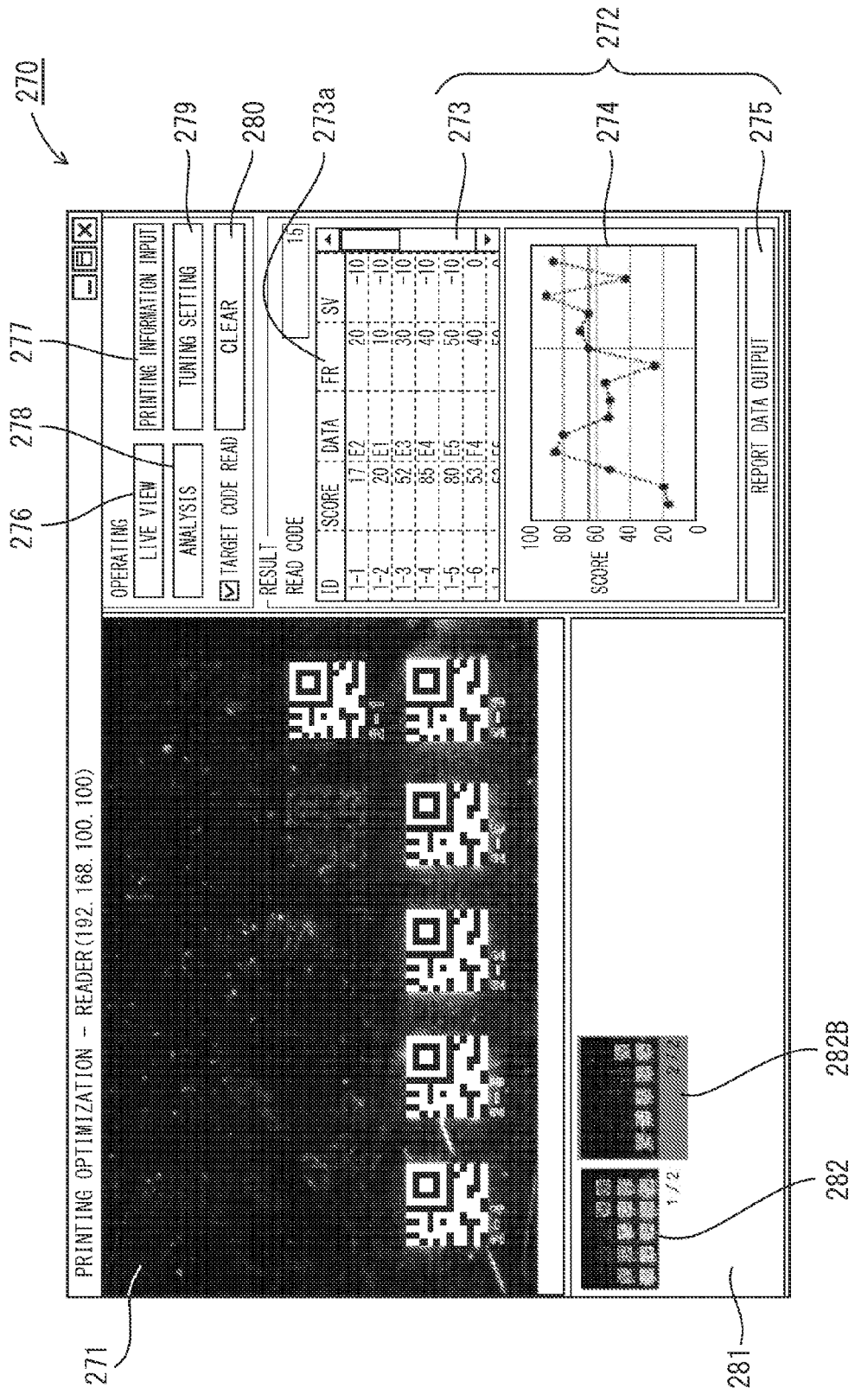
FIG. 47 is a view illustrating a state in which sorting is performed by an ID number in a score display field.
Figure 48:
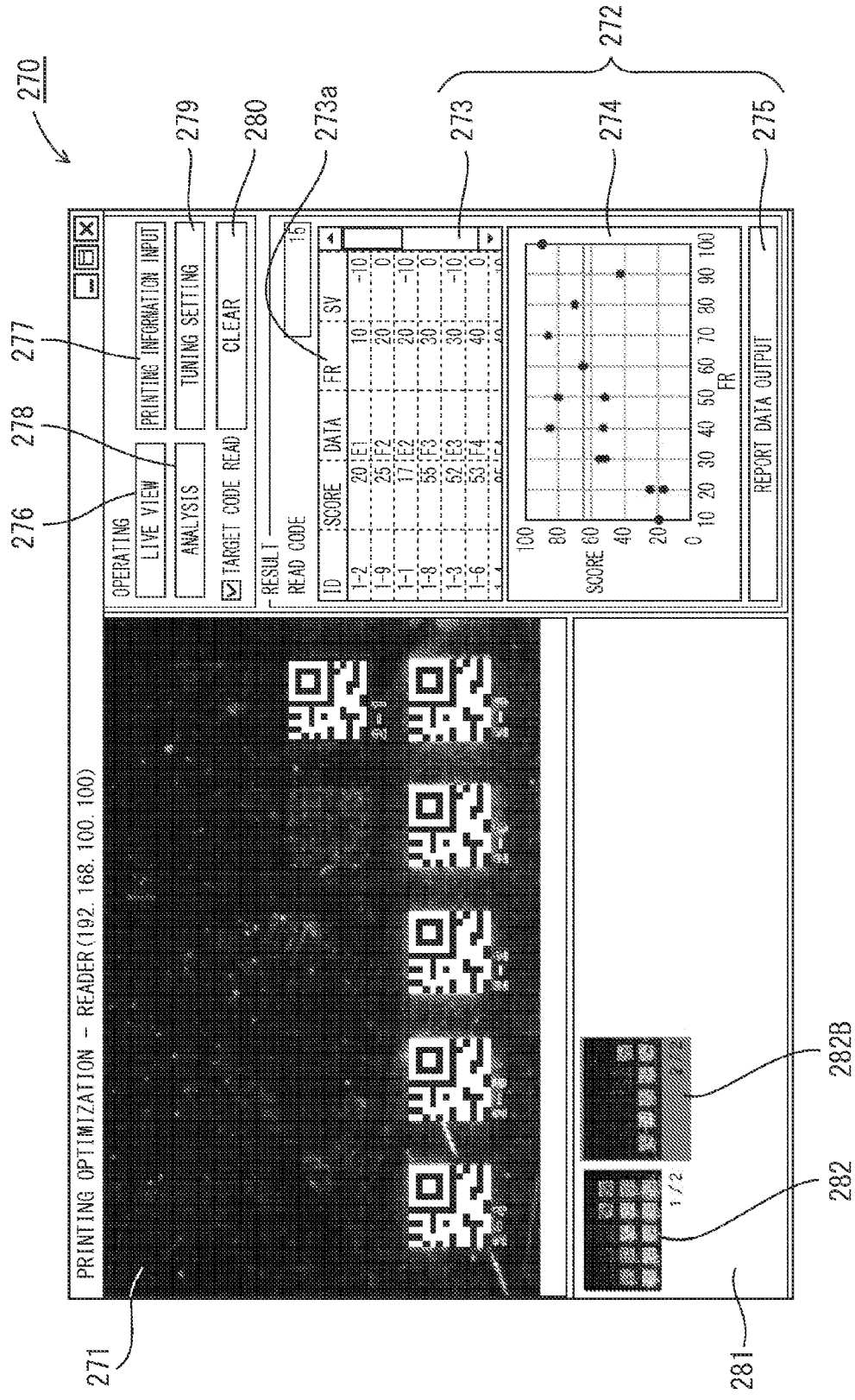
FIG. 48 is a view illustrating a state in which the sorting is performed by a Q switch frequency in the score display field.
Figure 49:
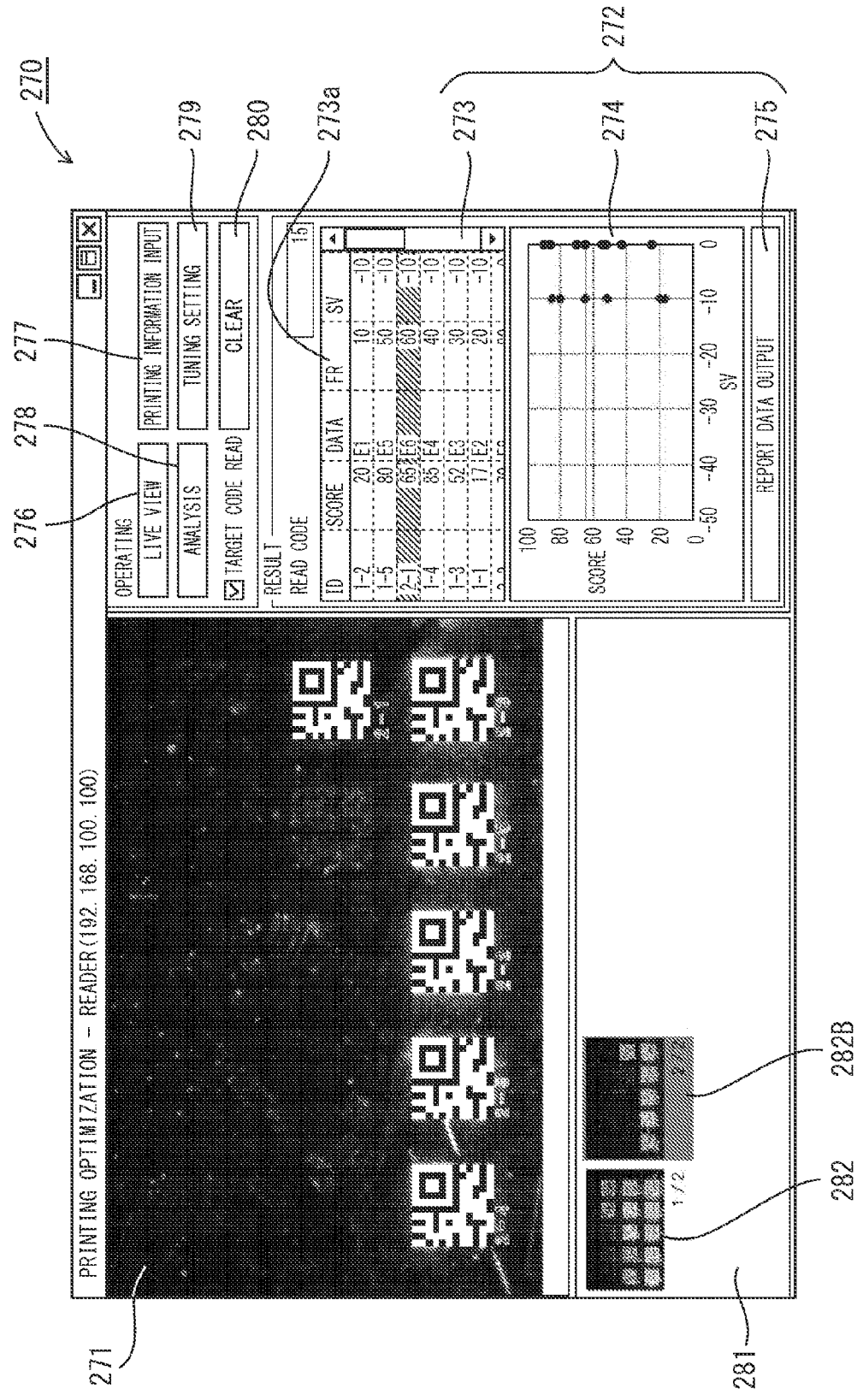
FIG. 49 is a view illustrating a state in which sorting is performed by a spot variable in a score display field.

The sort display function of the printing parameter is a function of sorting the printing parameters displayed in the score displaying field 273. For example, as illustrated in FIG. 47, the defaults are sorted in order of the ID number in the score displaying field 273, and the score values are displayed in each ID number by a polygonal line graph in the graph display field 274. At this point, when the desired item, for example, FR (Q switch frequency) is pressed from the item field 273a in the score displaying field 273, as illustrated in FIG. 48, the display contents in the score displaying field 273 are changed to the state in which the display contents are sorted by the Q switch frequency that is of the variable parameter, and the score values in the graph display field 274 are also changed to the display in terms of not the ID number, but the Q switch frequency. Therefore, for example, the user can recognize a tendency in which the score value is maintained good at the Q switch frequency of 40 kHz or more. Similarly, when the SV (spot variable) is pressed, as illustrated in FIG. 49, the score displaying field 273 is switched to the display mode in which the score values are sorted by the spot variable, and the graph display field 274 is also changed to the graph of the score value in each spot variable. In each screen, when FR in the item field 273a is pressed again, an ascending order and a descending order can be switched. Therefore, the user can easily compare the sample codes to each other in each item.

(Matrix Display Function of Score)

The matrix display of the score can also be performed as an output mode of the analysis result. In the matrix display function of the score, as illustrated in FIG. 50, the score values are displayed into a matrix shape 285B constituting the sample printing pattern, namely, in the matrix shape in which the two types of the variable parameters are horizontally and vertically changed. In the matrix display, similarly the color coding display can be added according to the score value. The same color as the color used in the color coding in the display region 271 is used in the matrix display, which allows the user to visually and easily recognize the distribution state of the score values. As a result, even if the printing condition varies slightly, the position in which the stable score can be expected is intuitively and easily selected when the proper sample code, namely, the printing condition is selected.

(Modification of Identification Information)

As described above, by way of example, the sample code is set to the two-dimensional code, and the two-dimensional code is used as the identification information to directly encode the printing position. According to the above method, the printing position in the sample printing pattern of the sample code is directly connected to the printing condition, so that the printing condition can easily be identified by decoding the sample code by the identification information recognition section 67 or the decoding section 53 or 69. However, the invention is not limited to the configuration of the first embodiment. Even if the printing position is not encoded in the sample code, the printing condition can be identified when the printing position is decided by another method, by associating the printing position with the printing condition in advance.

Figure 52:
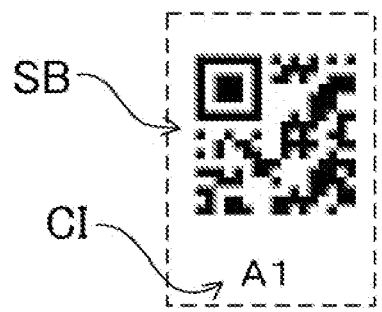
FIG. 52 is a schematic diagram illustrating an example in which positional information is also written by characters in a symbol.

For example, character string information including characters or numerical characters is used as the sample code instead of the two-dimensional code, and the character string information may be printed as the identification information. In this case, as illustrated in FIG. 51, the character string information is constructed by a combination of the row number and the column number, such as A1 and A2, in order to indicate the matrix, and a sample printing pattern SP3 is recognized with the OCR on the side of the printing quality evaluation apparatus 400. Therefore, the printing condition can directly be acquired similarly to the sample code of the two-dimensional code. A sample code in which character string information CI is added to a symbol SB of the two-dimensional code may be used as illustrated in FIG. 52. In this case, the printing position can be identified from either the character string information or the two-dimensional code. Alternatively, in the two-dimensional code, the printing position can be identified from the character string information without encoding the printing condition. For example, the same two-dimensional code may repeatedly be printed. Alternatively, the link data may be substituted for the portion of the two-dimensional code. In each case, the printing position can easily be identified by reading the character string information with the optical information reading apparatus.

Alternatively, a pattern can be used as the identification information instead of the character string information. That is, in the indirect identifying method, the identification information indicating the printing position or the printing condition is printed as the specific pattern, and the correspondence relationship between the specific pattern and the printing position or the printing condition is previously stored in the identification information reference section 36 on the side of the printing condition setting device 200A. When the specific pattern can be identified on the side of the printing quality evaluation apparatus 400, the printing position or the printing condition corresponding to the specific pattern is recognized on the side of the printing condition setting device 200A by referring to the identification information reference section 36. The identification information reference section 36 retains a correspondence table in which the correspondence relationship is recorded. It is not always necessary to recognize the printing condition on the printing quality evaluation apparatus side, but it is only necessary to finally identify the printing condition on the laser marking apparatus side. Therefore, when the printing quality evaluation apparatus can select the sample data having the high printing quality to recognize the identification information added to the selected sample data, the printing quality evaluation apparatus transmits the identification information onto the laser marking apparatus side, which allows the laser marking apparatus to directly or indirectly identify the printing position or the printing condition from the identification information according to the correspondence relationship. Alternatively, the correspondence relationship storage section 70 in which the correspondence relationship between the identification information and the printing position is recorded may be included on the side of the printing quality evaluation apparatus 400. The correspondence table that identifies the correspondence relationship between the specific pattern and the printing position or the printing condition can be retained in the correspondence relationship storage section 70 or the identification information reference section 36 of FIG. 1. As described above, in the correspondence relationship between the printing position and the printing condition, because the printing position in the sample printing pattern corresponds to the position of the matrix in which the two variable parameters are changed in the vertical axis and the horizontal axis, the value of the variable parameter can uniquely be decided in the printing position from the minimum value, the maximum value, and the interval of each variable parameter. The values of other fixed parameters can be acquired from the link data and the like. The printing quality evaluation apparatus may perform the work to identify the printing condition from the identification information, or the optical information reading apparatus may perform the work to identify the printing condition from the identification information, and transmit the obtained printing condition to the laser marking apparatus.

It is not always necessary that the correspondence relationship between the printing position and the printing condition correspond to the above matrix shape. When the identification condition such as the specific pattern added to the symbol can uniquely be identified, and when the one-on-one correspondence relationship is established between the identification condition and the printing condition, the printing condition can be identified on the printing quality evaluation apparatus side based on the identification information. For example, even if the vertical axis and the horizontal axis are replaced with each other in the sample printing pattern printed into the matrix shape, the printing condition can be identified from the identification information when the correspondence relationship is maintained. Alternatively, even in the configuration in which the variable parameters are not printed into the matrix shape while being continuously changed, but the different variable parameter is randomly allocated to each element of the matrix, when the correspondence relationship between the identification information included in each element and the printing condition on which the element is printed can uniquely be decided, the printing condition can be identified by referring to the correspondence table in which the correspondence relationship is recorded. However, when the changes of the variable parameters are not continuously arrayed but the variable parameters are randomly arrayed, which range the variable parameters can stably be read in is hardly recognized as a whole. Particularly, it is impossible that the distribution state of the score values is displayed into the contour shape to recognize the stable region. Therefore, as described above, preferably the sample printing pattern is two-dimensionally arrayed according to the change in variable parameter. The printing position is identified by the printing position recognition section 68 of FIG. 1. The correspondence table is not limited to one in which the correspondence relationship between the specific pattern and the printing position is recorded, but the correspondence relationship between the printing condition and the printing position may be recorded.

Second Embodiment

Figure 53:
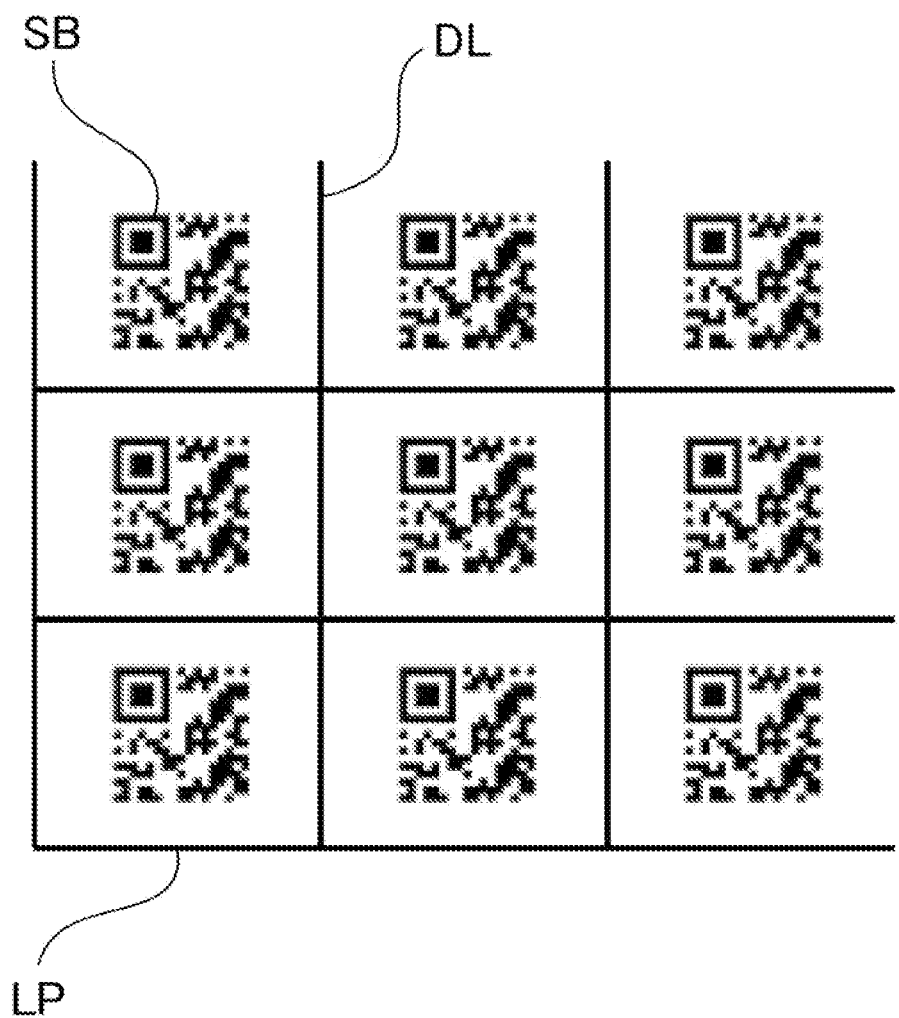
FIG. 53 is a view illustrating a sample printing pattern when the two-dimensional code is used as the symbol while a separator line is used as a specific pattern.

A sample printing pattern in which the identification information is possessed by the specific pattern will be described as a second embodiment with reference to FIGS. 53 to 60. In the second embodiment, the sample code includes a symbol SB and the specific pattern identifying the printing position of each symbol. The specific pattern is printed near the symbol, for example, surroundings of the symbol. In FIG. 53, the symbol SB is constructed by the two-dimensional code, and a separator line DL that separates the symbols printed into the matrix shape is used as the specific pattern. That is, a separator pattern, in which the two-dimensional codes are printed into a lattice shape separated by the separator line DL, is obtained.

The printing position is identified by the specific pattern, which allows the printing condition corresponding to the printing position to be identified on the laser marking apparatus side. The symbol can also be used to identify the printing position. For example, in the case that the directional property is decided by the symbol, the vertical and horizontal separations can be determined by the direction of the symbol. For example, in the case that the QR code is used as the symbol SB, the directional property of the QR code can be determined by a position of a finder pattern. Even if the image of the workpiece is captured in a rotated attitude, the workpiece is rotated in the attitude in which the finder pattern is located in the upper left, which allows the processing to be correctly performed.

(In the Case that Coordinate is Decided from Whole Structure of Separator Line)

A method for separating and identifying the printing position of each sample code from a whole image of the sample printing pattern of FIG. 53 will be described below. In the method, the coordinate is decided from a whole structure of the separator line that is of the specific pattern. Specifically, the separator line is printed into an L-shape in the lower left, and an L-shape pattern LP is not seen in other regions. Therefore, the L-shape pattern LP is used as a reference of a coordinate axis, a coordinate position is calculated through the image processing based on the attitude in which the L-shape pattern LP is located in the lower left. The lower left of the L-shape pattern LP is set to an origin, and the printing position of each sample code can be expressed by the coordinate, for example, an (x, y) coordinate in which the origin is used as the reference. The position of the origin and the setting of the coordinate axis are described by way of example, and any method (for example, an r-θ coordinate) may be adopted. In the attitude of the image, namely, a correction of the rotation angle, the finder pattern of the QR code can be used as described above.

Figure 54:
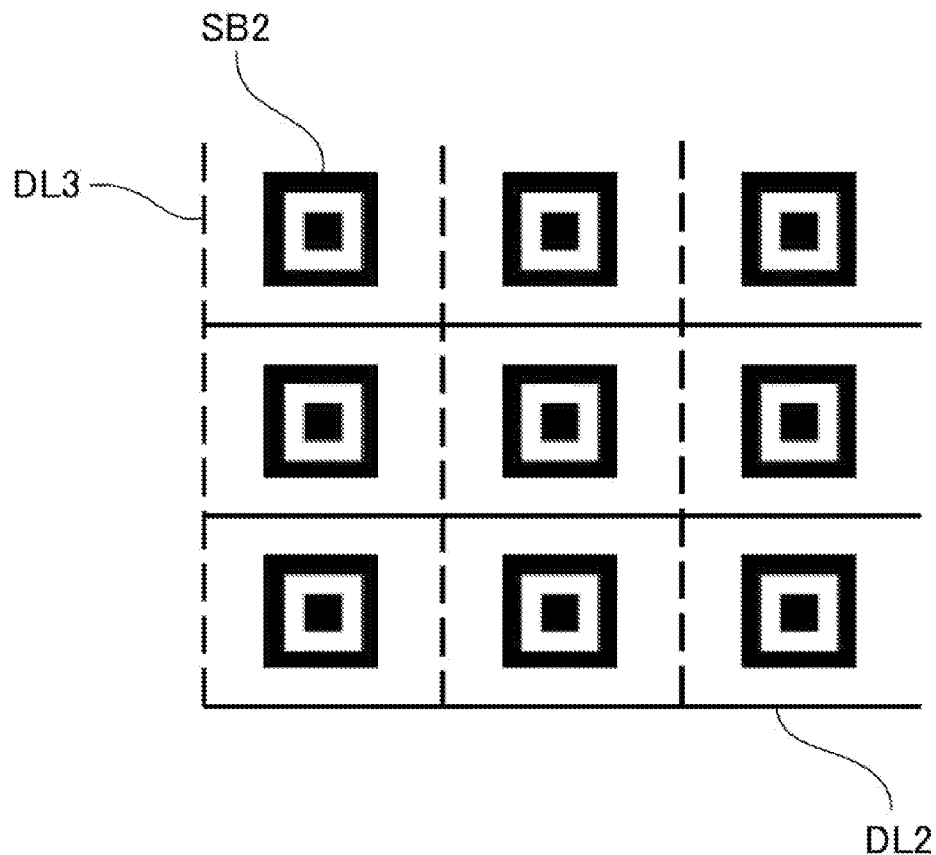
FIG. 54 is a view illustrating a sample printing pattern when a finder pattern is used as the symbol while the separator line, in which different line types are used in a vertical axis and a horizontal axis, is used as the specific pattern.

In the case that the direction cannot be determined by the symbol pattern, for example, in the case of a graphic symbol SB2 (in this case, the finder pattern of the QR code) in which the same shape is obtained when viewed from any direction of the left, right, top, and bottom as illustrated in FIG. 54, it is necessary that the directional property be specified only by the specific pattern. At this point, the change of the type of the separator line can also be used in addition to the L-shape pattern. Referring to FIG. 54, in the vertical and horizontal separator lines, a solid line DL2 is used as the horizontal axis, and a broken line DL3 is used as the vertical axis. Therefore, the directional property can be specified only by the specific pattern and, as described above, the coordinate position of each symbol can be identified based on the origin of the under left when the directional property is decided.

The specific pattern is always printed on a constant printing condition (specific printing condition) similarly to the link data. In other words, the printing condition is not changed unlike the sample code. This is because the printing position is hardly identified when the specific pattern is not partially printed by changing the printing condition of the specific pattern. Therefore, the printing condition different from that of the sample code is set in the specific pattern.

However, even if the specific pattern is not partially printed, the specific pattern can be interpolated by another portion by a specific pattern estimation section. An existing section, such as the image processing, which performs interpolation of the line can be used as the specific pattern estimation section. For example, it is conceivable that the printing of the straight line is partially discontinued by the influence of the base such the case that the material for the workpiece is partially changed or such the case that irregularity or a curved surface is included in the surface of the workpiece. In such cases, in the straight line, the image processing can analogize the lost portion to perform the interpolation. In the case of a circular specific pattern illustrated in FIG. 60, similarly the interpolation can be performed from another portion of an arc. As described above, the base machining condition can be set in order to easily perform the printing through the preprocessing.

(Printing Quality Evaluation Procedure in Sample Printing Pattern in which Specific Pattern is Used)

Figure 55:
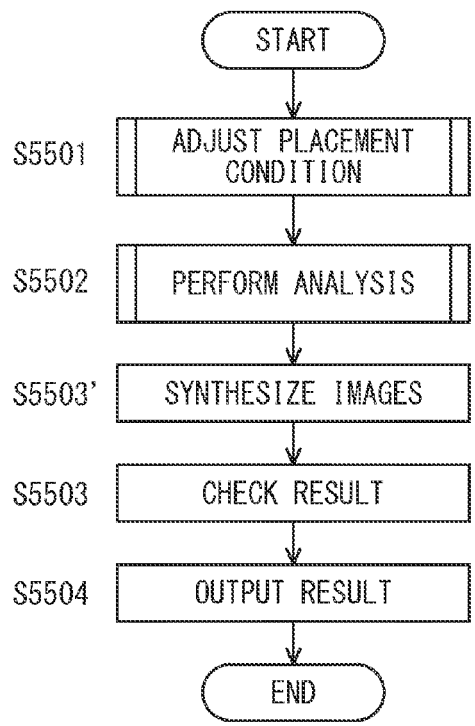
FIG. 55 is a flowchart illustrating a procedure for performing printing quality evaluation by a whole image of the sample printing pattern in which the specific pattern is used.

A procedure for performing the printing quality evaluation using the sample printing pattern in which the specific pattern is used will be described below with reference to a flowchart of FIG. 55. In FIG. 55, because Steps S5501 and S5502 are identical to those of the flowchart of FIG. 24, the description is omitted. When the analysis in STEP 5502 is ended, the images are synthesized in Step S5503' as needed basis. In the specific pattern, the printing position is recognized by acquiring the whole image of the sample printing pattern. In other words, the printing position cannot be identified in a partial image in which the image of the sample printing pattern is partially captured. Therefore, the needs for the work to synthesize the obtained partial images arises in the case that the image of the sample printing pattern is captured while divided into plural images. In an image configuration, common portions included in the images are recognized through the image processing, and the images are synthesized such that the common portions are superposed. Additionally, in the case that a predetermined fragment pattern is already decided, the captured images are sequentially connected according to the fragment pattern. The image synthesis processing can be performed in parallel with another piece of processing. The processing in Step S5503' is eliminated in the case that the whole image of the sample printing pattern can be expressed by one captured image. Pieces of processing from Step S5503 are identical to those in Step S2403 of FIG. 24, the printing position is identified from the specific pattern extracted by the specific pattern extracting section 64, and the printing condition is identified.

(In the Case that Coordinate Information is Specified from Separator Pattern)

In the above method, it is necessary to capture the whole image of the sample printing pattern in order to identify the coordinate position from the whole separator line. However, in the case that the sample printing is performed while the sample printing conditions are changed, as a result of changing the many sample printing conditions, possibly the sample code that is printed dilute to an extent that the sample code is hardly visually recognized. In such cases, it is clear that the printing condition of the sample code is improper, and it is also clear that efficiency is degraded when the whole image of the sample printing pattern is always captured. Particularly, because the resolution is degraded when the visual field of the image capturing is widened, the decoding is hardly performed. Therefore, when a certain degree of resolution is ensured, the visual field range that can be included by the one-time image capturing is restricted. On the other hand, sometimes the size of the sample printing pattern is enlarged depending on the changing range and a changing width of the sample printing condition and the size of the sample code. Therefore, frequently it is said that the printing position can advantageously be identified from not the whole image of the sample printing pattern but the image partially cut out. A printing position identifying method in which the printing position can be identified only from the portion of the sample printing pattern will be described below with reference to FIGS. 56 and 57.

Figure 56:
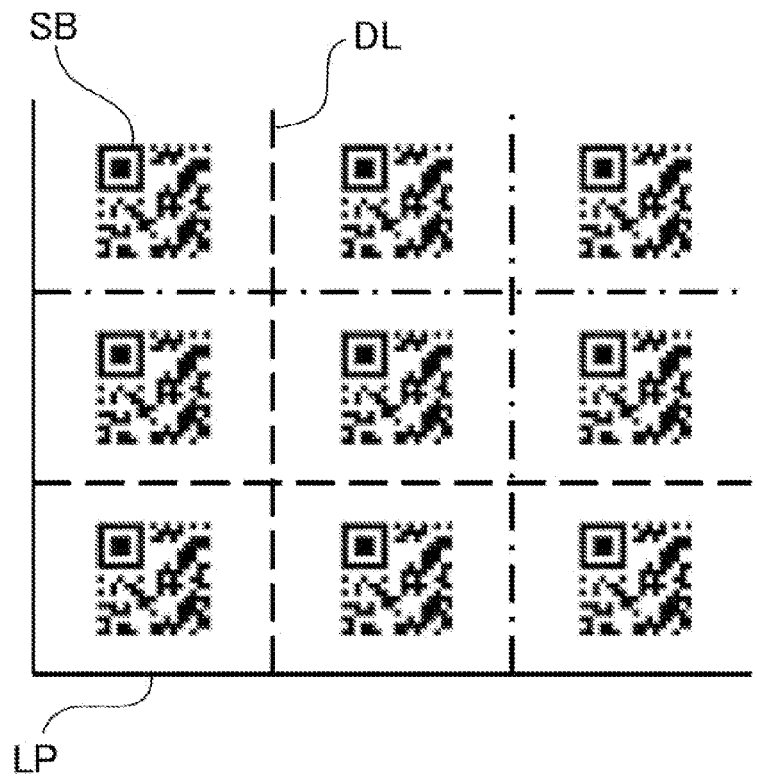
FIG. 56 is a view illustrating a sample printing pattern when a QR code is used as the symbol while the separator line, in which the line type is vertically and the horizontally changed, is used as the specific pattern.

In FIG. 56, the directional property can be determined because the QR code is used as the symbol SB. That is, the vertical axis and the horizontal axis can commonly be used. The type of line is changed from the origin in the X-axis direction and the Y-axis direction such that the orders of the separator lines can be distinguished from each other. In FIG. 56, a solid line is used as the first separator line, a broken line is used as the second separator line, and an alternate long and short dash line is used as the third separator line. Therefore, in the case that the image of the sample code is arbitrarily captured, the separator lines printed in the surroundings of the sample code are included in the sample code, which allows the printing position of the sample code to be identified. The identification information recognition section 67 of FIG. 1 distinguishes the types of the lines from each other. Specifically, the separator line is detected by pattern search or edge detection, the types of the separator lines in the surroundings of the symbol are identified, and the printing position corresponding to the combination is acquired by referring to the correspondence table retained in a correspondence relationship recording section.

Figure 57:
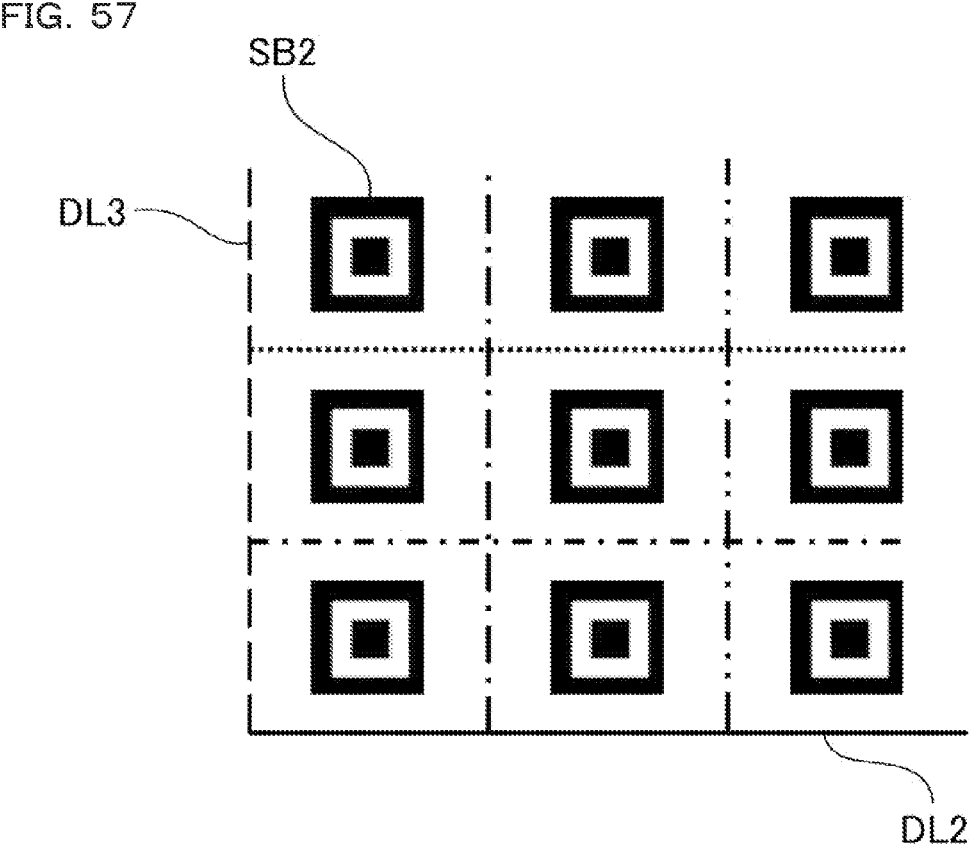
FIG. 57 is a view illustrating a sample printing pattern when the finder pattern is used as the symbol while the separator line, in which the line types different from one another are used in both the vertical axis and the horizontal axis, is used as the specific pattern.

Even if the code, such as the QR code, which can specify the directional property is not used as the symbol, similarly the printing position can be determined from the separator lines by changing all the types of the vertical and horizontal separator lines as illustrated in FIG. 57. Referring to FIG. 57, in the vertical axis, the broken line is used as the first separator line, the alternate long and short dash line is used as the second separator line, and an alternate long and two short dashes line is used as the third separator line. On the other hand, in the horizontal axis, the solid line is used as the first separator line, the short alternate long and short dash line is used as the second separator line, and the dotted line is used as the third separator line. As a result, even if the image of the sample code is captured in any position, the four surrounding separator lines that surround a symbol SB2 are different from one another. Therefore, the printing position can be identified by checking the combination of the patterns.

In the case that the coordinate is decided from the separator lines, the position can be determined in one direction of each of the X-coordinate and the Y-coordinate by the types of the two separator lines that sandwich the symbol therebetween. The number of combinations that can be distinguished from each other is $2^N$ in the case of N types of the separator lines. For example, in the case that the separator lines have the 2 types of the straight line and the broken line, the coordinate positions of $2^2=4$ types can be distinguished from one another. Similarly, the coordinate positions of $2^3=8$ types can be distinguished from one another in the case that the separator lines have the 3 types, and the coordinate positions of $2^4=16$ types can be distinguished from one another in the case that the separator lines have the 4 types. The coordinate position in one direction can be checked by the combination of the types of the separator lines. Therefore, as described above, the coordinate position, namely, the printing position of the symbol can be identified by applying the combination of the different types of the separator lines to only one direction when the directional property can be specified by the symbol, and the printing position of the symbol can be identified by applying the combination of the different types of the separator lines to the X-direction and the Y-direction when the directional property cannot be specified by the symbol.

Figure 58:
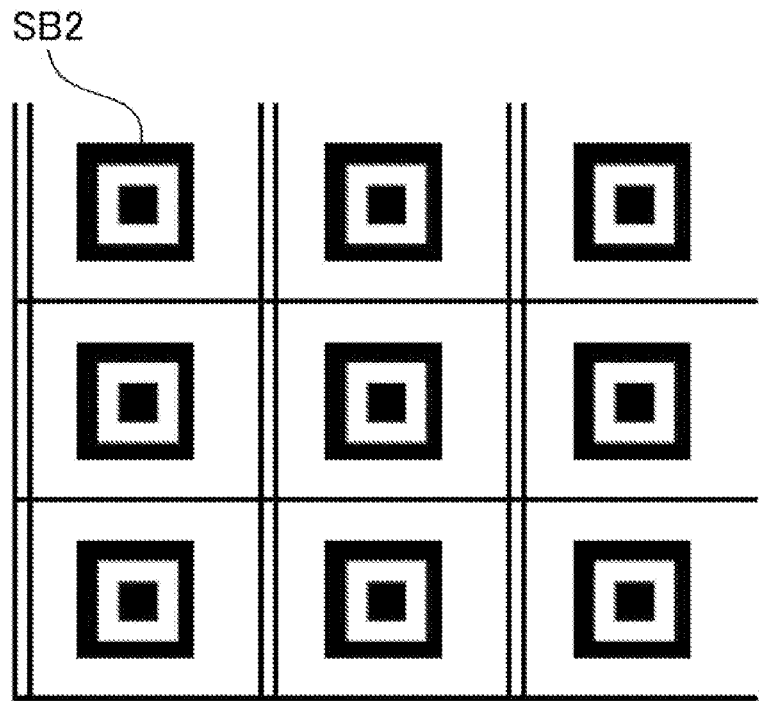
FIG. 58 is a view illustrating a sample printing pattern in which the number of separator lines is changed.

In addition to the type of the separator line, the separator lines can be distinguished by the number of separator lines. For example, as illustrated in FIG. 58, a one-line separator line is used in the horizontal axis, and a two-line separator line is used in the vertical axis, which allows the vertical and horizontal directional properties to be distinguished from each other.

Figure 59:
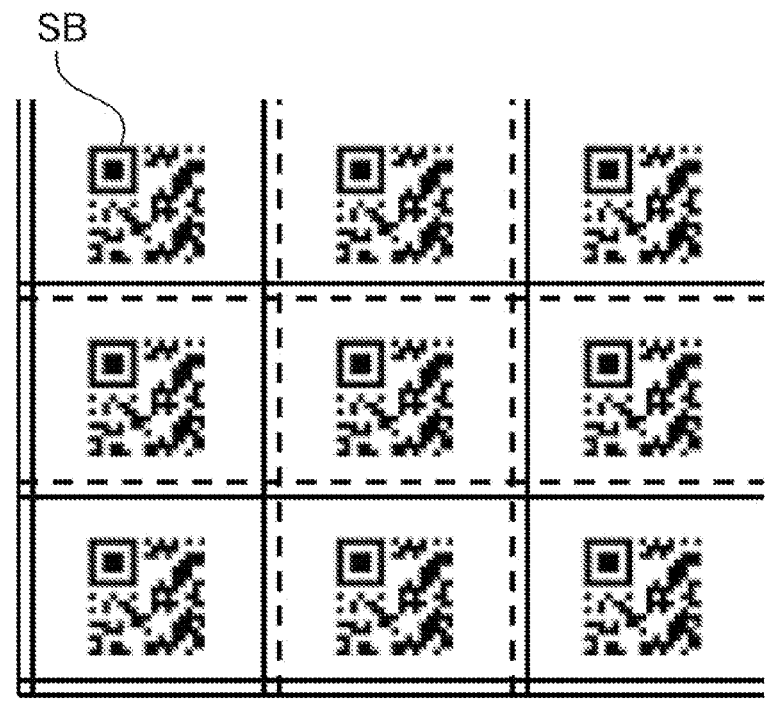
FIG. 59 is a view illustrating a sample printing pattern in which the line type of each line constituting the plural separator lines is changed.

In the configuration in which the separator line includes the plural lines, the number of combinations are further increased by changing the types of the lines constituting the separator line. For example, as illustrated in FIG. 59, in the configuration in which the separator line includes the two lines, the combination of the solid line and the solid line is used as the line indicating the coordinate axis, and the combination of the solid line and the broken line is used as other separator lines, which allows the coordinate axis to be distinguished from other separator lines. When the combination of the types of the separator lines except the coordinate axis is changed, the separator lines can be distinguished from each other. The number of plural lines is not limited to two, but the plural lines may include at least three lines. The separator line is not limited to the straight line. For example, deformations and decorations may appropriately be used such that a wavy line and a saw-tooth line are used as the separator line, and such that dots of the dotted line are constructed by a point, □, Δ, a diamond shape, or an outline point.

Figure 60:
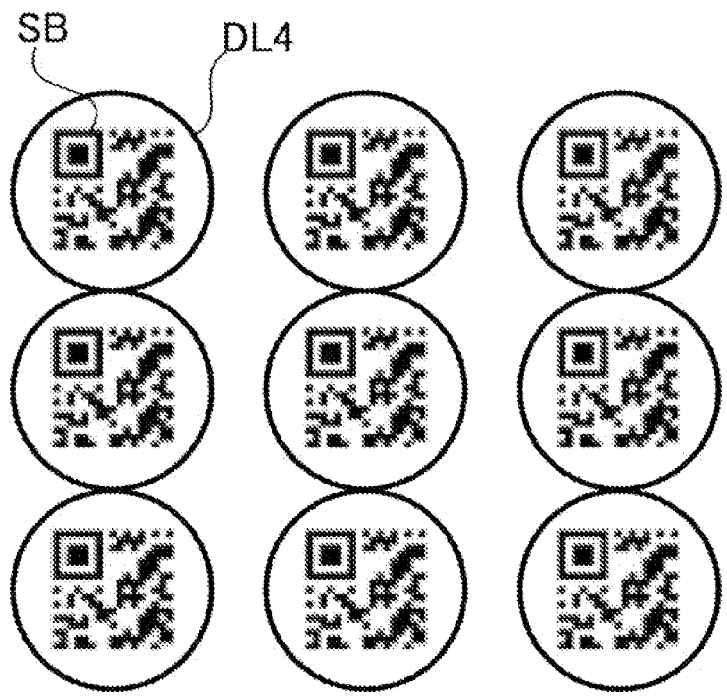
FIG. 60 is a view illustrating a sample printing pattern in which a circle surrounding the sample code is used as the separator line.
Figure 61:
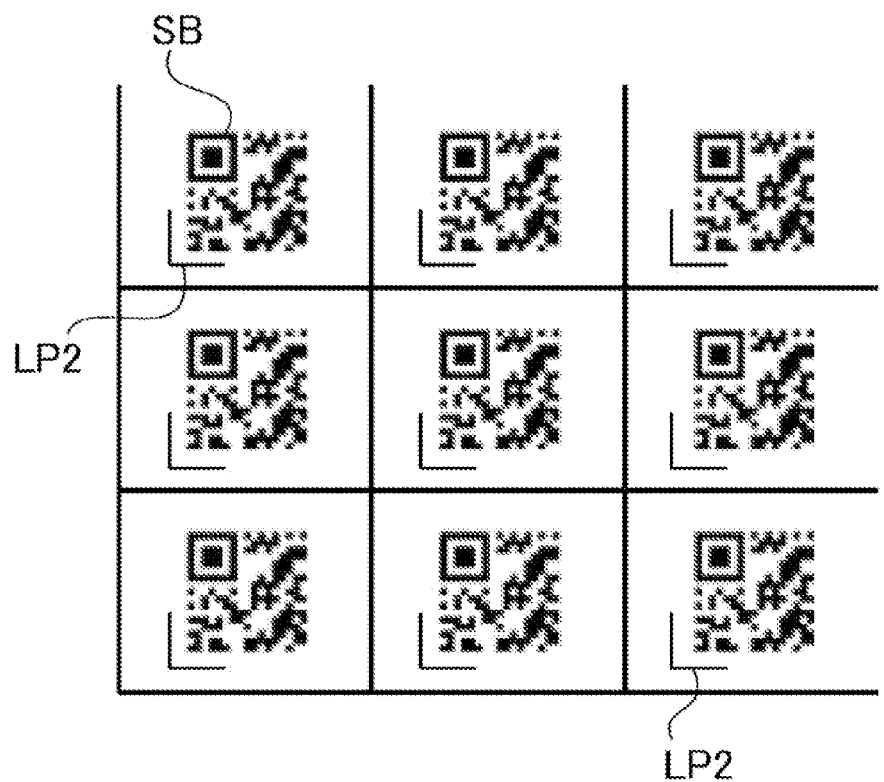
FIG. 61 is a view illustrating the sample code in which a pattern indicating a directional property is added to each symbol.

In the second embodiment, the specific pattern is formed by the straight line by way of example. However, the specific pattern may include the curved line. For example, as illustrated in FIG. 60, a circle DL3 that surrounds the sample code may be used as the separator line of the specific pattern. Even in the specific pattern of FIG. 60, when the symbol that can specify the directional property similarly to the QR code is used, the directional property of the sample printing pattern can be fixed, and the printing position can be identified from the whole image based on a reference region in the lower left. Similarly the directional property and the reference position can be specified by changing the types of the separator lines of the specific pattern. For example, when only the circular separator line located in the lower left is printed by the broken line, the attitude and the reference position can be identified by extracting the broken line. Alternatively, as illustrated in FIG. 61, a hook-shaped pattern LP2 may individually be added to the lower left of the symbol in the specific pattern. Therefore, the directional property can be decided even if only the image of the individual sample code is captured, and the time to take the whole image of the sample printing pattern can be eliminated.

(Printing Quality Evaluation Procedure in Sample Printing Pattern Having Specific Pattern Identification Information)

Figure 62:
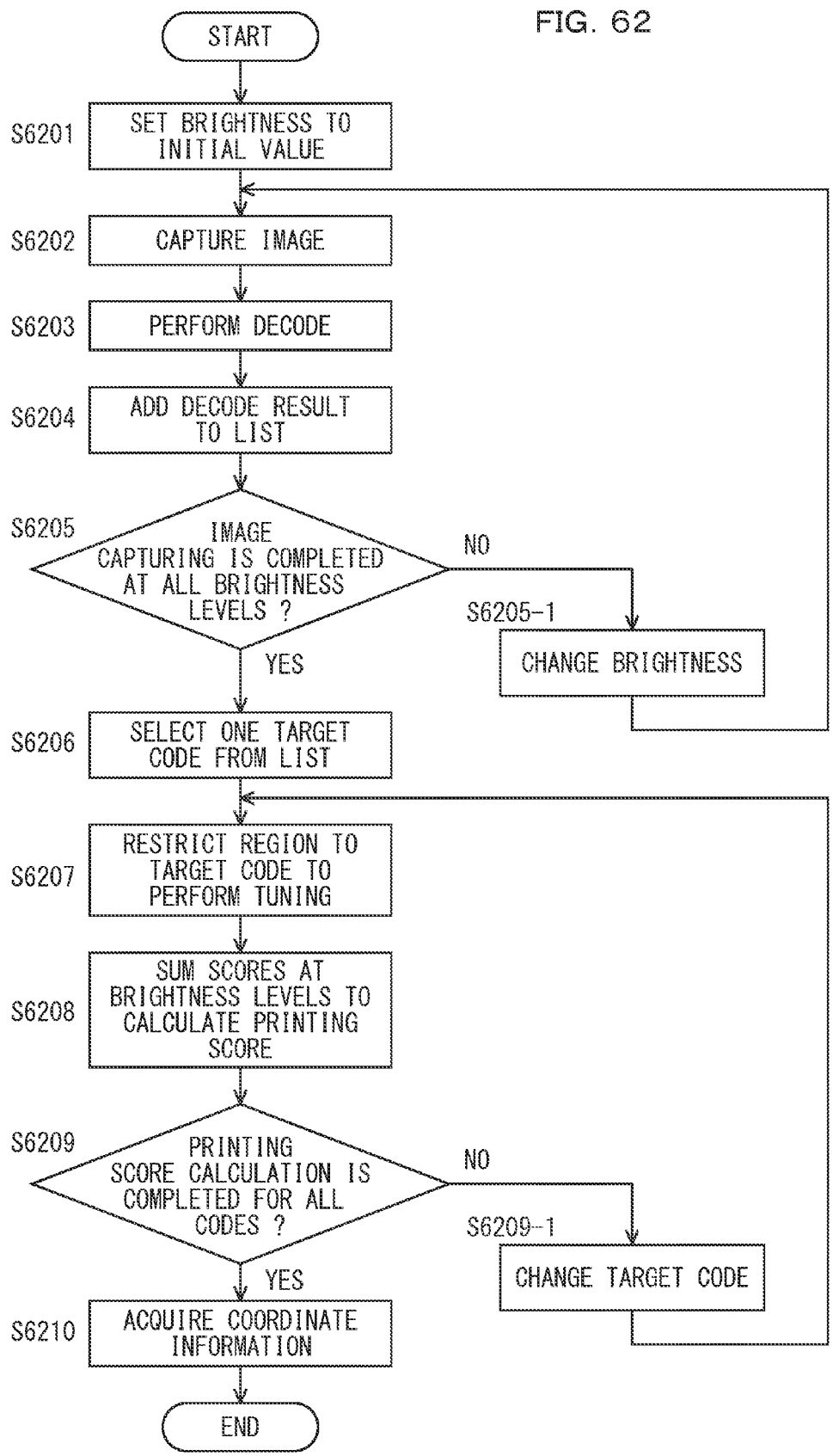
FIG. 62 is a flowchart illustrating an analytical processing procedure for performing the printing quality evaluation by a sample code in which identification information is provided to the specific pattern.

An analysis procedure (Step S2402 in the flowchart of FIG. 24) in performing the printing quality evaluation using the sample code, in which the identification information is not included (or only the information distinguishing the directional property is included) in the symbol but the identification information is included in the specific pattern, will be described below with reference to a flowchart of FIG. 62. In FIG. 62, Steps S6201 to S6209 are identical to Steps S3501 to S3509 of FIG. 35 described above.

When the calculation of the printing score is completed for all the sample codes in Step S6209, the flow goes to Step S6210 to acquire coordinate information. Specifically, the coordinate position, namely, the printing position of the symbol to which the specific pattern is added is identified in the sample printing pattern based on the identification information (in this case, the specific pattern). The specific pattern extracting section 64 extracts the specific pattern that added to the surroundings of the symbol, and the coordinate position of the symbol is acquired from the specific pattern. Specifically, as described above, the identification information recognition section 67 of FIG. 1 identifies each of the types of the separator lines in the surroundings of the symbol, and acquires the printing position corresponding to the combination by referring to the correspondence table retained in the correspondence relationship recording section. When the printing position is acquired, the result is output according to the pieces of processing from Steps S2403 of FIG. 24.

In FIG. 62, the coordinates of the sample codes are collectively acquired after the calculation of the printing score is completed for all the sample codes. However, the invention is not limited to the method of FIG. 62. For example, there is also a procedure, in which the coordinate position is acquired after the score of each sample code is calculated and then the score of another sample code is calculated.

It is not always necessary that the identification information indicating the printing position of the sample code be encoded in the symbol, but the specific pattern is previously correlated with each printing condition while the identification information is incorporated in the specific pattern, which allows the printing condition to be identified from the correspondence relationship. In the configuration of the second embodiment, because the need for incorporating the identification information in the symbol is eliminated, the size of each symbol can be reduced, and advantageously the printing region necessary to print the whole sample printing pattern can be reduced.

Third Embodiment

As described above, in the symbol and the specific pattern, which constitute the sample code, the printing quality is evaluated by the symbol and the printing position is identified by the specific pattern. In the first and second embodiments, the two-dimensional code is mainly used as the symbol by way of example. In the case that the two-dimensional code is used, the identification information such as the printing position can be encoded in the two-dimensional code. Even if the complete sample code in which some sort of information can be encoded is not used, the purpose of the printing quality evaluation can be achieved in the symbol enough to be able to evaluate the printing quality. Particularly, in the case that the symbol is formed by the complete sample code, it is necessary that the symbol has a proper size in order to encode the information. However, depending on the workpiece of the printing target, sometimes the sufficient printing size cannot be ensured. In the case that the variable parameter is finely changed, the sample printing pattern is enlarged because of the increased number of sample codes. Therefore, the use of the symbol, in which the printing quality can be evaluated to an extent that the value of the printing parameter can be fixed although the information cannot be encoded, can suppress the necessary printing region and evaluate the more variable parameters. Examples of the symbols will be described below with reference to FIGS. 63 to 77. The Examples of the symbols are intended to perform the printing quality evaluation, and the printing position is identified by the specific pattern as described above.

The printing quality evaluation does not mean that the symbol can always be decoded, but means that a cell size of the symbol can be recognized or that a contrast can be recognized. The contrast or evenness of the printing can be cited as an example of the printing quality evaluation between the plural cells, and a bold or thin shape and edge intensity (edge sharpness) of the shape can be cited as an example of the printing quality evaluation of the single cell.

(Evaluation Pattern)

The evaluation pattern that is formed by the cells, each of which is of a minimum unit constituting the symbol, such that the printing quality evaluation is performed is printed as the pattern used to perform the printing quality evaluation of the symbol. At this point, whether the cell constituting the evaluation pattern is correctly printed into the intended shape is evaluated. The evaluation pattern is printed instead of the symbol, and the specific pattern is added. Therefore, a relative position of the evaluation patterns, namely, the printing position can be identified by recognizing the specific pattern such as the separator lines added to the surroundings of the evaluation pattern.

Figure 63:
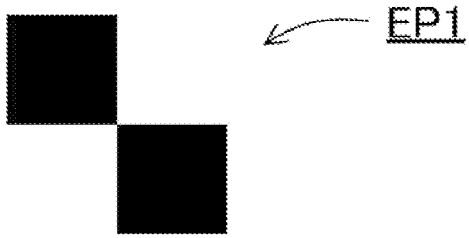
FIG. 63 is a view illustrating an evaluation pattern in which white and black cells are arrayed into a lattice-shaped 2-by-2 cell.
Figure 64:
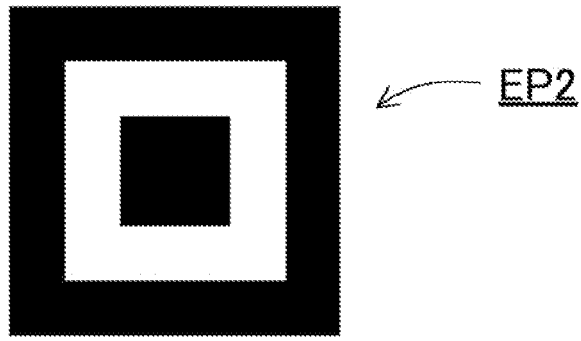
FIG. 64 is a view illustrating an evaluation pattern of the finder pattern.
Figure 65:
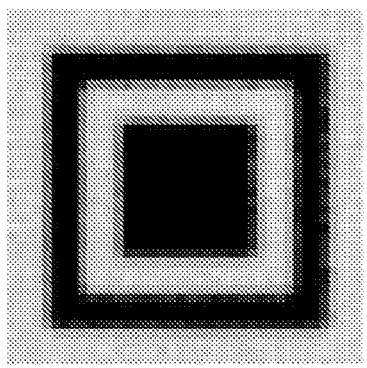
FIG. 65 is a view illustrating a captured image in which a (1:1:2:1:1)-finder-pattern-shaped evaluation pattern is captured.

FIGS. 63 and 64 illustrate examples of the evaluation patterns. In order to perform the printing quality evaluation, the score of the individual pattern is calculated in the captured image of the evaluation pattern. At this point, the brightness of the illumination is changed to acquire the plural score, and the printing score is calculated using the scores. In the calculation of the printing score, for example, the sum of the score values can be used similarly to the method of the first embodiment.

In an evaluation pattern EP1 of FIG. 63, black and white cells are arrayed into a 2-by-2 cell lattice shape. In the printing quality evaluation of the evaluation pattern of FIG. 63, luminance values of the white cell and the black cell are individually acquired to calculate the contrast and homogeneousness. The shapes of the white cell and the black cell are evaluated to calculate the bold or thin shape or the edge sharpness (edge intensity).

On the other hand, FIG. 64 illustrates a finder pattern (FP) shape used in the QR code and the like. An evaluation pattern EP2 having the finder pattern shape can be searched from a ratio of line width data similarly to FP detection of the QR code. For example, the finder pattern of the QR code is normalized such that a ratio of the white cell and the black cell becomes (1:1:3:1:1) in vertical and horizontal center lines. Therefore, in the printing quality evaluation of the evaluation pattern EP2, the brightness of the printing color and the homogeneousness are acquired in the central black portion. The brightness of a background color and the homogeneousness are acquired from the white frame portion. Therefore, the contrast and the homogeneousness can be calculated. The thickness of the white frame is acquired, and the bold or thin shape can be calculated. The edge sharpness can be calculated by evaluating the edges of the white frame and the black frame.

(Specific Example of Evaluation Calculation)

Figure 66:
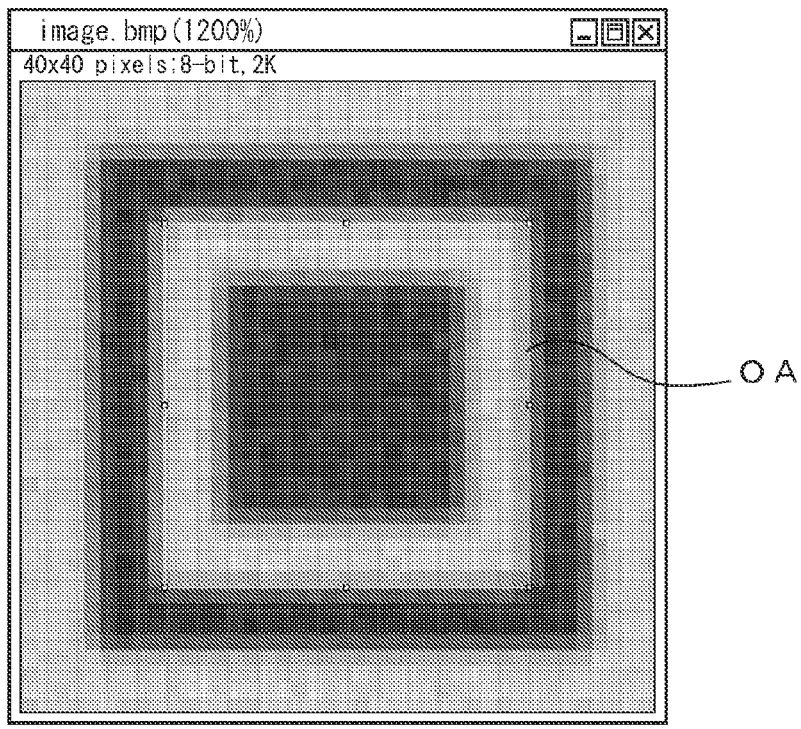
FIG. 66 is a view illustrating a state in which a target region is determined in FIG. 65.
Figure 67:
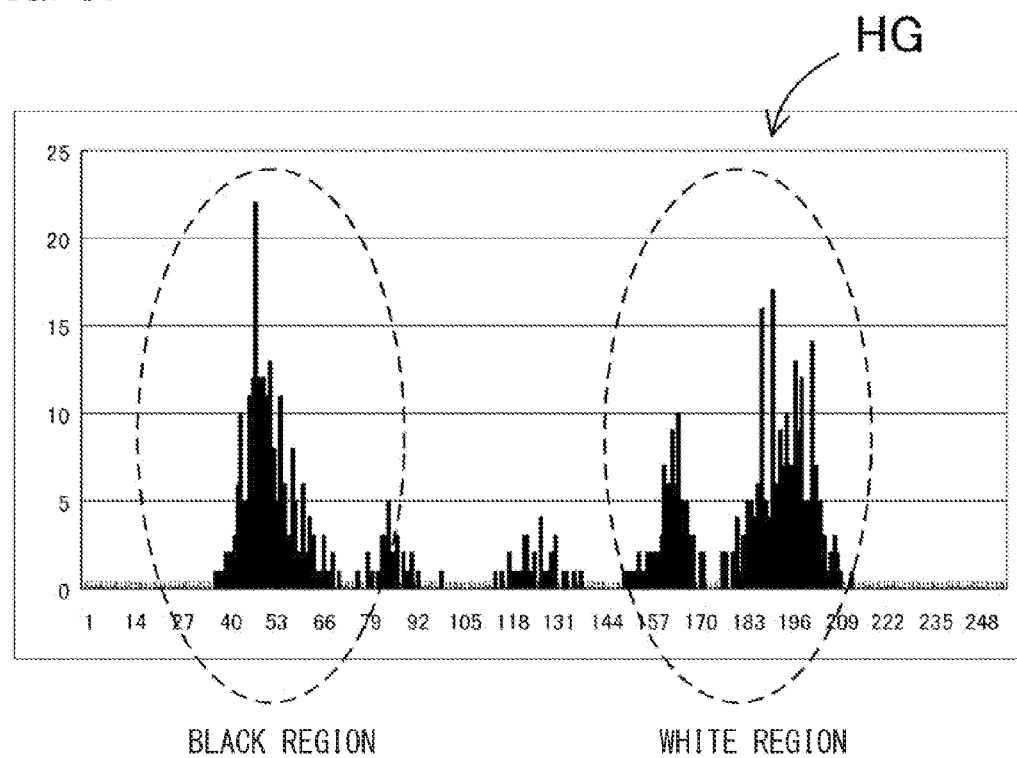
FIG. 67 is a histogram in which pixels values in the target region of FIG. 66 are calculated.
Figure 68:
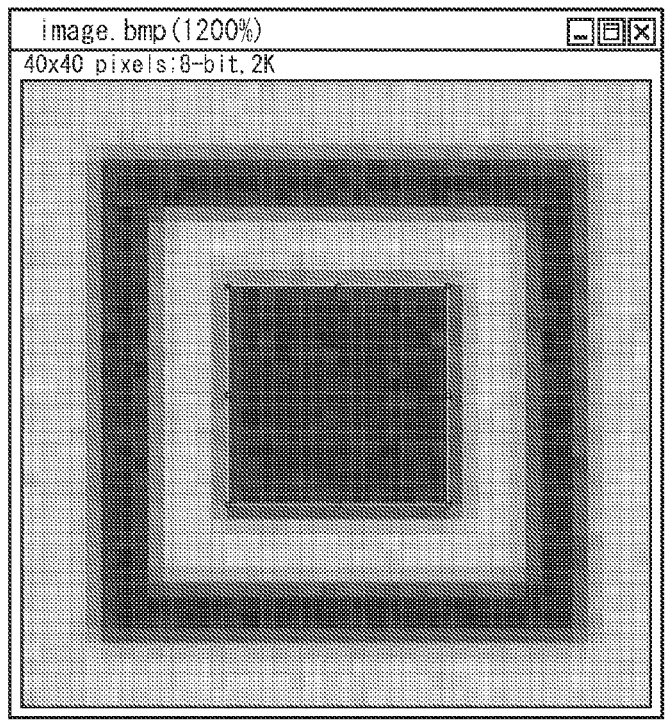
FIG. 68 is a view illustrating a black region of FIG. 67 that is illustrated on the image of FIG. 65.
Figure 69:
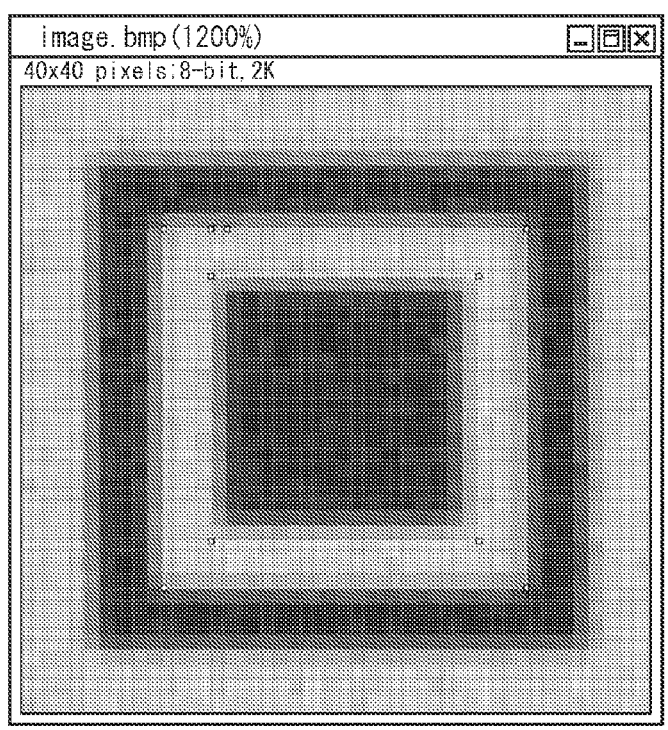
FIG. 69 is a view illustrating a white region of FIG. 67 that is illustrated on the image of FIG. 65.
Figure 70:
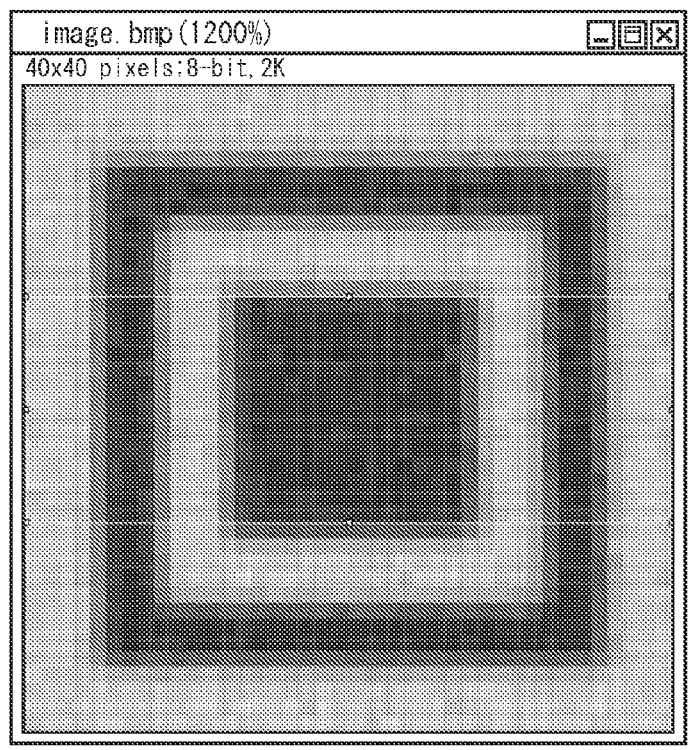
FIG. 70 is a view illustrating a rectangular region of FIG. 65.

A specific example of a method for evaluating the evaluation pattern will be described with reference to FIGS. 65 to 71. The pixel value of the code is calculated. For example, it is assumed that the image of the evaluation pattern having the finder pattern shape of FIG. 64 is captured to obtain a captured image of FIG. 65. The target region OA is fixed through the image processing as illustrated in FIG. 66, the pixel values in the target region OA are calculated to obtain a histogram HG of FIG. 67. In the histogram HG, a region surrounded by an ellipse on the left side corresponds to a region (black region) of a central black quadrangle, and a region surrounded by an ellipse on the right side corresponds to a surrounding white region (white region) that surrounds the black region. An image of FIG. 68 is obtained when the black region is illustrated on the image of FIG. 65, and the white region becomes a region sandwiched between the rectangles of FIG. 69.

At this point, the contrast can be expressed by (average of white region)−(average of black region), and the homogeneousness is expressed by (standard deviation of white region)+(standard deviation of black region).

Figure 71:
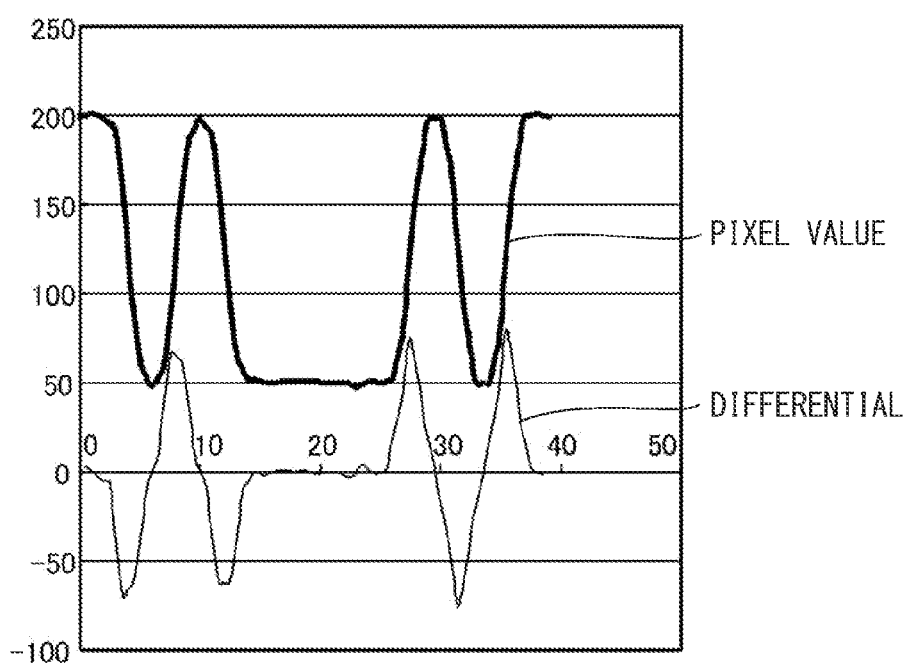
FIG. 71 is a view illustrating a state in which an edge position is detected in rectangles of FIG. 70.
Figure 72:
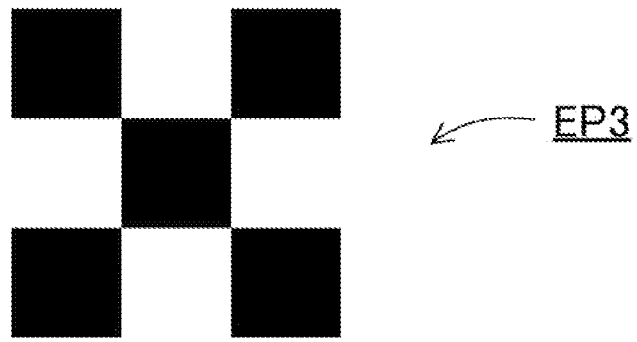
FIG. 72 is a view illustrating an evaluation pattern in which white and black cells are arrayed into a lattice-shaped 3-by-3 cell.

As to the analysis of the edge, the thickness of the frame can be expressed by a distance between the edges, and the edge sharpness can be expressed by a value of a differential waveform in the edge position. FIG. 71 illustrates a graph in the state in which the scanning is performed in the X-direction to average the pixel values in the Y-direction in order to detect the edge position in the rectangle of FIG. 70. In the graph of FIG. 71, a bold line indicates the pixel values and a thin line indicates the differential values of the pixel values. Thus, a peak of the differential waveform is recognized as the edge.

(Scalability of Pattern)

In FIG. 63, the lattice shape is formed by the ultrasmall size of the 2-by-2 black and white cell. However, the evaluation is hardly performed in the small size in the case that many noise exist in the surrounding of the printing region, or in the case that the printing quality varies to destabilize the property due to the factor of the material for the workpiece. Therefore, preferably an information amount is increased on the printing side to perform the averaging of the data and the evaluation of the variation of the data. For example, the 2-by-2 lattice-shaped evaluation pattern of FIG. 63 is enlarged to a 3-by-3 cell of an evaluation pattern EP3 of FIG. 72, or the 2-by-2 lattice-shaped evaluation pattern is enlarged to a 4-by-4 cell of an evaluation pattern EP4 of FIG. 73. Alternatively, the finder-pattern-shaped evaluation pattern of FIG. 64 is enlarged from (1:1:2:1:1) to (1:1:3:1:1) of an evaluation pattern EP5 of FIG. 74, or the finder-pattern-shaped evaluation pattern of FIG. 64 is enlarged to (1:1:4:1:1) of an evaluation pattern EP6 of FIG. 75. The influences of the noise and variation are reduced by enlarging the evaluation size, which allows the printing quality to be more stably evaluated.

(Directional Property Specifying Pattern)

Figure 73:
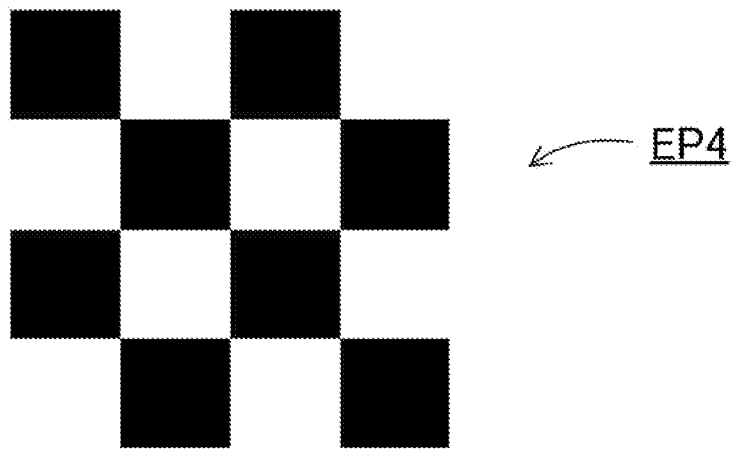
FIG. 73 is a view illustrating an evaluation pattern in which white and black cells are arrayed into a lattice-shaped 4-by-4 cell.
Figure 74:
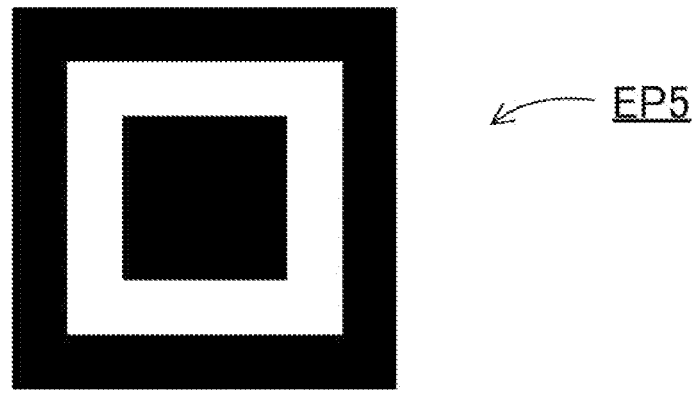
FIG. 74 is a view illustrating a (1:1:3:1:1)-finder-pattern-shaped evaluation pattern.
Figure 75:
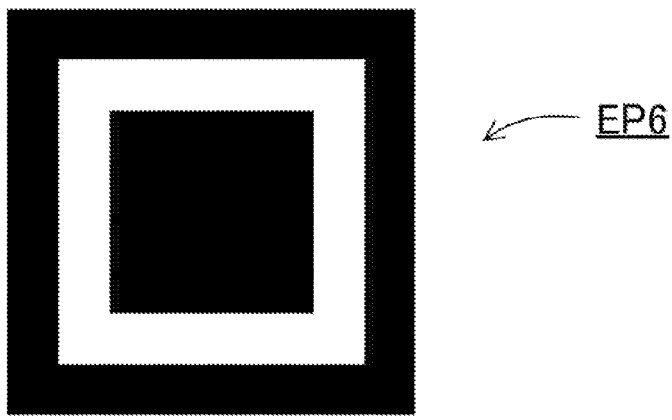
FIG. 75 is a view illustrating a (1:1:4:1:1)-finder-pattern-shaped evaluation pattern.
Figure 76:
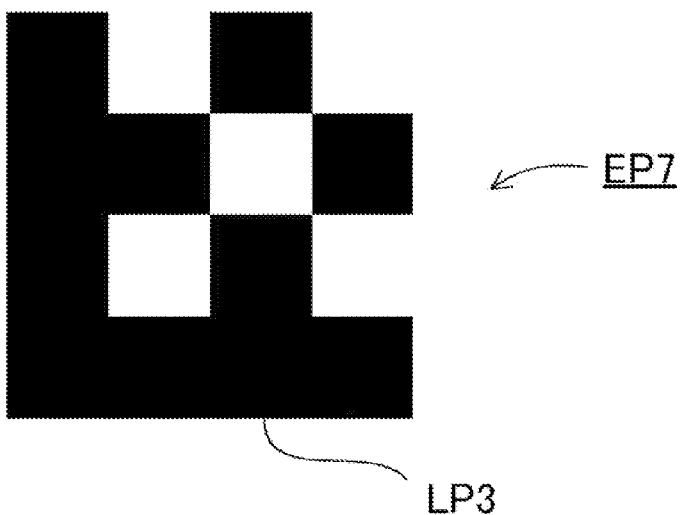
FIG. 76 is a view illustrating an example in which a directional property specifying pattern is added to the lattice-shaped evaluation pattern of FIG. 73.
Figure 77:
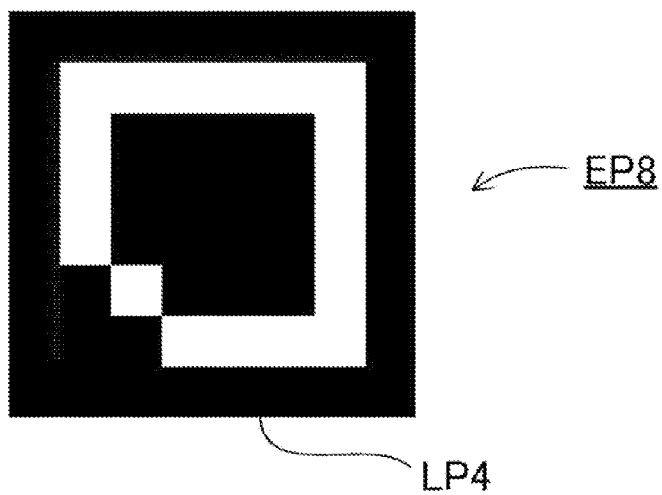
FIG. 77 is a view illustrating an example in which the directional property specifying pattern is added to the finder-pattern-shaped evaluation pattern of FIG. 75.

In the above examples having the symmetrical shapes, the directional properties cannot be distinguished only by the evaluation pattern. Alternatively, a shape in which the directional properties can be distinguished by the evaluation pattern may be used. For example, the lattice-shaped evaluation pattern EP4 of FIG. 73 is changed to an evaluation pattern EP7 of FIG. 76. In the evaluation pattern of FIG. 76, a hook-shaped pattern LP3 is superposed in the lower left as the directional property specifying pattern specifying the directional property. Therefore, the evaluation pattern of FIG. 76 becomes an asymmetrical shape similarly to FIG. 61 described above, and the attitude can be identified. The finder-pattern-shaped evaluation pattern EP6 of FIG. 75 is changed to an evaluation pattern EP8 of FIG. 77. In the evaluation pattern EP8 of FIG. 77, the neighborhood of the origin, namely, the lower-left pattern is changed to a stepwise pattern LP4, so that the attitude of the evaluation pattern can be recognized by detecting the stepwise pattern LP4 through the image processing. Therefore, because the directional property can be fixed by the evaluation pattern, the identification of the printing position can be implemented without specifying the directional property by the specific pattern.

As described above, the printing quality evaluation apparatus can quantitatively determine the printing condition most suitable for the read by calculating the printing quality of the sample code of the sample printing. The laser marking, in which the read stability is improved compared with the visual checking of the user, can be implemented by feeding back the result to the laser marking apparatus.

The printing quality evaluation system, the laser marking apparatus, the printing condition setting device, the printing quality evaluation apparatus, the printing condition setting program, the printing quality evaluation program, and the computer-readable recording medium of the invention can suitably be used in a system, in which the two-dimensional code printed in the workpiece with the laser marking apparatus is read and evaluated with the two-dimensional code reader and the evaluation result is fed back to the printing condition of the laser marking apparatus.

What is claimed is:

1. A printing quality evaluation system comprising:
   a printing condition setting device that sets a printing condition in order to print a plurality of symbols having different printing conditions in a printing target with a laser marking apparatus; and a printing quality evaluation apparatus that evaluates printing quality of each symbol based on captured images of the plurality of symbols having the different printing conditions, the plurality of symbols being printed in the printing target with the laser marking apparatus based on printing data that is generated according to the printing conditions set with the printing condition setting device, wherein the printing condition setting device includes:
- a parameter setting section that sets a variable parameter varying the printing condition and a fixed parameter as a plurality of printing parameters constituting the printing conditions;
- a printing condition generating section that substitutes a plurality of different parameter values for the variable parameter set by the parameter setting section while substituting fixed values for the fixed parameter set by the parameter setting section, thereby generating the plurality of different printing conditions;
- a printing data generation section that generates printing data including the plurality of symbols, each of the symbols corresponding to each of the plurality of different printing conditions generated by the printing condition generating section, each of the symbols being correlated with an identification information identifying a parameter value on the variable parameter included in the printing condition and being decoded or optically recognized as the identification information by the printing quality evaluation apparatus; and
- a printing data output section that transmits the plurality of symbols generated by the printing data generation section to the laser marking apparatus, thereby the plurality of symbols being printed two-dimensionally in the printing target with the laser marking apparatus, and the printing quality evaluation apparatus includes:
- an image acquiring section that acquires the captured image including the plurality of symbols printed in the printing target, the captured image being captured with resolution at which the printing quality of the symbol is evaluated;
- a symbol extracting section that extracts the symbol in which the printing quality is evaluated from the captured images acquired by the image acquiring section;
- a printing quality evaluation section that evaluates the printing quality of the symbol extracted by the symbol extracting section;
- an identification information recognition section that recognizes the identification information by decoding or optically recognizing the symbol extracted by the symbol extracting section, the identification information identifying a parameter value on the variable parameter included in the printing condition, printing condition corresponding to the symbol extracted by the symbol extracting section; and
- an evaluation output section that outputs an evaluation result of the printing quality evaluated by the printing quality evaluation section and the identification information recognized by the identification information recognition section according to the symbol extracted by the symbol extracting section.

2. A printing quality evaluation system comprising:

a laser marking apparatus that prints a plurality of symbols having different printing conditions in a printing target; and a printing quality evaluation apparatus that evaluates printing quality of each symbol based on captured images of the plurality of symbols having the different printing conditions, the plurality of symbols being printed in the printing target with the laser marking apparatus, wherein the laser marking apparatus includes:
- a parameter setting section that sets a variable parameter varying the printing condition and a fixed parameter as a plurality of printing parameters constituting the printing conditions;
- a printing condition generating section that substitutes a plurality of different parameter values for the variable parameter set by the parameter setting section while substituting fixed values for the fixed parameter set by the parameter setting section, thereby generating the plurality of different printing conditions;
- a printing data generation section that generates printing data including the plurality of symbols, each of the symbols corresponding to each of the plurality of different printing conditions generated by the printing condition generating section, each of the symbols being correlated with an identification information identifying a parameter value on the variable parameter included in the printing condition and being decoded or optically recognized as the identification information by the printing quality evaluation apparatus; and
- a marking section that prints the plurality of symbols generated by the printing data generation section based on each printing condition correlated with the identification information included in the symbol, and the printing quality evaluation apparatus includes:
- an image acquiring section that acquires the captured image including the plurality of symbols printed in the printing target, the captured image being captured with resolution at which the printing quality of the symbol is evaluated;
- a symbol extracting section that extracts the symbol in which the printing quality is evaluated from the captured images acquired by the image acquiring section;
- a printing quality evaluation section that evaluates the printing quality of the symbol extracted by the symbol extracting section;
- an identification information recognition section that recognizes the identification information by decoding or optically recognizing the symbol extracted by the symbol extracting section, the identification information identifying a parameter value on the variable parameter included in the printing condition, the printing condition corresponding to the symbol extracted by the symbol extracting section; and
- an evaluation output section that outputs an evaluation result of the printing quality evaluated by of the printing quality evaluation section and the identification information recognized by the identification information recognition section according to the symbol extracted by the symbol extracting section, the identification information recognition section recognizes the identification information of the symbol that is evaluated as the printing quality by the printing quality evaluation section, the recognized identification information is acquired from the evaluation output section, and the printing condition identified by the identification information is capable of being fed back to the laser marking apparatus.

3. A laser marking apparatus that prints a plurality of symbols having different printing conditions in a printing target, the laser marking apparatus comprising:
a parameter setting section that sets a variable parameter varying the printing condition and a fixed parameter as a plurality of printing parameters constituting the printing conditions;
a printing condition generating section that substitutes a plurality of different parameter values for the variable parameter set by the parameter setting section while substituting fixed values for the fixed parameter set by the parameter setting section, thereby generating the plurality of different printing conditions;
a printing data generation section that generates printing data including the plurality of symbols, each of the symbols corresponding to each of the plurality of different printing conditions generated by the printing condition generating section, each of the symbols being correlated with an identification information identifying a parameter value on the variable parameter included in the printing condition and being decoded or optically recognized as the identification information by a printing quality evaluation apparatus; and
a marking section that prints the plurality of symbols generated by the printing data generation section based on each printing condition correlated with the identification information included in the symbol, wherein
the printing condition is identified in printing the symbol based on the identification information that is evaluated as the printing quality by the printing quality evaluation apparatus in the plurality of printed symbols, and the printing condition is capable of being reflected on next printing.

4. The laser marking apparatus according to claim 3, wherein the parameter setting section selects one of different values of the variable parameters constituting a first sample printing condition while the plurality of different symbols are printed on the first sample printing condition by the marking section, sets the selected value of the variable parameter to a fixed parameter of a second printing condition, and set a new variable parameter in other fixed parameters to a second printing condition.

5. The laser marking apparatus according to claim 3, further comprising an identification information reference section that correlates the different piece of identification information identifying each printing condition with each of the plurality of different printing conditions generated by the printing condition generating section.

6. The laser marking apparatus according to claim 5, wherein
the identification information reference section is a correspondence table indicating correspondence relationships between the plurality of different printing conditions and the plurality of different pieces of identification information.

7. The laser marking apparatus according to claim 6, wherein
the symbol is a one-dimensional code or a two-dimensional code,
the identification information is positional information on each symbol, and
the identification information reference section is a correspondence table indicating correspondence relationship between the printing condition of the one-dimensional code or the two-dimensional code and the positional information on each symbol.

8. The laser marking apparatus according to claim 6, wherein
the symbol is a one-dimensional code or a two-dimensional code,
the identification information is an alphanumeric character or a sign, and
the identification information reference section is a correspondence table indicating correspondence relationship between the printing condition of the one-dimensional code or the two-dimensional code and the alphanumeric character or the sign.

9. The laser marking apparatus according to claim 3, further comprising a printing information code setting section that marks a printing information code in which the printing condition is encoded on the printing target.

10. The laser marking apparatus according to claim 3, wherein the parameter setting section selects two of the plurality of printing parameters as the variable parameters, and the symbols can be printed into a matrix on the different printing conditions in which the two variable parameters are changed.

11. The laser marking apparatus according to claim 3, wherein the identification information is the positional information on each symbol.

12. The laser marking apparatus according to claim 3, wherein the identification information is constructed by parameter value information including a parameter value of the variable parameter, or the parameter value of the variable parameter and a parameter value of the fixed parameter.

13. The laser marking apparatus according to claim 3, wherein the printing parameter includes at least one of a laser power, a scanning speed, a Q switch frequency, a spot variable value, and the number of printing times.

14. A printing condition setting device that sets a printing condition in order to print a plurality of symbols having different printing conditions in a printing target with a laser marking apparatus, the printing condition setting device comprising:
a parameter setting section that sets a variable parameter varying the printing condition and a fixed parameter as a plurality of printing parameters constituting the printing conditions;
a printing condition generating section that substitutes a plurality of different parameter values for the variable parameter set by the parameter setting section while substituting fixed values for the fixed parameter set by the parameter setting section, thereby generating the plurality of different printing conditions;
a printing data generation section that generates printing data including the plurality of symbols, each of the symbols corresponding to each of the plurality of different printing conditions generated by the printing condition generating section, each of the symbols being correlated with an identification information identifying a parameter value on the variable parameter included in the printing condition and being decoded or optically recognized as the identification information by a printing quality evaluation apparatus; and
a printing data output section that transmits the plurality of different symbols generated by the printing data generation section to the laser marking apparatus such that the laser marking apparatus prints the plurality of different symbols based on each printing condition correlated with the identification information included in the symbol.

15. A printing quality evaluation apparatus that evaluates printing quality of each symbol based on captured images of a plurality of symbols having different printing conditions, the plurality of symbols being printed in a printing target, the printing quality evaluation apparatus comprising:
- an image acquiring section that acquires the captured image including the plurality of symbols printed in the printing target, the captured image being captured with resolution at which the printing quality of the symbol is evaluated;
- a symbol extracting section that extracts the symbol in which the printing quality is evaluated from the captured images acquired by the image acquiring section;
- a printing quality evaluation section that evaluates the printing quality of the symbol extracted by the symbol extracting section;
- an identification information recognition section that recognizes an identification information by decoding or optically recognizing the symbol extracted by the symbol extracting section, the identification information identifying a parameter value on the variable parameter including in the printing condition, the printing condition corresponding to the symbol extracted by the symbol extracting section; and
- an evaluation output section that outputs the identification information, which is recognized by the identification information recognition section, and an evaluation result of the printing quality of the printing quality evaluation section according to the symbol extracted by the symbol extracting section.

16. The printing quality evaluation apparatus according to claim 15, further comprising an evaluation display section that displays the evaluation result of the printing quality of the printing quality evaluation section and the identification information recognized by the identification information recognition section.

17. The printing quality evaluation apparatus according to claim 16, wherein the evaluation display section displays the graph of the score and the captured image on an identical screen and, when one of points in the graph is selected on the identical screen, the symbol corresponding to the point in the captured image is highlighted.

18. The printing quality evaluation apparatus according to claim 15, wherein
- the image acquiring section is an image capturing section that the captured image, which includes individual symbol printed in the printing target, with resolution at which the printing quality of the symbol is evaluated,
- the printing quality evaluation apparatus further comprises an image capturing control section that controls the image capturing section such that an image of the symbol is continuously captured while an image capturing parameter of the image capturing section is changed,
- the printing quality evaluation section calculates a score of read stability with respect to the symbol for a change of the image capturing parameter, and
- the evaluation display section displays the score and the identification information.

19. The printing quality evaluation apparatus according to claim 18, wherein the evaluation display section displays a graph of the score while the image capturing control section changes the image capturing parameter.

20. The printing quality evaluation apparatus according to claim 18, wherein the image capturing section captures an image of a specific partial region where the printing quality of at least one of the plurality of symbols is evaluated, the partial region being narrower than a whole region where the plurality of symbols are printed.

21. The printing quality evaluation apparatus according to claim 15, further comprising a target region setting section that specifies a target region in the captured image displayed on the evaluation display section, a user is caused to select the one or plurality of symbols in the target region.

22. The printing quality evaluation apparatus according to claim 15, wherein a matrix of the score is displayed on the evaluation display section.

23. The printing quality evaluation apparatus according to claim 15, further comprising a decoding section that decodes information included in the symbol extracted by the symbol extracting section.

24. A printing condition setting program that sets a printing condition in order to print a plurality of symbols having different printing conditions in a printing target with a laser marking apparatus, the printing condition setting program causing a computer to implement:
- a parameter setting function that sets a variable parameter varying the printing condition and a fixed parameter as a plurality of printing parameters constituting the printing conditions;
- a printing condition generating function of substituting a plurality of different parameter values for the variable parameter set by the parameter setting function while substituting fixed values for the fixed parameter set by the parameter setting function, thereby generating the plurality of different printing conditions;
- a printing data generation function that generates printing data including the plurality of symbols, the symbols corresponding to each of the plurality of different printing conditions generated by the printing condition generating function, the symbols being correlated with an identification information identifying a parameter value on the variable parameter included in the printing condition and being decoded or optically recognized as the identification information by a printing quality evaluation function; and
- a printing data output function of transmitting the plurality of different symbols generated by the printing data generation function to the laser marking apparatus.

25. A computer-readable recording medium in which the program according to claim 24 is stored.

26. A printing quality evaluation program that evaluates printing quality of each symbol based on captured images of a plurality of symbols having the different printing conditions, the plurality of symbols being printed in the printing target, the printing quality evaluation program causing a computer to implement:
- an image capturing function of capturing an image including each symbol printed in the printing target, the image being captured with resolution at which the printing quality of the symbol is evaluated;
- a symbol extracting function of extracting the symbol in which the printing quality is evaluated from the image captured by the image capturing function;
- a printing quality evaluation function of evaluating the printing quality of the symbol extracted by the symbol extracting function;
- an identification information recognition function of recognizing an identification information by decoding or optically recognizing the symbol extracted by the symbol extracting section, the identification information identifying a parameter value on the variable parameter including in the printing condition, the printing condition corresponding to the symbol extracted by the symbol extracting function; and an output function of outputting the identification information, which is recognized by the identification information recognition function, and an evaluation result of the printing quality of the printing quality evaluation function according to the symbol extracted by the symbol extracting function.

\* \* \* \* \*